US007048988B2

(12) United States Patent
Sawada et al.

(10) Patent No.: US 7,048,988 B2
(45) Date of Patent: May 23, 2006

(54) SUPPORT FOR LITHOGRAPHIC PRINTING PLATE AND PRESENSITIZED PLATE

(75) Inventors: Hirokazu Sawada, Shizuoka (JP); Akio Uesugi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 112 days.

(21) Appl. No.: 10/655,369

(22) Filed: Sep. 5, 2003

(65) Prior Publication Data

US 2004/0079252 A1 Apr. 29, 2004

(30) Foreign Application Priority Data

| | | | |
|---|---|---|---|
| Sep. 6, 2002 | (JP) | ............................ | 2002-261763 |
| Sep. 10, 2002 | (JP) | ............................ | 2002-264114 |
| Sep. 11, 2002 | (JP) | ............................ | 2002-265636 |
| Jun. 12, 2003 | (JP) | ............................ | 2003-167890 |

(51) Int. Cl.
*B32B 3/26* (2006.01)
*B41N 1/08* (2006.01)

(52) U.S. Cl. ...................... 428/141; 428/156; 428/212; 428/220; 430/278.1; 101/453; 101/454

(58) Field of Classification Search ................ 428/141, 428/156, 212, 220; 430/278.1; 101/453, 101/454

See application file for complete search history.

(56) References Cited

U.S. PATENT DOCUMENTS

| | | | |
|---|---|---|---|
| 4,476,006 A | 10/1984 | Ohba et al. | |
| 5,837,345 A | 11/1998 | Nishino et al. | |
| 2001/0041305 A1* | 11/2001 | Sawada et al. .......... | 430/278.1 |

FOREIGN PATENT DOCUMENTS

| | | |
|---|---|---|
| EP | 0 730 979 A2 | 9/1996 |
| EP | 0 816 118 A1 | 1/1998 |
| EP | 0 960 743 A2 | 12/1999 |
| EP | 1 157 854 A2 | 11/2001 |
| EP | 1 300 257 A2 | 4/2003 |
| JP | 4-72719 B | 11/1992 |
| JP | 8-300843 A | 11/1996 |
| JP | 8-300844 A | 11/1996 |
| JP | 10-35133 A | 2/1998 |
| JP | 11-99758 A | 4/1999 |
| JP | 11-208138 A | 8/1999 |

* cited by examiner

*Primary Examiner*—William P. Watkins, III
(74) *Attorney, Agent, or Firm*—Sughrue Mion, PLLC

(57) ABSTRACT

The first embodiment is a support for a lithographic printing plate, wherein the surface area ratios obtained from three-dimensional data by use of an atomic force microscope meets the following requirements (1-i) to (1-iii).

The second embodiment is a support for a lithographic printing plate, wherein the aforementioned surface area ratios and a steepness meets the following requirements (2-i) to (2-ii).

The third embodiment is a support for a lithographic printing plate, wherein the aforementioned surface area ratios meets the following requirements (4-i) to (4-iii).

(1-i) a surface area ratio $\Delta S^{50(50)}$ is 20 to 90%,
(1-ii) a surface area ratio $\Delta S^{50(2\text{-}50)}$ is 1 to 30%, and
(1-iii) a surface area ratio $\Delta S^{50(0.2\text{-}2)}$ is 5 to 40%,
(2-i) a surface area ratio $\Delta S^{50(50)}$ is 30 to 60%, and
(2-ii) a steepness $a45^{50(0.2\text{-}2)}$ is 5 to 40%,
(4-i) a surface area ratio $\Delta S^{5(5)}$ is 20 to 90%,
(4-ii) a surface area ratio $\Delta S^{5(0.2\text{-}5)}$ is 5 to 40%, and
(4-iii) A surface area ratio $\Delta S^{5(0.02\text{-}0.2)}$ is 15 to 70%.

16 Claims, 3 Drawing Sheets

SUPPORT FOR LITHOGRAPHIC PRINTING PLATE AND PRESENSITIZED PLATE

BACKGROUND OF THE INVENTION

1. Field of the Invention

The present invention relates to a support for a lithographic printing plate and a presensitized plate.

1) More particularly, the present invention relates to the support for the lithographic printing plate and to a presensitized plate using the support for the lithographic printing plate where an ink spreading hardly occurs in a halftone dot area and left-plate scum resistance under a low humidity environment is excellent when the lithographic printing plate is manufactured, since water-receptivity is excellent. Further the present invention relates to a presensitized plate where a dot residual layer hardly occurs and to the support for the lithographic printing plate used in the presensitized plate besides the aforementioned characteristics.

2) More particularly the present invention relates to the support for the lithographic printing plate and to the presensitized plate from which the lithographic printing plate can be prepared with the effects that scum resistance is excellent, specially, a scum (scumming) on non-image areas hardly occurs even if the quantity of a fountain solution is reduced, an adhesion between an image recording layer and the support on image areas is strong, press life is excellent, and an inadequate inking on a solid area (solid image area) hardly occurs. Further the present invention relates to the support for the lithographic printing plate and to the presensitized plate from which the lithographic printing plate can be manufactured with the effects that the property that press life does not deteriorate, although the printing plate is wiped with a plate cleaner (cleaner press life) besides the aforementioned characteristics. Moreover the present invention relates to the support for the lithographic printing plate and to the presensitized plate from which the lithographic printing plate can be manufactured with the effects that a locally dotted stain (dot residual layer) hardly occurs, specially, the generation prevention effect of the dot residual layer is excellent when the image recording layer of a laser directly-drawn type is provided besides the aforementioned characteristics.

3) More particularly, the present invention relates to the support for the lithographic printing plate and to the presensitized plate using the support for the lithographic printing plate where an adhesion between a photosensitive layer and the support is excellent, especially, UV ink resistance is excellent on image areas and a scum hardly occurs on non-image areas.

2. Description of the Related Art

Lithography is a printing system capitalizing on the property that water and oil do not mix basically, and an area which receives water and repels an oily ink (hereinafter, this area is called "a non-image area") and an area which repels water and receives the oily ink (hereinafter, this area is called "an image area") are formed on the printing plate of a lithographic printing plate used for the lithography.

Since an aluminum support for the lithographic printing plate used for the lithographic printing plate (hereinafter, merely called "a support for the lithographic printing plate") is used so as to allow the surface of the support to function as a non-image area, various contradictory performances such as excellent water wettability, water receptivity, and an excellent adhesion between the support for the lithographic printing plate and an image recording layer provided thereon are required.

If the water wettability of the support for the lithographic plate is too low, ink is likely to be attached to the non-image areas at the time of printing, causing a blanket cylinder to be scummed and thereby causing so-called scumming to be generated. In addition, if the water receptivity of the support plate is too low, clogging in the shadow area is generated if the flow of a fountain solution is not increased at the time of printing. Thus, a so-called water allowance is narrowed.

1) On the one hand, if deep recesses are existent on the surface of the support for the lithographic printing plate on which a graining is performed, a development may be suppressed according to shapes on the surface since the image recording layer on that portion is thickened. Then, as a result of suppressed development, the image recording layer is left in the deep recesses, local residual layers (hereinafter, also called "dot residual layers") are generated, thus causing a problem that the non-image areas are scummed at the time of printing. For example, in a presensitized plate where a so-called thermal type image recording layer is provided in which the solubility to an alkali developer varies with heat generated by photo-thermal conversion, an image formation reaction is insufficient at the bottom of the recesses, thereby the dot residual layers are generated.

Such the dot residual layers are likely to take place if the conditions of exposure and development are tight. For example, in a presensitized plate provided with the thermal type image recording layer, such a case as that the exposure quantity of a laser is lowered by shortening exposure time to increase productivity, by lowering a laser light energy to extend the service life of the laser and the like. In addition, such a case also as that a development is performed by using a low-sensitivity developer and the like, since an image recording layer where non-image portions likely tend to take place on an area which is basically to be an image area is used to a highly-sensitive and highly active developer.

2) On the other hand, it is preferable that the asperities on the surface of a non-image area are smooth so as not to allow unnecessary ink to be attached in order to keep scum resistance. However, if the asperities of the surface are smoothened, the adhesion between the image recording layer and the support for the lithographic printing plate deteriorates, thereby press life deteriorates. Namely, scum resistance and press life are in the relation of trade-off.

3) In addition, in another case, if the water wettability of the support for the lithographic printing plate is too low, ink is likely to be attached to the non-image areas at the time of printing, thereby causing ink scum, particularly the gap to be scummed. In addition, if the water allowance is narrow, spreading of halftone dots may take place, depending upon kinds of ink.

Although a gap scum belongs to an ink scum evaluated by the sheets needed for ink repelling, it is another scum different from a scum which is left in the vicinity of the image areas at the initial stage of printing. The non-image area between the vicinity of an area of PS plate which is fixed on the plate cylinder (lower gripper area) and the image area on the side of PS plate wound around the plate cylinder contacts with the blanket cylinder is called a gap. When printing is started, ink is likely to be attached to this gap which is scummed with the ink. This is called a gap scum. Since this scum gradually disappears as water and ink are supplied in a printing process, usually, it is simultaneously evaluated as sheets needed for ink repelling.

The gap scum is observed as the scum of the non-image areas between the image areas and the gripper areas under a place where the gripper areas are provided at the upper and the lower positions and the image areas are provide at the center when PS plate is removed from the plate cylinder, opened and extended. Since the gap scum is likely to take place, if greater fine irregular structures (asperities) are existent on the surface of the support for the lithographic printing plate, it is contrary to a technological requirement for increasing an adhesion between the support for the lithographic printing plate and the image areas.

In order to solve the aforementioned problems to obtain the support for the lithographic printing plate with a good performance, it is general to give asperities by performing graining (graining treatment) on the surface of an aluminum plate. For the asperities, various shapes are proposed as shown below. JP 8-300844 A describes a triple structure which is formed of large, medium and small undulations in which the aperture diameters of a grained structure with medium and small undulations are defined. JP 11-99758 A and JP 11-208138 A describe the definition of the diameter of a grained structure with small undulation in the double structure of a grained structure with large and small undulations. JP 11-167207 A describes a technology which gives finer protrusions besides the double, which is large and small, recesses (pits). JP Patent No. 2023476 (Specification) describes a double structure where the diameter of an aperture is defined. JP 8-300843 A describes a double structure where a factor a30 which shows the smoothness of a surface is defined. JP 10-35133 A describes a structure where the ratio of the diameters of pits superimposed in a plurality of electrochemical graining treatments (hereinafter, also referred to as "electrolytic graining treatments") is defined.

Used for this graining are mechanical graining methods such as ball graining, brush graining, wire graining and blast graining, electrolytic graining method where electrolytic etching is performed on an aluminum plate in an electrolyte containing hydrochloric acid and/or nitric acid, and U.S. Pat. No. 4,476,006 describes a complex graining method combining mechanical graining method with electrolytic graining method.

However, various kinds of inks are now used depending upon applications at printing sites and these inks each has the different physical properties of the solutions.

1-1) In an aforementioned conventional art, since water receptivity is not sufficient, the art has the problems that there occurs a trouble that a phenomenon that the ink in the image areas is apt to move to the non-image areas if the fountain solution is reduced during printing (hereinafter, called "ink spreading in the halftone dot areas" and a difficulty of the generation of this phenomenon is called "difficulty of spreading") is likely to take place and left-plate scum resistance is also poor, particularly in the halftone dot area of high image area ratio among the image areas (hereinafter, called "shadow area"), depending upon kinds of inks and fountain solutions. This ink spreading in the halftone dot areas is highly likely to be affected by the physical properties of the ink and the fountain solution.

Therefore, the present invention is directed to solve this problem and provide the support for the lithographic printing plate and the presensitized plate using the support for the lithographic printing plate where the ink spreading in the halftone dot areas hardly occurs and left-plate scum resistance is excellent, regardless of the kind of ink or fountain solution when a lithographic printing plate is manufactured.

1-2) In addition, it is effective to increase the surface roughness to improve water receptivity. However, if the surface roughness is increased, locally deep recesses are likely to be generated. The deep recesses cause a defective exposure and development, thereby dot residual layers are likely to be generated.

Therefore, the present invention is directed to provide the support for the lithographic printing plate and the presensitized plate using the same where the ink spreading in the halftone dot areas hardly occurs, left-plate scum resistance is excellent and further, dot residual layers are not generated irrespective of the kind of an ink or a fountain solution when the lithographic printing plate is manufactured.

2-1) In addition, if a recycled paper on the surface of which a coating component is coated to increase the whiteness degree (hereinafter, called "a coated recycled paper") is used as a material to be printed, an inadequate inking may take place in a solid area, and this is problematic.

However, the support for the lithographic printing plate where water wettability, water receptivity, scrum resistance, adhesion with the image recording layer are excellent, and an inadequate inking in the solid areas does not occur if printing is performed by using a coated recycled paper has not been realized yet.

Therefore, the present invention is directed to provide the presensitized plate and the support for the lithographic printing plate used therefore where press life and scum resistance are excellent, and an inadequate inking in the solid areas hardly occur if the coated recycled paper is used when the lithographic printing plate is manufactured.

3-1) The aforementioned conventional arts have further problems, depending upon the kinds of inks. A UV-curing ink has been recently used as an image recording layer. The UV ink chiefly includes a monomer and a pigment and is hardened by irradiating the monomer with ultraviolet rays to perform coloring. Particularly, since the UV-curing ink per se derived from the monomer or a treatment chemical used for printing by employing the UV-curing ink, particularly, a mineral spirit, a plate cleaner or the like must be stronger than the processing chemicals, there has occurred a problem that an adhesion is further damaged if a solution layer derived from these chemicals is formed between the image areas and the support for the lithographic printing plate. For that reason, the surface shape of the support for the lithographic printing plate has been further required to be investigated.

3-2) In addition, there was a disadvantage that an ink is likely to be attached to the non-image areas in the shadow area where a fountain solution is reduced, namely in the halftone dot areas (hereinafter, this phenomenon is called "ink spreading" and a degree of difficulty that this phenomenon hardly occurs is called "difficulty of spreading", depending upon the kinds of inks and in addition, there was also a problem that left-plate scum resistance was poor.

Therefore, the present invention is directed to solve this problem and provide the presensitized plate and the support for the lithographic printing plate used for the same where the adhesion between the photosensitive layer and the support for the lithographic printing plate is excellent in the image areas, particularly UV-curing ink resistance is excellent, and ink scum and gap scum hardly occur in the non-image areas.

3-3) The present invention is preferably directed to provide the support for the lithographic printing plate and a presensitized plate using the same having the optimum surface shape capable of preventing the attachment of ink to the non-image areas in the halftone dot areas (halftone dot spreading) even if a fountain solution is reduced, irrespective of the kind of an ink when a lithographic printing plate is manufactured.

SUMMARY OF THE INVENTION

The inventors herein have thoroughly studied the surface shape (physical properties) of a support for a lithographic printing plate to solve the aforementioned subjects and-completed the invention in the first to fourth embodiments below mentioned.

1) It is found that water wettability and water receptivity can be improved by controlling surface area ratio $\Delta S^{50}$, particularly $\Delta S^{50(50)}$ from three-dimensional data which can be found by measuring 512×512 points in 50 μm square on the surface by use of an atomic force microscope, $\Delta S^{50(2-50)}$ obtained after extracting components with wavelength of 2 μm or more and 50 μm or less from the three-dimensional data, and $\Delta S^{50(0.2-2)}$ obtained after extracting components with wavelength of 0.2 μm or more and 2 μm or less from the three-dimensional data in the specified ranges, and thereby ink spreading in the halftone dot areas hardly occurs and left-plate scum resistance under a low-humidity environment are excellent when the lithographic printing plate is manufactured.

In addition, it is found that the generation of dot residual layers can be particularly suppressed, even if the conditions of exposure and development are tightened, by defining the number of recesses having a certain depth existing on the surface of the support for the lithographic printing plate with the aforementioned surface area ratio $\Delta S^{50}$.

[1] The first embodiment according to the present invention provides the following (1) and (2).

(1) A support for a lithographic printing plate, wherein the surface area ratios obtained from three-dimensional data which can be found by measuring 512×512 points in 50 μm square on the surface by use of an atomic force microscope meets the following requirements (1-i) to (1-iii):

(1-i) a surface area ratio $\Delta S^{50(50)}$ is 20 to 90%, (1-ii) a surface area ratio $\Delta S^{50(2-50)}$ is 1 to 30%, and (1-iii) a surface area ratio $\Delta S^{50(0.2-2)}$ is 5 to 40%, where $\Delta S^{50(50)}$ is the surface area ratio which can be found by the following equation from an actual area $S_x^{50}$ found by a three-point estimate from the three-dimensional data and a geometrically measured area $S_o^{50}$, $$\Delta S^{50(50)}=[(S_x^{50}-S_o^{50})/S_o^{50}]\times100(\%) \quad (1\text{-}1)$$

where, $\Delta S^{50(2-50)}$ is the surface area ratio obtained after extracting components with wavelength of 2 μm or more and 50 μm or less from the three-dimensional data, and $\Delta S^{50(0.2-2)}$ represents the surface area ratio obtained after extracting components with wavelength of 0.2 μm or more and 2 μm or less from the three-dimensional data.

(2) The support for the lithographic printing plate according to the aforementioned (1), wherein the number of recesses of 4 μm or deeper in depth on the surface is 10 or less per 400 μm×400 μm, and the number of recesses of 3 μm or deeper in depth on the surface is 30 or less per 400 μm×400 μm.

Here, the number of recesses with depth of 3 μm or more existing on the aforementioned surface includes the one of recesses with the aforementioned depth of 4 μm or more. In addition, these depths are based on the average line of the surface roughness curves in the three-dimensional data.

2) In addition, as a result that the inventors herein have thoroughly studied the surface shapes of the support for the lithographic printing plate, they have found that, if the various factors showing the surface shapes which can be found by use of the atomic force microscope are determined to be the specified ranges, press life and scum resistance are excellent, and inadequate inking in the solid areas hardly occurs, if a coated recycled paper is used to complete the present invention. Thus, the inventors have completed the invention.

[2] The second embodiment according to the present invention provides the following (1) to (3).

(1) A support for a lithographic printing plate, wherein a surface area ratio and a steepness which can be found by three-dimensional data from the three-point estimate which can be found by measuring 512×512 points in 50 μm square on the surface by use of an atomic force microscope meet the following requirements (2-i) and (2-ii):

(2-i) a surface area ratio $\Delta S^{50(50)}$ is 30 to 60%, and (2-ii) a steepness $a45^{50(0.2-2)}$ is 5 to 40%, where $\Delta S^{50(50)}$ is the surface area ratio which can be found by the following equation (2-1) from an actual area $S_x^{50}$ and a geometrically measured area $S_o^{50}$, $$\Delta S^{50(50)}=(S_x^{50}-S_o^{50})/S_o^{50}\times100(\%) \quad (2\text{-}1)$$

The steepness $a45^{50(0.2-2)}$ is the area ratio of an area of gradient 45° or more in the data obtained after extracting components with wavelength of 0.2 μm or more and 2 μm or less from the aforementioned three-dimensional data.

Incidentally, although the surface of the printing plate is sometimes cleaned with a chemical called a cleaner during printing, this cleaner may bring about a trouble that this cleaner removes an unnecessary ink attached to the surface of the non-image areas and simultaneously penetrates in to the boundary between the image recording layer and the support for lithographic plate, thereby the adhesion between the two sections to thus result in deterioration of press life. Therefore, a property that press life does not deteriorate even if the surface is wiped with the cleaner (cleaner press life) is an important characteristic to the lithographic printing plate.

The inventors herein have thoroughly studied the surface shapes of the support for the lithographic printing plate and finally found that, when the various factors showing the surface shapes found by use of the atomic force microscope, other than the foregoing methodologies, are determined to be a specified range, the support for the lithographic printing plate is excellent in cleaner press life.

(2) Namely, the support for the lithographic printing plate according to the aforementioned (1), wherein a surface area ratio and steepness which can be found from three-dimensional data obtained by measuring 512×512 points in 5 μm square on the surface by use of an atomic force microscope meet the following requirements (3-i) and (3-ii):

(3-i) a surface area ratio $\Delta S^{50(0.02-0.2)}$ is 30 to 60%, and (3-ii) a steepness $a45^{5(0.02-0.2)}$ is 10 to 40%, where $\Delta S^{5(0.02-0.2)}$ is a surface area ratio which can be found by the following equation (3-1) from an actual area $S_x^{5(0.02-0.2)}$ which can be found by the three-point estimate from data obtained after extracting components with wavelength of 0.02 μm or more and 0.2 μm or less and a geometrically measured area $S_o^{5}$, $$\Delta S^{5(0.02-0.2)}=(S_x^{5(0.02-0.2)}-S_o^{5})/S_o^{5}\times100(\%) \quad (3\text{-}1)$$

and the steepness $a45^{5(0.02-0.2)}$ is the area ratio of an area of gradient 45° or more in the data obtained after extracting components with wavelength of 0.02 μm or more and 0.2 μm or less from the three-dimensional data.

In addition, generally, it is effective to increase surface roughness to improve water receptivity. However, if surface roughness is increased, deep recesses are likely to be locally generated. Deep recesses cause defective exposure and development, thereby dot residual layers are likely to be generated. Namely, improvement of water receptivity and dot residual layers are contradictory.

The inventors herein have found that, if the number of local deep areas of a certain depth or more existing on the surface is a specific numerical value or less, the generation of dot residual layers is extremely suppressed.

(3) Namely, it is preferable that the number (number of pieces) of recesses with depth of 4 μm or more existing on the surface (local deep areas) is 6 per 400 μm×400 μm or less.

3) The inventors herein have thoroughly studied the surface shapes of the support for the lithographic printing plate and found that, if the scope of surface area ratio of components with wavelength of 0.02 to 0.2 μm out of the surface area with components with wavelength of 5 μm or less obtained from the three-dimensional data found by measuring 512×512 points in 5 μm square on the surface by use of the atomic force microscope is shifted to the large scope side while a balance thereamong is kept well comparing with that of the surface area ratio of components with wavelength of 0.2 to 5 μm, an adhesion between the photosensitive layer and the support for the lithographic printing plate is excellent in the image areas, particularly, UV-curing ink resistance is excellent and scum hardly occurs in the non-image areas, thus completing the present invention.

In addition, the inventors have invented that such a surface shape can be easily obtained without stringent control of the surface treatment conditions if the Cu content contained in an aluminum plate used for the support plate is set at a predetermined scope.

Further, the inventors have also invented that if the surface roughness $R_a$ of the support plate is set at a predetermined scope, the attachment of ink to the non-image areas (halftone dot spreading) in the halftone dot areas can be prevented.

[3] The third embodiment according to the present invention provides the invention in the following (1) to (3).

(1) A support for a lithographic printing plate, wherein a surface area ratio obtained from a three-dimensional data which can be found by measuring 512×512 points in 5 μm square on the surface by use of an atomic force microscope meets the following requirements (4-i) to (4-iii):

(4-i) a surface area ratio $\Delta S^{5(5)}$ is 20 to 90%, (4-ii) a surface area ratio $\Delta S^{5(0.2-5)}$ is 5 to 40%, and (4-iii) A surface area ratio $\Delta S^{5(0.02-0.2)}$ is 15 to 70%, where $\Delta S^{5(5)}$ is a surface area ratio which can be found and expressed by the following equation (4-1) with an actual area $S_x^5$ obtained from the three-point estimate from the three-dimensional data and a geometrically measured area $S_o$, $$\Delta S^{5(5)}=[(S_x^5-S_o)/S_o]\times 100(\%) \quad (4\text{-}1)$$

where $\Delta S^{5(0.2-5)}$ is a surface area ratio found and expressed by the following equation (4-2) from an actual area $S_x^{5(0.2-5)}$ obtained after extracting components of wavelength of 0.2 μm or more and 5 μm or less from the three-dimensional data and a geometrically measured area $S_o$, $$\Delta S^{5(0.2-5)}=[(S_x^{5(0.2-5)}-S_o)/S_o]\times 100(\%) \quad (4\text{-}2)$$

$\Delta S^{5(0.02-0.2)}$ is a surface area ratio found and expressed by the following equation (4-3) from an actual area $S_x^{5(0.02-0.2)}$ obtained after extracting components of wavelength of 0.02 μm or more and 0.2 μm or less from the three-dimensional data and a geometrically measured area $S_o$, $$\Delta S^{5(0.02-0.2)}=[(S_x^{5(0.02-0.2)}-S_o)/S_o]\times 100(\%) \quad (4\text{-}3)$$

(2) The support for the lithographic printing plate according to aforementioned (1), wherein the support can be obtained by performing graining on the surface of an aluminum alloy plate containing Cu content of 0.00 to 0.05 wt %.

(3) The support for the lithographic printing plate according to the aforementioned (1) or (2), wherein mean roughness $R_a$ measured by contact stylus type surface roughness meter is 0.40 to 0.70.

[4] Further, the fourth embodiment according to the present invention provides the presensitized plate provided with the image recording layer on the support for the lithographic printing plate in the first, second and third embodiments according to the present invention aforementioned.

DETAILED DESCRIPTION OF THE PREFERRED EMBODIMENTS

Figure 1:
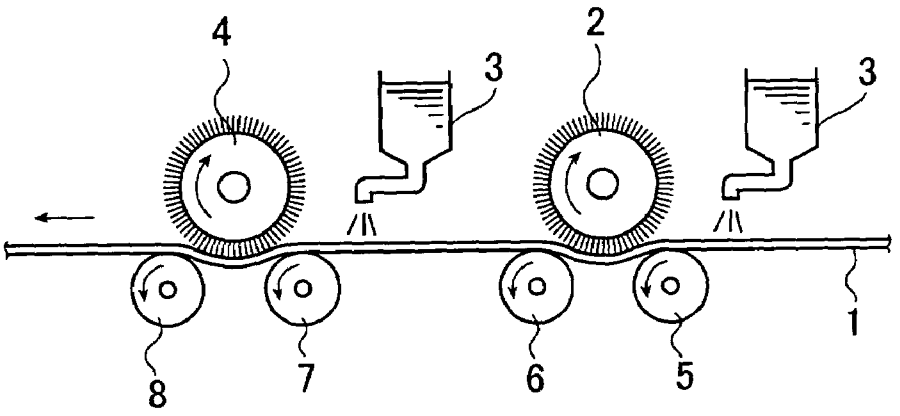
FIG. 1 is a side view showing a concept of a brush graining process used for mechanical graining treatment used in production of a support for a lithographic printing plate according to the present invention.

The present invention is described below in detail.

[Support for Lithographic Printing Plate]

<Shape of Graining on Surface>

[1] The support for the lithographic printing plate in the first embodiment according to the present invention is a support for a lithographic printing plate, wherein a surface area ratio obtained from three-dimensional data which can be found by measuring 512×512 points in 50 μm square on the surface with an atomic force microscope meets the following requirements (1-i) to (1-iii):

(1-i) a surface area ratio $\Delta S^{50(50)}$ is 20 to 90%, (1-ii) a surface area ratio $\Delta S^{50(2-50)}$ is 1 to 30%, and (1-iii) a surface area ratio $\Delta S^{50(0.2-2)}$ is 5 to 40%.

Where, $\Delta S^{50(50)}$ (hereinafter, also called "$\Delta S^{50}$") is the surface area ratio which can be found by the following equation from an actual area $S_x^{50}$ found by a three-point estimate from the aforementioned three-dimensional data and a geometrically measured area $S_o^{50}$, $$\Delta S^{50(50)}=[(S_x^{50}-S_o^{50})/S_o^{50}]\times 100(\%) \quad (1\text{-}1)$$

$\Delta S^{50(2-50)}$ is the surface area ratio obtained after extracting components with wavelength of 2 μm or more and 50 μm or less from the aforementioned three-dimensional data, and $\Delta S^{50(0.2-2)}$ represents the surface area ratio obtained after extracting components with wavelength of 0.2 μm or more and 2 μm or less from the aforementioned three-dimensional data.

$\Delta S^{50(50)}$ is the surface area ratio which can be found by the following equation from an actual area $S_x^{50}$ found by the three-point estimate from the aforementioned three-dimensional data and a geometrically measured area (apparent area) $S_o^{50}$.

$$\Delta S^{50(50)}=[(S_x^{50}-S_o^{50})/S_o^{50}]\times100(\%) \quad (1\text{-}1)$$

Surface area ratio $\Delta S^{50(50)}$ is a factor which shows the extent of an increment in actual area $S_x^{50}$ by graining treatment to geometrically measured area $S_o^{50}$. The more $\Delta S^{50(50)}$ is, the more a contact area with the image recording area is.

In the present invention, the aforementioned subject is solved by controlling surface area ratio $\Delta S^{50(50)}$ obtained from 2 μm or more and 50 μm or less from the aforementioned three-dimensional data (entire wavelength components (substantially components with wavelength of 0.1 to 50 μm)), surface area ratio $\Delta S^{50(2-50)}$ obtained after extracting components with wavelength of 2 μm or more and 50 μm or less from the aforementioned three-dimensional data, and surface area ratio $\Delta S^{50(0.2-2)}$ obtained after extracting components with wavelength of 0.2 μm or more and 2 μm or less from the aforementioned three-dimensional data in a specified range.

Although it is not definitely known the reason why the aforementioned subject can be solved when the aforementioned surface area ratios are controlled in the specified range, it can be considered as follows:

In the first place, if the surface area ratio $\Delta S^{50(50)}$ of the irregularity structure existing on the surface of the support for the lithographic printing plate stays within the scope according to the present invention, a water quantity held in the irregularity structure is increased, enabling to improve water wettability and water receptivity, and suppressing ink spreading in the halftone dot areas.

In addition, if the surface area ratio $\Delta S^{50(2-50)}$ of the irregularity structure stays within the scope according to the present invention, the image recording layer provided thereon is formed in an irregular shape along with the irregular structure, and ink is likely to be stored in the recesses of the irregular shape. Then, if the portion is pressed by a blanket cylinder (impressed), since the movement of the ink can be absorbed inside the irregular structure, the expansion of the ink can be suppressed and the ink spreading in halftone dot areas can be also suppressed. Further, if the surface area ratio $\Delta S^{50(2-50)}$ stays within the scope according to the present invention, a sufficient receptive water quantity can be retained even if the attachments such as ink components and paper powder are attached to the inside of the grains. Further, scumming resistance is excellent.

Further, if the surface area ratio $\Delta S^{50(0.2-2)}$ of the irregularity structure stays within the scope according to the present invention, since the image recording layer provided thereon can be completely removed in the development treatment and water wettability is improved, ink spreading in the halftone dot areas is hardly generated, thus left-plate scum resistance is excellent.

Although it is considered that the surface area ratios $\Delta S^{50(50)}$, $\Delta S^{50(2-50)}$ and $\Delta S^{50(0.2-2)}$ have the actions as mentioned above, it is considered that these actions do not independently have the actions but they are mutually affected, thus contributing to the improvement of water receptivity and water wettability or the like of the support for the lithographic printing plate as a whole.

Therefore, water wettability and water receptivity as the entire surface of the support for the lithographic printing plate can be improved by properly controlling these surface area ratios $\Delta S^{50(50)}$, $\Delta S^{50(2-50)}$ and $\Delta S^{50(0.2-2)}$, and the support for the lithographic printing plate where ink spreading in the halftone dot areas hardly occurs and left-plate scum resistance under a low-humidity environment is excellent can be prepared when a lithographic printing plate is manufactured.

In the present invention, surface area ratio $\Delta S^{50(50)}$ is 20 to 90%, preferably 30 to 85% and more preferably 35 to 55%.

Surface area ratio $\Delta S^{50(2-50)}$ is 1 to 30%, preferably 3 to 30% and more preferably 5 to 10%.

Surface area ratio $\Delta S^{50(0.2-2)}$ is 5 to 40% and preferably 5 to 35%.

On the other hand, if the surface area ratio $\Delta S^{50(50)}$ of the aforementioned entire wavelength component and $\Delta S^{50(2-50)}$ of long wavelength component are increased in order to improve water receptivity and water wettability, deep and large recesses which cause dot residual layers to be generated are likely apt to be locally generated.

For that reason, particularly, it is observed that dot residual layers tend to be generated if the conditions of exposure and development are rigidified. Even under these conditions, a presensitized plate and the support for the lithographic printing plate where the generation of dot residual layers can be particularly suppressed are expected.

It is found that if the number of recesses with depth of 4 μm or more existing on the surface of the support for the lithographic printing plate which meets each surface area ratio $\Delta S^{50(50)}$ mentioned above is set at 10 per 400 μm×400 μm or less, and the number of recesses with depth of 3 μm or more existing on the surface is set at 30 per 400 μm×400 μm or less, the generation of dot residual layers can be particularly suppressed even under the aforementioned conditions.

Since in the local recesses with depth of 4 μm or more, the image recording layer can be hardly removed by exposure and development treatments and the generation of dot residual layers is affected, in the present invention, it is preferable that the number of recesses with depth of 4 μm or more existing on the surface of the support for the lithographic printing plate is set at 10 per 400 μm×400 μm or less, more preferably at 6 or less and more preferably 4 or less in particular.

In addition, since in the local recesses with depth of 3 μm or more, the image recording layer may not be completely removed by exposure and development treatments, and the generation of dot residual layers is affected, it is preferable in the present invention, the number of recesses with depth of 3 μm or more existing on the surface of the support for the lithographic printing plate is set at 30 per 400 μm×400 μm or less, more preferably 20 or less, and more preferably 15 or less in particular.

In order to form such a surface shape, taken up for example are the method where the total sum of quantity of electricity, which is applied to anodic reaction in electrolytic graining treatment using an electrolyte mainly containing nitric acid, is increased, the method where mechanical graining treatment using a brush roll and an abrasive having a specified median diameter is performed, or the like.

[2] The support for the lithographic printing plate in the second embodiment according to the present invention is a support for a lithographic printing plate, wherein a surface area ratio and steepness which can be found by the three-dimensional data from the three-point estimate which can be found by measuring 512×512 points in 50 μm square on the surface with an atomic force microscope meet the following requirements (2-i) and (2-ii):

(2-i) a surface area ratio $\Delta S^{50(50)}$ is 30 to 60%, and (2-ii) a steepness $a45^{50(0.2-2)}$ is 5 to 40%.

Where, $\Delta S^{50(50)}$ (hereinafter, also called "$\Delta S^{50}$") is the surface area ratio which can be found by the following equation (2-1) from an actual area $S_x^{50}$ and a geometrically measured area $S_o^{50}$.

$$\Delta S^{50(50)}=(S_x^{50}-S_o^{50})/S_o^{50}\times100(\%) \quad (2\text{-}1)$$

The steepness $a45^{50(0.2-2)}$ is the area ratio of an area of gradient 45° or more in the data obtained after extracting components with wavelength of 0.2 μm or more and 2 μm or less from the aforementioned three-dimensional data.

$\Delta S^{50(50)}$ is a factor which shows the extent of an increment in actual area $S_x^{50}$ by graining treatment to geometrically measured area $S_o^{50}$. If $\Delta S^{50(50)}$ is increased, a contact area with image recording layer is increased, thereby enabling to improve press life as a result. Here, by increasing surface area ratio $\Delta S^{50(50)}$ which can be found without extracting the wavelength components from the three-dimensional data obtained by measuring 512×512 points in 50 μm square on the surface, namely, surface area ratio which also includes the components with long wavelengths, a contact area between the image recording layer and the support for the lithographic printing plate is increased to improve press life. In order to increase $\Delta S^{50(50)}$, the methods which can be used, for example, are the method where electrochemical graining treatment is performed with the total sum of electricity, which is applied to anodic reaction in electrolytic graining treatment using an electrolyte solution which is mainly of hydrochloric acid, of 300 C/dm$^2$ or more, the method where three brush rolls or more are used in mechanical graining treatment using the brush roll and an abrasive, or the like.

In the present invention, $\Delta S^{50(50)}$ is 30% or more, preferably 35% or more and more preferably 40% or more. Since scum resistance deteriorates if $\Delta S^{50(50)}$ is too big, 60% or less is preferable.

The $a45^{50(0.2-2)}$ is a factor which shows the degree of pointness of a fine shape on the surface of the support for the lithographic printing plate. Concretely, it shows the ratio to actual area $S_x^{50}$ of an area with gradient of 45° or more in the asperities on the surface of the support for the lithographic printing plate. The inventors herein have variously studied the matter and found that the aforementioned gradient areas in the components with wavelength of 0.2 μm or more and 2 μm or less are likely to be triggering points by which ink is hooked at the time of printing in the non-image areas and causes scumming. Namely, they have found that, for the components with wavelength of 0.2 μm or more and 2 μm or less, scum resistance can be excellent by reducing a $45^{50(0.2-2)}$.

In addition, the inventors herein have intensively studied the inadequate inking in the solid areas if a coated recycle paper is used and found that the steep areas in the support for the lithographic printing plate tend to be the triggering points by which the coating component supplied through the fountain solution from the paper is hooked, thereby ink scum is deposited on the blanket, particularly, the deposited scum is a physical obstacle in the vicinity of the solid areas, thus the transfer of the ink from the blanket to the paper is insufficient. Further, the inventors herein have variously studied the matter and found that, for the components with wavelength of 0.2 μm or more and 2 μm or less, the inadequate inking in the solid areas, if a coated recycled paper is used, can be improved by lessening $a45^{50(0.2-2)}$. In the present invention, $a45^{50(0.2-2)}$ is 40% or less, preferably 30% or less and more preferably 20% or less. Since press life may deteriorate if $a45^{50(0.2-2)}$ is too small, 5% or more is preferable.

In addition, in the present invention, it is preferable that the support for the lithographic printing plate is the support for the lithographic printing plate according to claim 3, wherein the surface area ratio and the steepness which can be found from the three-dimensional data obtained by measuring 512×512 points in 5 μm square on the surface with the atomic force microscope meet the following requirements (3-i) and (3-ii):

(3-i) a surface area ratio $\Delta S^{5(0.02-0.2)}$ is 30 to 60%, and (3-ii) a steepness $a45^{5(0.02-0.2)}$ is 10 to 40%.

Where, $\Delta S^{5(0.02-0.2)}$ can be found by the following equation (3-1) from an actual area ratio $\Delta S_x^{5(0.02-0.2)}$ which can be found by the three-point estimate from the data obtained after extracting components with wavelength of 0.02 μm or more and 0.2 μm or less and a geometrically measured area $S_o^5$, and the steepness $a45^{5(0.02-0.2)}$ is the area ratio of an area of gradient 45° or more in the data obtained after extracting components with wavelength of 0.02 μm or more and 0.2 μm or less from the aforementioned three-dimensional data.

$$\Delta S^{5(0.02-0.2)}=(S_x^{5(0.02-0.2)}-S_o^{5})/S_o^{5}\times100(\%) \quad (3\text{-}1)$$

$\Delta S^{5(0.02-0.2)}$ is a factor which shows the extent of an increment in actual area $S_x^{5(0.02-0.2)}$ by graining treatment to geometrically measured area $S_o^5$. If $S_x^{5(0.02-0.2)}$ is increased, a contact area with the image recording area is increased, thereby enabling to improve press life. Here, by increasing surface area ratio $\Delta S^{5(0.02-0.2)}$ in the data obtained after extracting the components with wavelength of 0.02 μm or more and 0.2 μm or less from the three-dimensional data obtained by measuring 512×512 points in 5 μm square on the surface, that is, the surface area ratio to which the components with short wavelength contribute, the contact area between the image recording layer and the support plate is increased to improve press life, and the penetration of the cleaner into the boundary between the image recording layer and the support plate is largely suppressed, thereby enabling to improve cleaner press life. In order to increase $\Delta S^{50(0.02-0.2)}$, the methods which can be used, for example, are the method where AC electrolytic graining treatment is performed so as to allow the total sum of a quantity of electricity which is applied to anodic reaction in a hydrochloric acid electrolyte solution to be 10 to 100 C/dm$^2$, the method where the trace of aluminum (for example, 0.1 to 0.3 g/m$^2$) is dissolved in an alkali solution followed by the AC electrolytic graining in an nitric acid based electrolyte or the like.

In the present invention, it is preferable that $\Delta S^{5(0.02-0.2)}$ is 30% or more, more preferably 40% or more and further preferably 50% or more. Since a defective development may be caused if $\Delta S^{5(0.02-0.2)}$ is too big, 60% or less is preferable.

The $a45^{5(0.02-0.2)}$ is a factor which shows the degree of pointness of a fine shape on the surface of the support plate. Concretely, it shows the rate to actual area $S^{5(0.02-0.2)}$ of an area with gradient of 45° or more in the asperities on the surface plate. The inventors herein have variously studied the matter and found that if the aforementioned steep areas in the components with wavelength of 0.02 μm or more and 0.2 μm or less are too big, ink spreading resistance deteriorates. Namely, they have found that for the components with wavelength of 0.02 μm or more and 0.2 μm or less, ink spreading resistance can be improved by lessening $a45^{50(0.2-2)}$.

In the present invention, it is preferable that a $45^{50(0.02-0.2)}$ is 40% or less, more preferably 30% or less and further preferably 20% or less. Since press life may deteriorate if a $45^{50(0.02-0.2)}$ is too small, 10% or more is preferable.

Further, in the present invention, it is preferable that the number of local deep areas with depth of 4 μm or more existing on the surface is 6 per 400 μm×400 μm or less and 4 or less is more preferable. By this method, dot residual layers do not occur if the conditions of exposure and development are rigidified.

The inventors herein have thoroughly studied the cause of the generation of recesses with depth of 4 μm or more by graining treatment later described and estimated the cause as follows:

First, if graining treatment including mechanical graining treatment is performed, the edge areas of abrasive particles used for mechanical graining treatment are deeply stuck into the surface of an aluminum plate to form recesses.

Second, if graining treatment including electrolytic graining treatment is performed, a current is concentrated on a specific area when electrolytic graining treatment is performed.

The inventors herein have thus estimated the causes, thoroughly studied the matter and found that the number of recesses with depth of 4 μm or more produced by graining treatment can be 6 per 400 μm×400 μm or less by the countermeasures mentioned below.

Namely, the following countermeasures (i) to (v) are found to sticking of the abrasive particles used for mechanical graining treatment which is the first cause.

(i) Use of abrasive of small particle diameter

For example, the big size particles of the abrasive are removed by settling, and only the small size particles are used, and the particle size of the abrasive can be reduced by allowing the particles of the abrasive to contact with each other to be worn by re-crushing.

(ii) Use of abrasive of particles with small number of points

Pumice stone (hereinafter, also called "pumice") usually used for mechanical graining treatment is obtained by crushing volcanic ashes, and the particles are plate fragments like broken glasses and the edge areas are sharp. On the contrary, silica sand is of a shape closer to 12-hedron or 24-hedron and is not sharp.

(iii) Use of softer brush bristles for mechanical graining treatment

For example, a brush with thinner diameter of bristles is used or a brush made of a soft material is used to allow brush bristles to be soft.

(iv) The revolution of the brush used for mechanical graining treatment is lowered.

Sticking is suppressed by moderately giving "escape" time to the abrasive particles contained in a slurry solution.

(v) Pressing pressure (load) of the brush used for mechanical graining treatment is lowered.

In addition, the following countermeasures (vi) to (viii) have been found to the concentration of the current on the specific area when electrolytic graining treatment is performed which is the second cause.

(vi) An electrolyte mainly containing nitric acid is used in electrolytic graining treatment, Cu content is lowered in the alloy components of the aluminum plate so as to allow electrolysis to be evenly generated.

In electrolytic graining treatment, usually, by applying AC to an acidic electrolyte, the dissolution reaction of aluminum (pitting reaction) and smut attachment reaction where components produced after the dissolution attaches to the dissolution reaction area alternately take place in accordance with the cycle of AC. Here, if a nitric acid electrolyte is used, the reaction is likely to be affected by the kinds or quantity of aluminum alloy components contained in the aluminum plate, particularly, the affect by Cu is big. It is considered that this is because the surface resistance increases when electrolytic graining treatment is performed in the presence of Cu. Therefore, since the surface resistance decreases when electrolytic graining treatment is performed by setting Cu content in the alloy components to be 0.002 wt % or less, the concentration of the current is suppressed, enabling to form even pits on the entire surface without forming too big pits.

(vii) If the electrolyte mainly containing nitric acid is used in electrolytic graining treatment, pre-electrolysis can be performed before electrolytic graining treatment is performed.

In the pre-electrolysis, the starting points of a pit formation can be evenly formed. By this method, in subsequent electrolytic graining treatment, even pits can be formed on the entire surface without forming too big pits.

(viii) If the electrolyte mainly containing hydrochloric acid is used in electrolytic graining treatment, acetic acid or sulfuric acid is allowed to be contained in the electrolyte.

Although coarse pits may be formed by the concentration of the current even in hydrochloric acid electrolysis, if a hydrochloric acid electrolyte containing acetic acid or sulfuric acid is used, even pits can be formed on the entire surface without forming coarse pits.

[3] The support for the lithographic printing plate in the third embodiment according to the present invention is a support for a lithographic printing plate, wherein a surface area ratio obtained from three-dimensional data which can be found by measuring 512×512 points in 5 μm square on the surface with an atomic force microscope meets the following requirements (4-i) to (4-iii):

(4-i) a surface area ratio $\Delta S^{5(5)}$ is 20 to 90%, (4-ii) a surface area ratio $\Delta S^{5(0.2-5)}$ is 5 to 40%, and (4-iii) a surface area ratio $\Delta S^{5(0.02-0.2)}$ is 15 to 70%.

Where, $\Delta S^{5(5)}$ (hereinafter, also called "$\Delta S^5$") is a surface area ratio which can be found and expressed by the following equation (4-1) from an actual area $S_x^5$ obtained from the three-point estimate from the three-dimensional data and a geometrically measured area $S_o$, $$\Delta S^{5(5)}=[(S_x^5-S_o)/S_o]\times 100(\%) \tag{4-1}$$

where $\Delta S^{5(0.2-5)}$ is a surface area ratio found and expressed by the following equation (4-2) from an actual area $S_x^{5(02-5)}$ obtained after extracting components of wavelength of 0.02 μm or more and 5 μm or less from the aforementioned three-dimensional data and a geometrically measured area $S_o$.

$$\Delta S^{5(0.2-5)}=[(S_x^{5(0.2-5)}-S_o)/S_o]\times 100(\%) \tag{4-2}$$

$\Delta S^{5(0.02-0.2)}$ is a surface area ratio found and expressed by the following equation (4-3) from an actual area $S_x^{5(0.02-0.2)}$ obtained after extracting components of wavelength of 0.02 μm or more and 0.2 μm or less from the aforementioned three-dimensional data and a geometrically measured area $S_o$.

$$\Delta S^{5(0.02-0.2)}=[(S_x^{5(0.02-0.2)}-S_o)/S_o]\times 100(\%) \tag{4-3}$$

Surface area ratio ΔS is, as to be described later in detail, found by the following equation from an actual area $S_x$ obtained from the three-point estimate from the aforementioned three-dimensional data and a geometrically measured area $S_o$.

$$\Delta S=[(S_x-S_o)/S_o]\times 100(\%)$$

Surface area ratio ΔS is a factor which shows the extent of increment in the actual area $S_x$ by graining treatment to the geometrically measured area $S_o$. ΔS being large means that the specific surface area is large, and a contact area with the image recording layer becomes large.

Although the reason is not clearly known why the specific surface shape of the support plate according to the present invention is excellent in UV-curing ink resistance and scum resistance, the inventors herein have thought as follows. Considered the asperities in the all wavelengths in the measurement range of 5 μm square to be $\Delta S^5$ in a predetermined range, and divided it to two components, one, the range of $\Delta S^{5(0.02\text{-}0.2)}$ with the wavelength of 0.02 to 0.2 μm and the other, the range of $\Delta S^{5(0.2\text{-}5)}$ with wavelength of 0.2 to 5 μm. By shifting the range of $\Delta S^{5(0.02\text{-}0.2)}$ to relatively larger side comparing to the range of $\Delta S^{5(0.2\text{-}5)}$, surface shape having the predetermined quantity of a small-wavelength fine structure can be obtained, thereby UV-curing ink resistance is increased. In addition, they have thought that although scum generally tends to be worsened if there is a fine structure on the surface, UV-curing ink resistance is excellent and scum hardly occurs by balancing between ΔS's of the aforementioned specific areas.

In the present invention, (4-i) surface area ratio $\Delta S^{5(5)}$ is preferably to be 30 to 85% and more preferably to be 40 to 85%.

(4-ii) surface area ratio $\Delta S^{5(0.2\text{-}5)}$ is preferably to be 7 to 37% and more preferably to be 7 to 35%.

(4-iii) surface area ratio $\Delta S^{5(0.02\text{-}0.2)}$ is preferably to be 20 to 65% and more preferably to be 30 to 60%.

In addition, if Cu content in the aluminum plate used for the support plate is determined to be 0.000 to 0.05 wt %, the aforementioned surface shape can be easily obtained even if the surface treatment conditions are not severely controlled. Cu content is preferably 0.001 to be 0.04 wt % and more preferably to be 0.001 to 0.025 wt %.

Further, if mean surface roughness $R_a$ measured by the contact stylus type surface roughness meter of the support plate is determined to be 0.40 to 0.70, the attachment of ink to the non-image areas in the halftone dot areas (halftone dot spreading) can be prevented. $R_a$ is preferably 0.42 to 0.70 and more preferably to be 0.45 to 0.65.

In the support for the lithographic printing plate according to the present invention, below described are the methods to find $\Delta S^{50(50)}$, $\Delta S^{50(2\text{-}50)}$, $\Delta S^{50(0.2\text{-}2)}$, $\Delta S^{5(5)}$, $\Delta S^{5(0.2\text{-}5)}$, $\Delta S^{5}{}_{(0.02\text{-}0.2)}$ and Ra.

Measurement of Surface Shape with Atomic Force Microscope

For surface shape, (1) 512×512 points are measured in 50 μm square on the surface, or (2) 512×512 points are measured in 5 μm square on the surface, for example, each condition as shown in the embodiment with the atomic force microscope and the three-dimensional data (f(x, y)) is found.

<1> Measurement of $\Delta S^{50(50)}(\Delta S^{50})$

Three adjacent points are extracted by using the found three-dimensional data (f(x, y)), and then the sum of the areas of micro triangles formed by the three points is found to be actual area $S_x^{50}$. Surface area ratio $\Delta S^{50}$ is found by the following equation from the obtained actual area $S_x^{50}$ and the geometrically measured area $S_o^{50}$, $$\Delta S^{50(50)}(\Delta S^{50})=[(S_x^{50}-S_o^{50})/S_o^{50}]\times 100(\%) \quad (1\text{-}1)$$

<1> The Three-dimensional Data Obtained in the Aforementioned (1) as it Stands is Used to Calculate Surface Area Ratio $\Delta S^{50(50)}$.

<2> Calculation of Surface Area Ratio $\Delta S^{50(2\text{-}50)}$.

The components with wavelength of 2 μm or more and 50 μm or less extracted from the three-dimensional data found in the aforementioned (1) are used. In order to extract the components with wavelength of 2 μm or more and 50 μm or less, Fast Fourier transformation is performed on the three-dimensional data found in the aforementioned (1) to find the frequency distribution, and next, by performing Fourier inverse transformation after removing the components with wavelength of less than 2 μm.

<3> Calculation of Surface Area Ratio $\Delta S^{50(0.2\text{-}2)}$

The components with wavelength of 0.2 μm or more and 2 μm or less extracted from the three-dimensional data found in the aforementioned (1) are used. In order to extract the components with wavelength of 0.2 μm or more and 2 μm or less, Fast Fourier transformation is performed on the three-dimensional data found in the aforementioned (1) to find the frequency distribution, and next, by performing Fourier inverse transformation after removing the components with wavelength of less than 0.2 μm and more than 2 μm.

<4> Calculation of $a45^{50(0.2\text{-}2)}$

The components with wavelength of 0.2 μm or more and 2 μm extracted from the three-dimensional data based on the measurement of 50 μm square on the surface found in the aforementioned (1) are used. In order to extract the components with wavelength of 0.2 μm or more and 2 μm or less, fast Fourier transformation is performed on the thee-dimensional data found in the aforementioned (1) to find the frequency distribution, next, the components with wavelength of less than 0.2 μm and more than 2 μm are removed, then the calculation is performed by performing Fourier inverse transformation. By using the three-dimensional data (f(x, y)) obtained by the extractions and compensations, the micro triangle formed by each reference point and the adjacent second point and third point in a predetermined direction (for example, the right and the lower) and the angle formed by the micro triangle and the reference plane are calculated with respect to each reference point. The number of reference points of micro triangle gradients of 45° or more is divided by the number of all the reference points (the number which is the number of the points which do not have two adjacent points in a predetermined direction deducted from 512×512 points which is the number of all the data, that is, 511×511 points) to calculate area ratio $a45^{50(0.2\text{-}2)}$ of the area of gradient of 45° or more.

<5> Measurement of $\Delta S^5$

By using the three-dimensional data (f(x, y)) found in the aforementioned (2), three adjacent points are extracted, and then the total sum of the areas of micro triangles formed by the three points is found to be actual area $S_x$. Surface area ratio $\Delta S^5$ is found by the following equation from the obtained actual area $S_x$ and geometrically measured area $S_o$. $S_o$ is 5×5 μm².

$$\Delta S^{5(5)}(\Delta S^5)=[(S_x^5-S_o)/S_o]\times 100(\%) \quad (4\text{-}1)$$

(i) The three-dimensional data found in the aforementioned (2) as it stands is used to calculate $\Delta S^{5(5)}(\Delta S^5)$.

<6> Calculation of $a45^{5(0.02\text{-}0.2)}$

The components with wavelength of 0.02 μm or more and 0.2 μm or less extracted from the three-dimensional data based on the measurement of 5 μm square on the surface found in the aforementioned (2) are used. The components with wavelength of 0.02 μm or more and 0.2 μm or less are extracted by performing fast Fourier transformation on the three-dimensional data found in the aforementioned (2) to find the frequency distribution and next, by performing Fourier inverse transformation after removing the components with wavelength of 0.02 μm or more and 0.2 μm or less. By using the three-dimensional data (f(x, y)) obtained by the extractions and compensations, the micro triangle formed by each reference point and the adjacent second point and third point in a predetermined direction (for example, the right and the lower) and the angle formed by the micro triangle and the reference plane are calculated with respect to each reference point. The number of reference points of micro triangle gradients of 45° or more is divided by the number of all the reference points (the number which is the number of the points which do not have two adjacent points in a predetermined direction deducted from 512×512 points which is the number of all the data, that is, 511×511 points) to calculate area ratio $a45^{5(0.02\text{-}0.2)}$ of the area of gradient of 45° or more.

<7> Calculation of Surface Area Ratio $\Delta S^{5(0.2\text{-}5)}$

The components with wavelength of 0.2 μm or more and 5 μm or less extracted from the three-dimensional data found in the aforementioned (2) are used. The components with wavelength of 0.2 μm or more and 5 μm or less are extracted by performing fast Fourier transformation on the three-dimensional data found in the aforementioned (2) to find the frequency distribution and next, by performing Fourier inverse transformation after removing the components with wavelength of less than 0.2 μm.

The three-dimensional data (f(x, y)) found above is used to extract the three adjacent points and the total sum of micro triangles formed by the three points is found to be actual area $S_x^{5(0.2\text{-}5)}$. Surface area ratio $\Delta S^5$ is found by the following equation from the obtained actual area $S_x^{5(0.2\text{-}5)}$ and geometrically measured area $S_o$.

$$\Delta S^{5(0.2\text{-}5)}=[(S_x^{5(0.2\text{-}5)}-S_o)/S_o]\times 100(\%) \qquad (4\text{-}2)$$

<8> Calculation of Surface Area Ratio $\Delta S^{5(0.02\text{-}0.2)}$

The components with wavelength of 0.02 μm or more and 0.2 μm or less extracted from the three-dimensional data found in the aforementioned (2) are used. The components with wavelength of 0.02 μm or more and 0.2 μm or less are extracted by performing fast Fourier transformation on the three-dimensional data found in the aforementioned (2) to find the frequency distribution and next, by performing Fourier inverse transformation after removing the components with wavelength of less than 0.02 μm and more than 0.2 μm.

The three-dimensional data (f(x, y)) found above is used to extract the three adjacent points and the total sum of micro triangles formed by the three points is found to be actual area $S_x^{5(0.02\text{-}0.2)}$. Surface area ratio $\Delta S^5$ is found by the following equation from the obtained actual area $S_x^{5(0.02\text{-}0.2)}$ and geometrically measured area $S_o$.

$$\Delta S^{5(0.02\text{-}0.2)}=[(S_x^{5(0.02\text{-}0.2)}-S_o)/S_o]\times 100(\%) \qquad (4\text{-}3)$$

(3) $R_a$

Surface $R_a$ is calculated by the following equation using the three-dimensional data (f(x, y)) found in the aforementioned (1).

$$R_a = \frac{1}{S_0}\int_0^{L_x}\int_0^{L_y}|f(x,y)|dx\cdot dy \qquad \text{[Equation 1]}$$

Where, $L_x$ and $L_y$ each represents the length of the side in x direction and y direction of the measured area (rectangle). In the present invention, $L_x=L_y=5$ μm. Since $S_o$ is a geometrically measured area, $S_o=L_x\times L_y=25$ μm$^2$.

(4) Number of Recess with Specific Depth

<1> Number of Recess with Depth of 4 μm or More

Three-dimensional data is found by scanning 400 μm square on the surface in every 0.01 μm in a non-contact manner with a laser microscope and the number of recesses with depth of 4 μm or more in the three-dimensional data is counted.

<2> Number of Recess with Depth of 3 μm or More

Three-dimensional data is found to similarly count the number of recesses with depth of 3 μm or more.

<Surface Treatment>

A support for a lithographic printing plate according to the present invention is one that, by performing surface treatment on an aluminum plate as to be described later, the aforementioned surface grain shape on a surface is formed on the surface of the aluminum plate. While the support for a lithographic printing plate according to the present invention is obtained by performing at least graining treatment on an aluminum plate, the producing method of the support is not particularly limited and may include various processes other than graining treatment.

As typical methods of forming the aforementioned grain shape on a surface, the following methods will be explained:

a method by sequentially performing mechanical graining treatment, alkali etching treatment, desmutting treatment with an acid, and electrochemical graining treatment with an electrolyte on an aluminum plate;

a method by performing mechanical graining treatment, alkali etching treatment, desmutting treatment with an acid, and electrochemical graining treatment using different electrolyte on an aluminum plate plural times;

a method by sequentially performing alkali etching treatment, desmutting treatment with an acid, and electrochemical graining treatment with an electrolyte on an aluminum plate; and a method by performing alkali etching treatment, desmutting treatment with an acid, and electrochemical graining treatment using different electrolyte on an aluminum plate plural times.

However, according to the present invention, the method is not limited to the above. In these methods, alkali etching treatment and desmutting treatment may be further performed after the electrochemical graining treatment as above is performed.

As graining treatments preferably used for surface area ratios $\Delta S^{50(50)}$, $\Delta S^{50(2\text{-}50)}$, $\Delta S^{50(0.2\text{-}2)}$, $\Delta S^{5(5)}$, $\Delta S^{5(0.2\text{-}5)}$, $\Delta S^{5(0.02\text{-}0.2)}$ which are the factors showing surface shape, gradients $a45^{50(0.2\text{-}2)}$ $a45^{5(0.02\text{-}0.2)}$ and $R_a$, and the number of recesses with depth of 3 μm or more or 4 μm or more each to meet a certain condition, taken up are the following methods although it depends upon other treatments (alkali etching treatment or the like):

1) For example, a method where the total sum of the quantities of electricity which is applied to the anodic reaction is increased in the electrolytic graining treatment using an electrolyte mainly containing nitric acid, the method where a mechanical graining treatment using brush rolls and an abrasive having a certain median diameter or the like are exemplified.

The support for the lithographic printing plate according to the present invention which is obtained by these methods or the like and where the surface area ratios showing a surface shape $\Delta S^{50(50)}$, $\Delta S^{50(2-50)}$, $\Delta S^{50(0.2-2)}$ each meet a specific condition is excellent in left-plate scum resistance since ink spreading in the halftone dot areas hardly occurs irrespective of the kinds of inks or fountain solutions when the lithographic printing plate is prepared. Further, if the number of recesses with a certain depth meets a specific condition, the generation of dot residual layers can be particularly suppressed although the conditions of exposure and development are tightened.

2) Although the following methods as the typical methods for forming graining of the aforementioned surfaces are taken up, the present invention is not limited to these methods. Examples are, a method where a mechanical graining treatment, an alkali etching treatment, a desmutting treatment with an acid and an electrochemical graining treatment using an electrolyte are sequentially performed on an aluminum plate, a method where a mechanical graining treatment, an alkali etching treatment, a desmutting treatment with an acid and an electrochemical graining treatment using different electrolytes are performed on an aluminum plate plural times, a method where an alkali etching treatment, a desmutting treatment with an acid and an electrochemical graining treatment using an electrolyte are sequentially performed on an aluminum plate, and a method where an alkali etching treatment, a desmutting treatment with an acid and an electrochemical graining treatment using different electrolytes are performed on an aluminum plate plural times.

In these methods, an alkali etching treatment and the desmutting treatment with the acid may be further performed after the aforementioned electrochemical graining treatment.

The support for the lithographic printing plate according to the present invention where each of the aforementioned factors obtained by these methods meets the specific conditions is excellent in press life and scum resistance and an inadequate inking in the solid areas hardly occurs if a coated recycled paper is used, when the lithographic printing plate is prepared. In addition, the support for the lithographic printing plate according to the present invention is preferably excellent in cleaner press life and dot residual layers hardly occur.

3) Another typical methods for forming graining of the aforementioned surfaces will be explained.

A mechanical graining treatment, a hydrochloric acid electrolysis (electrochemical graining treatment with hydrochloric acid as main constituent), a nitric acid electrolysis (electrochemical graining treatment with nitric acid as main constituent) or the like can be used. In addition, a method where an electrochemical graining treatment with nitric acid as main constituent and an electrochemical graining treatment with hydrochloric acid as main constituent, and a treatment combining these treatments are sequentially performed may be taken up. Further, a method where only the electrochemical graining treatment using electrochemical graining treatment with hydrochloric acid as main constituent and increasing the total sum of the quantities of electricity which is applied to the anodic reaction is performed may also be taken up.

The support for the lithographic printing plate according to the present invention, where each of the aforementioned factors showing the surface shapes obtained by these methods meets the specific condition, is excellent in the adhesion between the photosensitive layer and the support plate, particularly, excellent in UV-curing ink resistance in the image areas, and scum hardly occurs, particularly, the gap scum resistance in the non-image areas is excellent, when the lithographic printing plate is prepared.

Each process of the surface treatments are described in detail below.

<Mechanical Graining Treatment>

Mechanical graining treatment is effective means for graining treatment since it is capable of forming a surface with average wavelength 5 to 100 μm asperities at a lower cost than electrochemical graining treatment.

Mechanical graining treatment that can be used includes wire brush graining treatment by scratching an aluminum plate surface with metal wire, ball graining treatment by performing graining on an aluminum plate surface with an abrasive ball and an abrasive agent, and brush graining treatment by performing graining on a surface with a nylon brush and an abrasive agent as described in JP 6-135175 A and JP 50-40047 B. In addition, a transfer method in which a surface with asperities is pressed onto an aluminum plate can be also employed. That is, applicable methods include those described in JP 55-74898 A, JP 60-36195 A, JP 60-36196 A JP 60-203496 A, JP 61-162351 A and JP 4-30358 B, as well as a method described in JP 6-55871 A characterized by performing transfer several times, and a method described in JP 6-024168 A characterized in that the surface is elastic.

As to be described later, in the brush graining method, it is preferable that a plurality of nylon brushes is used. Although various kinds of abrasives later described can be used, it is preferable that pumice stone, silica sand, aluminum hydroxide or the like are used. In addition, it is preferable that in the transfer method, the revolution and load or the like of a drive motor which rotates the brushes are properly controlled.

It is also possible to use a method by repeatedly performing transfer using a transfer roller on which fine asperities are etched with electric discharge machining, shot blast, laser, plasma etching or the like, and a method in which a surface with asperities on which fine particles are applied is allowed to contact with an aluminum plate, pressure is applied on that several times, and transfer of the asperity pattern equivalent to average diameter of fine particles is repeatedly performed on an aluminum plate several times. A method of providing fine asperities to a transfer roll includes methods known to the public, as described in JP 3-8635 A, JP 3-66404 A, JP 63-65017 A or the like. In addition, fine grooves may be engraved on the surface of the transfer roll from two directions with a dice, a turning tool, a laser or the like to form square asperities on the surface. Also, publicly known etching treatment or the like may be performed on the surface of the transfer roll such that the formed square asperities become round.

In addition, hardening, hard chrome plating or the like may be performed to increase hardness of a surface.

Moreover, mechanical graining treatment may include methods as described in JP 61-162351 A, JP 63-104889 A or the like.

In the present invention, each method as above may be used in combination with others, taking productivity or the like into consideration. It is preferable that these mechanical graining treatments are performed before electrochemical graining treatment.

Hereafter, brush graining treatment preferably used as mechanical graining treatment will be explained.

Brush graining treatment generally uses a roller-like brush in which a lot of synthetic resin brushes made of synthetic resin such as nylon (trademark), polypropylene and PVC resin are implanted on the surface of a cylindrical drum, and treatment is performed by scrubbing one or both of the surfaces of the aluminum plate while spraying a slurry containing an abrasive over a rotating roller-like brush. An abrasive roller on which an abrasive layer is provided may be also used in place of the roller-like brush and slurry.

When a roller-like brush is used, bending elastic modulus is preferably 10,000 to 40,000 kg/cm$^2$, more preferably 15,000 to 35,000 kg/cm$^2$, and a treatment should use a brush with bristle elasticity of, preferably 500 g or less, more preferably 400 g or less. The diameter of the bristle is generally 0.2 to 0.9 mm. While the length of the bristle can be appropriately determined depending on the outer diameter of the roller-like brush and the diameter of the drum, it is generally 10 to 100 mm.

In the present invention, it is preferable that a plurality of nylon brushes are used, concretely using three brushes or more is more preferable and using four brushes or more is particularly preferable. By controlling the number of brushes, the wavelength components of recesses formed on the surface of an aluminum plate can be controlled.

In addition, it is preferable that the load of the drive motor which rotates the brushes, when compared to the load before the motor presses the brush rollers against the aluminum plate, is 1 kW plus or more, more preferably 2 kW plus and still more preferably 8 kW plus or more. By controlling the load, the depth of a recess formed on the surface of the aluminum plate can be controlled. It is preferable that the revolution of the brush is 100 rpm or more and 200 rpm or more is particularly preferable.

As to an abrasive, a publicly known one may be used. Abrasives that can be used include pumice, silica sand, aluminum hydroxide, alumina powder, silicon carbide, silicon nitride, volcanic ash, carborundum, emery, and mixtures thereof. Pumice and silica sand are preferable among them. Silica sand is particularly preferable because of excellent graining efficiency since it is harder than pumice and is not easily broken compared to pumice. In addition, aluminum hydroxide is preferable where local deep recesses are undesirable because its grain will break when excess load is added.

A preferable average particle median diameter of the abrasive is 3 to 50 μm, and more preferably 6 to 45 μm, from the viewpoint of excellent graining efficiency and that graining pitch can be narrowed. By controlling the average particle diameter of the abrasive, the depth of the recesses formed on the surface of the aluminum plate can be controlled.

An abrasive is, for example, suspended in water and used as a slurry. Beside abrasives, thickener, dispersant (for example, surfactant), antiseptic agent or the like may be contained in the slurry. It is preferable that the specific gravity of a slurry is 0.5 to 2.

As an apparatus suitable for mechanical graining treatment, for example, includes an apparatus as described in JP 50-40047 B.

Below described is one example of the transfer method used as the mechanical graining treatment.

Generally, the transfer method is a method where the asperities on the reduction roll (transfer roll), being embossed by shot blast treatment, engraving, laser beam machining or pattern etching or the like, is transferred to an aluminum plate, or an article where an abrasive, glass beads, or the like are coated on a paper or a plastic sheet is superimposed and rolled to transfer onto an aluminum plate, thus graining is performed on the aluminum plate.

As the transfer method, the following methods or the like can be used besides the aforementioned methods.

A method to set the draft of the transfer roller lower to avoid such problems as transfer roll service life and aluminum plate extension (JP 7-205565 A); a method to execute transfer process more than once, preferably four times or more, so as the machining accuracy of cylindricity of the transfer roll not needed to be considerd, minimize the extension of aluminum plate and to get sufficiently uniform grained surface as an aluminum support for the lithographic printing plate (JP 6-55871 A); a method to prepare a randomly arranged and evenly distributed asperities at low cost by performing graining by pressing the aluminum plate by one to six times on a metal having chemically grained surface with higher hardness than that of the aluminum plate for the lithographic printing plate (JP 6-171258 A); a method to form a large number of pressed recesses in random direction on the surface of the aluminum plate (JP 6-171256 A, JP 6-171259 A);

a method to transfer a sufficiently uniform asperities from a grained metal surface which is prepared as follows. Coating and drying a photoresist or a plastic resin on metal surface, expose or irradiate with infrared rays, laser beam or the like to prepare a resist pattern, and then chemical etching or the like is performed to get a grained metal surface (JP 6-171262 A), or the like.

In the transfer method, the size of protrusion on the transfer roll (surface roughness of the transfer roll) and the size of recess on the aluminum plate transferred from the transfer roll (surface roughness of the aluminum plate after transferred) are nearly the same.

Therefore, in order to form the predetermined surface roughness on the aluminum plate, it is enough to use the transfer roll, or the like, having nearly the same surface roughness as required above.

The transfer roller is constituted by giving fine protrusions to the surface of a core metal of the roller made of, for example, SUS 304, SUS 316, SCM steel, SUJ steel or SS 41 or the like with thermal spraying, a laser beam, machining, or the like.

In a thermal spraying method, ceramic particles or ceramic sintered body of about 10 to 60 μm in diameter is plasma sprayed, DJ gun thermal sprayed or wire thermal sprayed and coated on the surface of the roller about 0.1 to 0.6 mm thick, and the surface is polished to obtain the surface roughness. Preferable kind of ceramics, is an oxide ceramic mainly of chromium oxide or a nitride ceramic mainly of silicon nitride from the point of strength. In addition, polishing treatment is performed since the surface of the roller formed by thermal spraying is coarse.

Method to form protrusions utilizing laser beam on the other hand, is based on that laser irradiated surface of the roller will melt and swell. Longitudinal and lateral grooves meeting in right or some slant angled lattice are formed on the roller surface by laser beam thus forming protrusions independently cut off from one to the other by both grooves.

Lasers like $CO_2$ laser, YAG laser, excimer laser or the like may be used. In addition, the width of the groove formed is different depending upon the kind of laser. Therefore, it is necessary to select the kind of laser according to the desired protrusion size, and if the transfer roller with finer asperities is required, short-wavelength lasers such as excimer laser should be. In addition, the transfer roller is finished with a diamond grindstone or ceramic grindstone, or an abrasive paper containing these materials.

Similarly, square asperities may be also formed by engraving fine grooves in a lattice-like pattern in two directions on the surface of the roller using a dice or a turning tool.

The aluminum plate or aluminum alloy plate is inserted into a gap between the transfer roller and a metallic roller with mirror finished surface (back-up roll) and an asperity-pattern of protrusions on the transfer roller is transferred under linear drafting force of about 3 to 30 kg/mm. Further, the details are described in JP 7-205565 A.

The conditions of a graining treatment in the transfer method can be suitably controlled depending upon a desired surface roughness.

<Electrochemical Graining Treatment>

Electrochemical graining treatment may use en electrolyte used for electrochemical graining treatment with an ordinary alternating current. Particularly, a structure of asperities that satisfies aforesaid factors may be formed on a surface by using an electrolyte mainly composed of hydrochloric acid or nitric acid.

As electrolytic graining according to the present invention, it is preferable that the first and second electrolytic treatments are performed in an acid solution in alternating corrugated current before and after the cathode electrolytic treatment. Hydrogen gas is generated on the surface of an aluminum plate to produce smut by cathode electrolytic treatment, thereby creating an even surface condition. This allows the even graining treatment to be performed at the time of electrolytic treatment by the subsequent alternating corrugated current.

This electrolytic graining treatment can follow the electrochemical graining treatment (electrolytic graining treatment) as described in JP 48-28123 B and GB 896,563, for example. Although this electrolytic graining treatment uses sine waveform alternating current, a special waveform may be used as described in JP 52-58602 A. In addition, a waveform as described in JP 3-79799 A can be also used. Moreover, the methods as described in JP 55-158298 A, JP 56-28898 A, JP 52-58602 A, JP 52-152302 A, JP 54-85802 A, JP 60-190392 A, JP 58-120531 A, JP 63-176187 A, JP 1-5889 A, JP 1-280590 A, JP 1-118489 A, JP 1-148592 A, JP 1-178496 A, JP 1-188315 A, JP 1-154797 A, JP 2-235794 A, JP 3-260100 A, JP 3-253600 A, JP 4-72079 A, JP 4-72098 A, JP 3-267400 A and JP 1-141094 A may also be used. In addition, besides the aforementioned, it is also possible to perform electrolysis using a special frequency alternating current proposed as a method for producing an electrolytic capacitor. It is described for example in U.S. Pat. No. 4,276,129 and U.S. Pat. No. 4,676,879.

While an electrolytic bath and power supply are variously proposed, those as described in U.S. Pat. No. 4,203,637, JP 56-123400 A, JP 57-59770 A, JP 53-12738 A, JP 53-32821 A, JP 53-32822 A, JP 53-32823 A, JP 55-122896 A, JP 55-132884 A, JP 62-127500 A, JP 1-52100 A, JP 1-52098 A, JP 60-67700 A, JP 1-230800 A, JP 3-257199 A or the like can be used.

In addition, those as described in JP 52-58602 A, JP 52-152302 A, JP 53-12738 A, JP 53-12739 A, JP 53-32821 A, JP 53-32822 A, JP 53-32833 A, JP 53-32824 A, JP 53-32825 A, JP 54-85802 A, JP 55-122896 A, JP 55-132884 A, JP 48-28123 B, JP 51-7081 B, JP 52-133838 A, JP 52-133840 A, JP 52-133844 A, JP 52-133845 A, JP 53-149135 A, JP 54-146234 A or the like can be used.

As an acid solution that is an electrolyte, in addition to nitric acid and hydrochloric acid, the electrolytes as described in U.S. Pat. No. 4,671,859, U.S. Pat. No. 4,661,219, U.S. Pat. No. 4,618,405, U.S. Pat. No. 4,600,482, U.S. Pat. No. 4,566,960, U.S. Pat. No. 4,566,958, U.S. Pat. No. 4,566,959, U.S. Pat. No. 4,416,972, U.S. Pat. No. 4,374,710, U.S. Pat. No. 4,336,113 and U.S. Pat. No. 4,184,932 or the like can be used.

The concentration of an acid solution should preferably be 0.5 to 2.5 wt %, and it should particularly preferably be 0.7 to 2.0 wt %, taking the use for desmutting treatment into account. In addition, the temperature of a solution should preferably be 20 to 80° C., and should more preferably be 30 to 60° C.

An aqueous solution mainly composed of hydrochloric acid or nitric acid can be used in such a manner that at least one of nitrates having nitrate ion such as aluminum nitrate, sodium nitrate and ammonium nitrate or chlorides having chlorine ion such as aluminum chloride, sodium chloride and ammonium chloride is added in a range from 1 g/L to a saturation point to hydrochloric acid or nitric acid aqueous solution of the concentration 1 to 100 g/L. In addition, metals contained in aluminum alloys such as iron, copper, manganese, nickel, titanium, magnesium and silicon may be dissolved in the aqueous solution mainly composed of hydrochloric acid or nitric acid. It is preferable that a solution in which aluminum chloride, aluminum nitrate and the like are added to an aqueous solution containing hydrochloric acid or nitric acid of the concentration of 0.5 to 2 wt % so as to allow aluminum ion of 0.3 to 5 wt % to be contained is used. Here, "mainly containing" means that for an aqueous solution containing a component which is the major substance to an entire aqueous solution, 30 wt % or more or preferably 50 wt % or more of the component is contained. Hereinafter, the same principle is applied to other components.

In addition, it is possible to perform the even graining also on an aluminum plate containing a large amount of copper by adding a compound capable of forming a complex with copper and using it. Compounds capable of forming a complex with copper include ammonia; amines obtained by substituting hydrogen atom in ammonia by hydrocarbon group (aliphatic and aromatic, or the like) or the like, such as methylamine, ethylamine, dimethylamine, diethylamine, trimethylamine, cyclohexylamine, triethanolamine, triisopropanolamine, EDTA (ethylenediaminetetraacetic acid); metal carbonates such as sodium carbonate, potassium carbonate and potassium hydrogencarbonate. Ammonium salts such as ammonium nitrate, ammonium chloride, ammonium sulfate, ammonium phosphate and ammonium carbonate are also included.

The temperature should preferably be 10 to 60° C., and should more preferably be 20 to 50° C.

Figure 2:
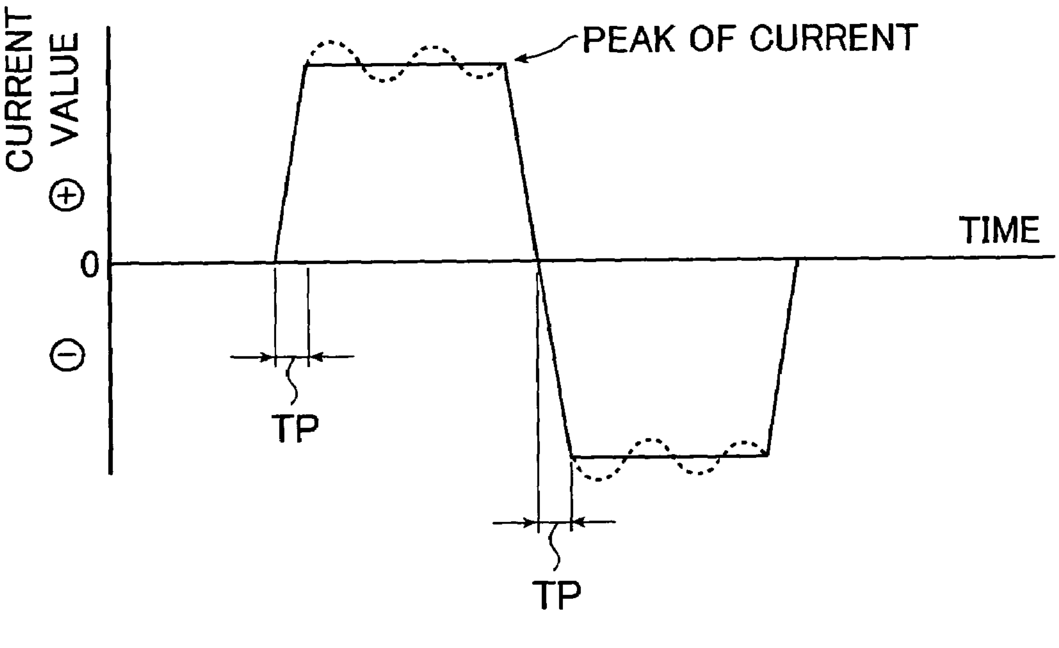
FIG. 2 is a graph showing an example of an trapezoidal current waveform view used for electrochemical graining treatment used in production of a support for a lithographic printing plate according to the present invention.

Alternating current power supply wave used for electrochemical graining treatment is not particularly limited and sine wave, square wave, trapezoidal wave, triangle wave or the like are used. Square wave or trapezoidal wave is preferable, and trapezoidal wave is particularly preferable. Trapezoidal wave is one as shown in FIG. 2. It is preferable that with this trapezoidal wave, a time required for the current to reach a peak from zero (TP) is 0.3 to 3 msec. If it is less than 0.3 msec, non-uniformity in treatment called chatter mark is easily generated in a direction perpendicular to a traveling direction of an aluminum plate. If TP exceeds 3 msec, particularly when nitric acid electrolyte is used, an aluminum plate is easily affected by trace components in an electrolyte represented by ammonium ion or the like that spontaneously increase in electrochemical graining treatment, thus the even graining is not easily performed. As a result, scum resistance is likely to deteriorate when a lithographic printing plate is prepared.

Trapezoidal wave alternating current with a duty ratio of 1:2 to 2:1 is usable, and duty ratio should preferably be 1:1 in an indirect power supplying system dispensing with a conductor roll for aluminum as described in JP 5-195300 A.

While trapezoidal wave alternating current with a frequency of 0.1 to 120 Hz is usable, frequency should preferably be 50 to 70 Hz in terms of equipment. If it is lower than 50 Hz, the carbon electrode of a main electrode is easily dissolved, and if it is higher than 70 Hz, it is easily affected by the components of inductance in a power supply circuit, thus an electric power cost increases.

Figure 3:
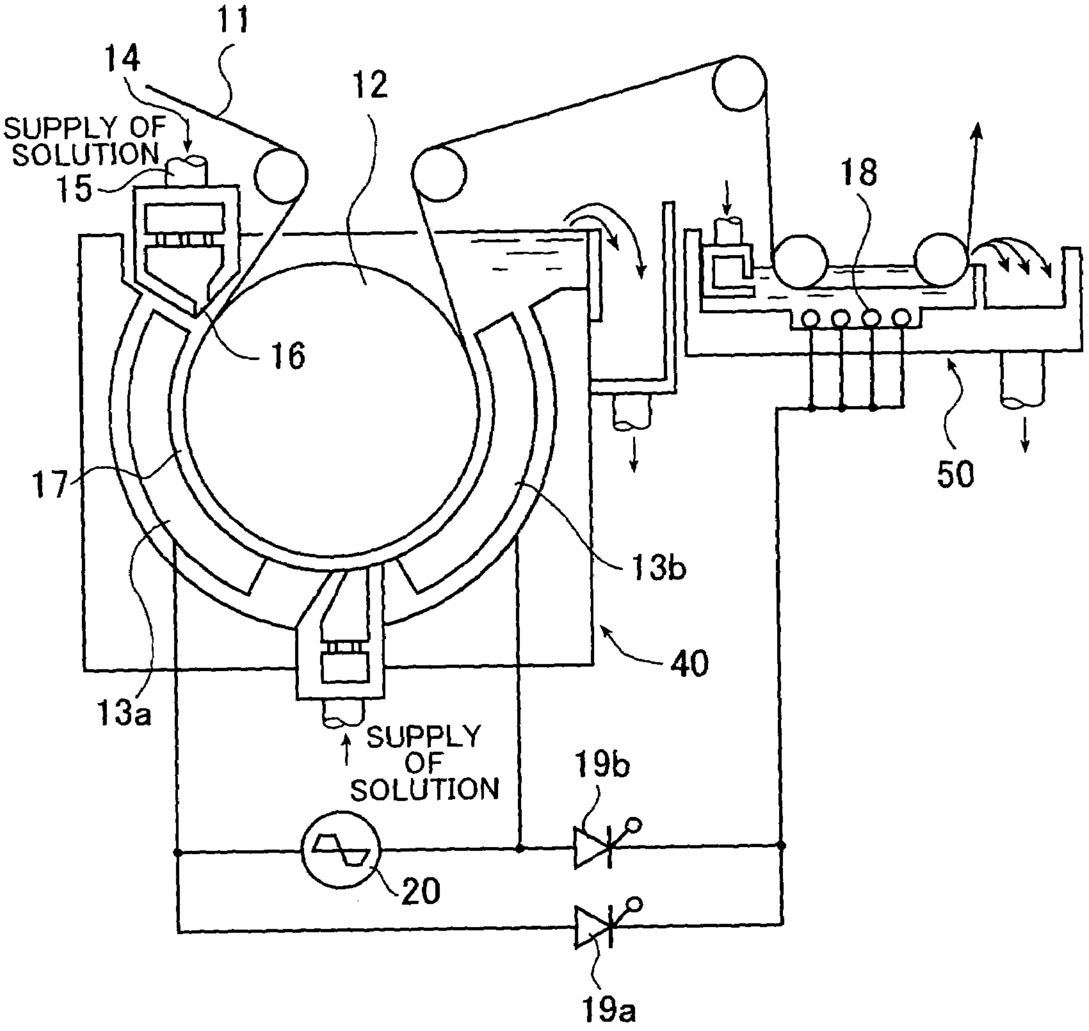
FIG. 3 is a side view showing an example of a radial cell used for electrochemical graining treatment using alternating current used in production of a support for a lithographic printing plate according to the present invention.

One or more alternating current power supplies can be connected to an electrolytic bath. It is preferable that, as shown in FIG. 3, an auxiliary anode is installed and a part of alternating current is shunted, for the purpose of controlling the current ratio at the anode and the cathode of alternating current applied to an aluminum plate opposite to the main electrode so as to perform the even graining and dissolve carbon in the main electrode. In FIG. 3, a reference numeral 11 denotes an aluminum plate, 12 denotes a radial drum roller, 13*a* and 13*b* denote main electrodes, 14 denotes an electrolyte, 15 denotes an electrolyte feed port, 16 denotes a slit, 17 denotes an electrolyte path, 18 denotes an auxiliary anode, 19*a* and 19*b* denote thyristors, 20 denotes an alternating current power supply, 40 denotes a main electrolytic bath, and 50 denotes an auxiliary anodizing bath. By shunting a part of a current value to an auxiliary anode provided in a bath different from the two main electrode baths in the two main electrodes as direct current via a rectifying device or a switching device, the ratio of a current value used for an anodizing reaction with respect to a current value used for a cathodic reaction reacting on the aluminum plate opposite to the main electrode can be controlled. It is preferable that the ratio of amount of electricity (amount of electricity at cathode/amount of electricity at anode) used for an anodizing reaction and a cathodic reaction on the aluminum plate opposite to the main electrode is 0.3 to 0.95.

While an electrolytic bath used for a publicly known surface treatment such as a vertical type, a flat type and a radial type is usable, a radial type electrolytic bath as described in JP 5-195300 A is particularly preferable. The direction of travel of an electrolyte which passes through the electrolytic bath may be parallel with or perpendicular to that of an aluminum web.

(Nitric Acid Electrolysis)

A pit with average aperture diameter of 0.5 to 5 μm can be formed by performing electrochemical graining treatment using an electrolyte mainly composed of nitric acid. If amount of electricity is, however, relatively large, an electrolytic reaction concentrates to produce a honeycomb pit with an aperture diameter of even more than 5 μm.

In order to obtain graining like this, the total amount of electricity used for the anodizing reaction of the aluminum plate at a time when an electrolytic reaction is completed should preferably be 1 to 1,000 C/dm$^2$, and should more preferably be 50 to 400 C/dm$^2$. It is preferable that current density is 5 to 100 A/dm$^2$ in this case.

For example, the grained structure with small undulation with average aperture diameter of 0.2 μm or less can be also formed by performing an electrolysis at 30 to 60° C. using as a nitric acid electrolyte with high concentration of 15 to 35 wt % or by performing an electrolysis at high temperature of 80° C. or higher using as a nitric acid electrolyte with concentration of 0.7 to 2 wt %. As a result, the ranges of $\Delta S^{5(5)}$, $\Delta S^{5(0.2\text{-}5)}$, $\Delta S^{5(0.02\text{-}0.2)}$ can be controlled in a well balanced condition.

(Hydrochloric Acid Electrolysis)

The electrolytic graining treatment with the electrolyte mainly containing hydrochloric acid can produce several kinds of asperities depending upon the total sum of quantities of electricity which is applied to the anodic reaction.

In an area where the total sum of quantity of electricity is small, since hydrochloric acid per se strongly dissolves aluminum, it is possible to form fine asperities on the surface by merely applying a little electrolysis thereto. The fine asperities are of the average aperture diameter of 0.01 to 0.2 μm and are uniformly produced on the entire surface of the aluminum plate. In order to obtain such graining, the total sum of quantity of electricity which is applied to the anodic reaction of the aluminum plate at the time when the electrolytic reaction is completed is preferably 1 to 100 C/dm$^2$ and more preferably 20 to 70 C/dm$^2$. It is preferable that the current density is 10 to 50 A/dm$^2$.

In such an electrochemical graining treatment with the electrolyte mainly containing hydrochloric acid, big undulations like craters are formed by increasing the total sum of quantities of electricity which is applied to the anodic reaction to 100 to 2,000 C/dm$^2$ and fine asperities with average aperture diameter of 0.01 to 0.4 μm are produced on the entire surface by superimposing the same on the crater-like undulations.

It is preferable that cathode electrolytic treatment is performed on the aluminum plate between the first and the second electrolytic graining treatments in electrolyte containing nitric acid, hydrochloric acid or the like, as mentioned above. This cathode electrolytic treatment allows smut to be produced on the surface of the aluminum plate and hydrogen gas to be generated, and thus electrolytic graining treatment can be more evenly performed. This cathodic electrolytic treatment is performed with cathodic amount of electricity preferably 3 to 80 C/dm$^2$ in an acid solution, and more preferably 5 to 30 C/dm$^2$. If cathodic amount of electricity is less than 3 C/dm$^2$, an amount of attached smut may be insufficient, and if it exceeds 80 C/dm$^2$, an amount of attached smut may be too excessive. Both cases are not preferable. In addition, the cathodic electrolytic treatment may use the same electrolytes used for the first and second electrolytic graining treatments, or a different electrolyte.

<Alkali Etching Treatment>

Alkali etching treatment is a treatment that dissolves a surface layer of the aforementioned aluminum plate by allowing the aluminum plate to contact with an alkali solution.

Alkali etching treatment performed before electrolytic graining treatment is performed to remove rolling oil, dirt, naturally oxidized layer or the like on the surface of the aluminum plate (rolled aluminum) if mechanical graining treatment is not performed thereon, and is performed to dissolve edge portions of asperities generated by mechanical graining treatment to change steeper asperities on the surface to a smoother surge surface if mechanical graining treatment has been already performed.

If mechanical graining treatment is not performed before alkali etching treatment, an amount of etching should preferably be 0.1 to 10 $g/m^2$, and more preferably be 1 to 5 $g/m^2$. If an amount of etching is less than 0.1 $g/m^2$, pits can not be formed evenly to produce non-uniformity in electrolytic graining treatment to be performed later since rolling oil, dirt, naturally oxidized layer or the like may be left on the surface of a plate. On the other hand, if an amount of etching is 1 to 10 $g/m^2$, rolling oil, dirt, naturally oxidized layer and the like are fully removed from the surface of a plate. If an amount of etching exceeds that range, it is less economical.

If mechanical graining treatment is performed before alkali etching treatment, an amount of etching should preferably be 3 to 20 $g/m^2$, and more preferably be 5 to 15 $g/m^2$. If an amount of etching is less than 3 $g/m^2$, the asperities formed by mechanical graining treatment or the like may not be sometimes smoothed, and pits can not be evenly formed in electrolytic treatment to be performed later. In addition, dirt may deteriorate during printing. On the other hand, if an amount of etching exceeds 20 $g/m^2$, asperities structure will disappear.

Alkali etching treatment just after electrolytic graining treatment is performed to dissolve smut produced in an acid electrolyte and to dissolve edge portions of pits formed by electrolytic graining treatment.

An optimum amount of etching varies since a pit formed by electrolytic graining treatment varies according to the kind of an electrolyte. However, it is preferable that an amount of etching in alkali etching treatment after electrolytic graining treatment is 0.1 to 5 $g/m^2$. If a nitric acid electrolyte is used, it is necessary to set an amount of etching to a greater amount than that of the case a hydrochloric acid electrolyte is used.

If electrolytic graining treatment is performed several times, alkali etching treatment can be performed after each electrolytic graining treatment as required.

Alkali used for an alkali solution includes, for example, caustic alkali and alkali metal salts. More specifically, it includes sodium hydroxide and potassium hydroxide. In addition, it includes silicates of alkali metals such as sodium metasilicate, sodium silicate, potassium metasilicate, potassium silicate; carbonates of alkali metals such as sodium carbonate and potassium carbonate; aluminates of alkali metals such as sodium aluminate and potassium aluminate; aldonates of alkali metals such as sodium gluconates and potassium gluconates; hydrogenphosphates of alkali metals such as disodium hydrogen phosphate, dipotassium hydrogen phosphate, sodium dihydrogenphosphate and potassium dihydrogenphosphate. Among them a caustic alkali solution and a solution containing both a caustic alkali and aluminate of alkali metal are preferable from a viewpoint that the rate of etching is fast and costs are lower. Particularly, an aqueous solution of sodium hydroxide is preferable.

The concentration of an alkali solution can be determined in accordance with an amount of etching, and it should preferably be 1 to 50 wt %, more preferably be 10 to 35 wt %. If aluminum ion is dissolved in an alkali aqueous solution, the concentration of aluminum ion should preferably be 0.01 to 10 wt %, more preferably be 3 to 8 wt %. It is preferable that the temperature of an alkali aqueous solution is 20 to 90° C., and treatment time is 1 to 120 seconds.

Methods of allowing an aluminum plate to contact with an alkali solution include, for example, a method by allowing an aluminum plate to pass through a bath containing an alkali solution, a method by allowing an aluminum plate to be immersed in a bath containing an alkali solution, and a method by spraying an alkali solution over the surface of an aluminum plate.

<Desmutting Treatment>

After electrolytic graining treatment or alkali etching treatment is performed, pickling (desmutting treatment) is performed to remove dirt (smut) left on the surface of a plate. Acids that are used include nitric acid, sulfuric acid, phosphoric acid, chromic acid, hydrofluoric acid, borofluoric acid or the like.

The desmutting treatment is performed by allowing the aluminum plate to contact with an acid solution of concentration 0.5 to 30 wt % of hydrochloric acid, nitric acid, sulfuric acid or the like (aluminum ion 0.01 to 5 wt % contained). A method of allowing an aluminum plate to contact with an acid solution include, for example, a method by allowing an aluminum plate to pass through a bath containing an acid solution, a method by allowing an aluminum plate to be immersed in a bath containing an acid solution, and a method by spraying an acid solution over the surface of an aluminum plate.

In desmutting treatment, an acid solution that can be used includes a wastewater of an aqueous solution mainly containing nitric acid or an aqueous solution mainly containing hydrochloric acid discharged in the electrolytic treatment described above, or a wastewater of an aqueous solution mainly containing sulfuric acid discharged in anodizing treatment as to be described later.

It is preferable that a solution temperature of desmutting is 25 to 90° C. It is preferable that a treatment time is 1 to 180 seconds. Aluminum and aluminum alloy components may be dissolved in an acid solution used for desmutting treatment.

<Anodizing Treatment>

It is preferable that anodizing treatment is further performed on the aluminum plate treated as mentioned above. Anodizing treatment can be performed in a method conventionally performed in this field. In this case, for example, an anodized layer can be formed by applying current by allowing the aluminum plate to function as an anode in a solution with concentration of sulfuric acid of 50 to 300 g/L and the concentration of aluminum of 5 wt % or less.

A solution containing sulfuric acid, phosphoric acid, chromic acid, oxalic acid, sulfamic acid, benzenesulfonic acid, amidosulfonic acid or the like, may be used, separately or two or more in combination, in anodizing treatment.

In this case, components normally contained in an aluminum plate, an electrode, city water, an underground water or the like may be contained in an electrolyte. A second and a third components may be further added thereto. The second and third components for example may include metal ions such as Na, K, Mg, Li, Ca, Ti, Al, V, Cr, Mn, Fe, Co, Ni, Cu and Zn; cation such as ammonium ion; anion such as nitrate ion, carbonate ion, chloride ion, phosphate ion, fluoride ion, sulfite ion, titanate ion, silicate ion and borate ion. Each of them may be contained in the concentration of approximately 0 to 10,000 ppm in an electrolyte.

Although the conditions of anodizing treatment can not be indiscriminately determined since they are variously changed according to an electrolyte to be used, generally appropriate conditions are the concentration of an electrolyte: 1 to 80 wt %, the temperature of an electrolyte: 5 to 70° C., the current density: 0.5 to 60 $A/dm^2$, the voltage: 1 to 100

V and the time of electrolysis: 15 seconds to 50 minutes and they are so controlled as to produce the desired amount of an anodized layer.

In addition, the methods as described in JP 54-81133 A, JP 57-47894 A, JP 57-51289 A, JP 57-51290 A, JP 57-54300 A, JP 57-136596 A, JP 58-107498 A, JP 60-200256 A, JP 62-136596 A, JP 63-176494 A, JP 4-176897 A, JP 4-280997 A, JP 6-207299 A, JP 5-24377 A, JP 5-32083 A, JP 5-125597 A, JP 5-195291 A or the like may be used.

It is preferable that a sulfuric acid solution is used as an electrolyte as described in JP 54-12853 A and JP 48-45303 A among others. It is preferable that the concentration of sulfuric acid in an electrolyte is 10 to 300 g/L (1 to 30 wt %). In addition, the concentration of aluminum ion should preferably be 1 to 25 g/L (0.1 to 2.5 wt %), and more preferably be 2 to 10 g/L (0.2 to 1 wt %). An electrolyte like this can be prepared by adding aluminum sulfate or the like to a diluted sulfuric acid of concentration 50 to 200 g/L, for example.

If anodizing treatment is performed in an electrolyte containing sulfuric acid, either of direct current or alternating current can be impressed in-between an aluminum plate and an opposite pole.

If direct current is impressed to an aluminum plate, the current density should preferably be 1 to 60 A/dm$^2$, and more preferably to be 5 to 40 A/dm$^2$.

If anodizing treatment is continuously performed, it is preferable that in order to prevent so-called "burning" caused by concentration of current on a part of an aluminum plate, current with low current density of 5 to 10 A/dm$^2$ be allowed to flow at the beginning of anodizing treatment and the current density be increased to 30 to 50 A/dm$^2$ or higher while anodizing treatment progresses.

It is preferable that if anodizing treatment is continuously performed, the treatment is performed by an electric power supplying system via solution, in which electric power is supplied to an aluminum plate through an electrolyte.

A porous layer having many holes called pore (micropore) is obtained by performing anodizing treatment under the conditions like this. Generally, its average pore diameter is about 5 to 50 nm, and its average pore density is about 300 to 800 pieces/μm$^2$.

It is preferable that the quantity of an anodized layer is 1 to 5 g/m$^2$. If it is less than 1 g/m$^2$, the plate is likely to be scratched. On the other hand, if it exceeds 5 g/m$^2$, a large quantity of electricity is required for manufacturing, thus it is economically disadvantageous. It is more preferable that the quantity of the anodized layer is 1.5 to 4 g/m$^2$. In addition, it is also preferable that the anodizing treatment is performed under the condition that the difference in quantity of anodized layer between the central area and the vicinity of the edges of the aluminum plate is 1 g/m$^2$ or less.

Device for electrolysis as described in JP 48-26638 A, JP 47-18739 A, JP 58-24517 B or the like may be used for anodizing treatment.

Figure 4:
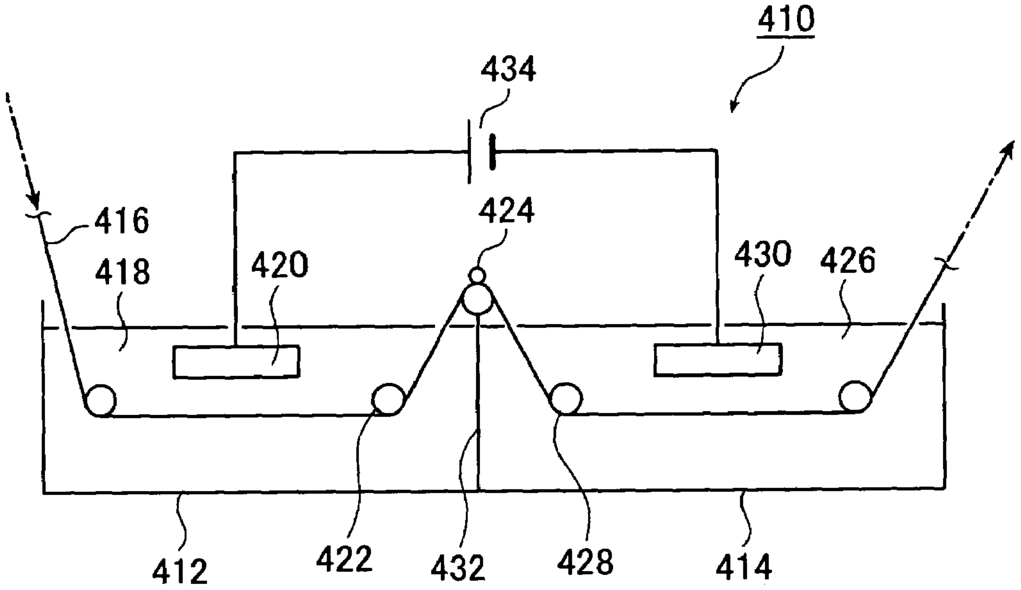
FIG. 4 is a schematic view of an anodizing device used for anodizing treatment used in production of a support for a lithographic printing plate according to the present invention.

Among those, device as shown in FIG. 4 is preferably used. FIG. 4 is a schematic view that shows one example of device which performs anodizing treatment on an aluminum plate surface. In anodizing device 410, an aluminum plate 416 is transferred as shown by an arrow in FIG. 4. The aluminum plate 416 is positively charged by a feeding electrode 420 in a feeding bath 412 where an electrolyte 418 is stored. Then, after the aluminum plate 416 is transferred upward by a roller 422 in the feeding bath 412 and the direction of the transfer is changed downward by a nip roller 424, the plate is transferred to an electrolytic cell 414 where an electrolyte 426 is stored and the direction of the plate is changed to a horizontal direction by a roller 428. Thereafter, an anodized layer is formed on the surface of the aluminum plate 416 by negatively charging the plate with an electrolytic electrode 430, and the aluminum plate 416 coming out of the electrolytic cell 414 is transferred to a following process. In the anodizing treatment device 410, direction changeover means is composed of the roller 422, the nip roller 424, and the roller 428. The aluminum plate 416 is transferred in a mountain shape and a reversed U shape between the feeding bath 412 and the electrolytic cell 414 by the rollers 422, 424 and 428. The feeding electrode 420 and the electrolytic electrode 430 are connected to a direct current power supply 434.

The anodizing device 410 as shown in FIG. 4 is characterized by the feeding bath 412 and the electrolytic cell 414 partitioned with a bath wall 432, and transferring the aluminum plate 416 in a mountain shape and in a reversed U shape between the baths, thereby length of the aluminum plate 416 between the baths can be made to the shortest. Consequently, since the entire length of the anodizing device 410 can be shortened, the cost of equipment can be reduced. In addition, since the aluminum plate 416 is transferred in a mountain shape and a reversed U shape, the necessity of forming an aperture in the bath walls of each of the baths 412 and 414, through which the aluminum plate 416 is allowed to pass, is eliminated. Therefore, an amount of a supplied solution required to keep a solution level at a predetermined level in each bath 412 and 414 can be reduced, so that the operation cost can be reduced.

<Sealing Treatment>

In the present invention, sealing treatment for sealing micropores existent in the anodized layer may be performed as required. Sealing treatment may be performed according to the publicly known methods such as boiling water treatment, hot water treatment, steaming treatment, sodium silicate treatment, nitrite treatment and ammonium acetate treatment. The sealing treatment may be performed with the device and by the methods as described in JP 56-12518 B, JP 4-4194 A, JP 5-202496 A, JP 5-179482 A or the like, for example.

<Treatment for Water Wettability>

Treatment for water wettability may be performed after anodizing treatment or sealing treatment is performed. Treatments for water wettability include potassium fluorozirconate treatment as described in U.S. Pat. No. 2,946,638, phosphomolybdate treatment as described in U.S. Pat. No. 3,201,247, alkyltitanate treatment as described in GB 1,108,559, polyacrylic acid treatment as described in DE 1,091,433, polyvinylphosphonic acid treatment as described in DE 1,134,093 and GB 1,230,447, phosphonic acid treatment as described in JP 44-6409 B, phytic acid treatment as described in U.S. Pat. No. 3,307,951, treatment with a salt of lipophilic organic high-molecular compound and divalent metal as described in JP 58-16893 A and JP 58-18291 A, treatment providing undercoat layer of hydrophilic cellulose (for example, carboxylmethylcellulose) containing water-soluble metallic salts (for example, zinc acetate) as described in U.S. Pat. No. 3,860,426 and treatment to apply undercoating of water-soluble polymer having sulfo group as described in JP 59-101651 A.

In addition, compounds used for undercoating treatment include phosphate as described in JP 62-019494 A, water-soluble epoxide compound as described in JP 62-033692 A, phosphoric acid-treated starch as described in JP 62-097892 A, diamines as described in JP 63-056498 A, inorganic amino acid or organic amino acid as described in JP 63-130391 A, organic phosphonic acid containing carboxy group or hydroxy group as described in JP 63-145092 A, compounds containing amino group and phosphonic group as described in JP 63-165183 A, specified carboxylic acid derivatives as described in JP 2-316290 A, phosphoric ester as described in JP 3-215095 A, compounds having one amino group and one oxoacid group of phosphor as described in JP 3-261592 A, aliphatic or aromatic sulfonic acid such as phenylsulfonic acid as described in JP 5-246171 A, compounds containing S atom such like thiosalicylic acid as described in JP 1-307745 A, and compounds having oxoacid group of phosphor or the like as described in JP 4-282637 A.

In addition, coloring by an acid dye as described in JP 60-64352 A can be performed.

It is preferable that treatment for water wettability is performed by a method of dipping an object into an aqueous solution containing alkali metal silicates such as sodium silicate and potassium silicate, a method of forming a hydrophilic undercoat layer by applying a hydrophilic vinylpolmer or a hydrophilic compound or the like.

Treatment for water wettability with an aqueous solution containing alkali metal silicates such as sodium silicate and potassium silicate can be performed in accordance with the methods and steps as described in U.S. Pat. No. 2,714,066 and U.S. Pat. No. 3,181,461.

Alkali metal silicates include sodium silicate, potassium silicate and lithium silicate. An aqueous solution containing alkali metal silicates may contain an appropriate amount of sodium hydroxide, potassium hydroxide, lithium hydroxide or the like.

In addition, an aqueous solution containing alkali metal silicates may contain alkaline-earth metallic salts or fourth group (IVA group) metallic salts. Examples of alkaline-earth metallic salts are nitrates such as calcium nitrate, strontium nitrate, magnesium nitrate and barium nitrate; sulfates; chlorides; phosphates; acetates; oxalates; and borates. Examples of fourth group (IVA group) metallic salts are titanium tetrachloride, titanium trichloride, potassium titanium fluoride, potassium titanium oxalate, titanium sulfate, titanium tetraiodide, zirconium oxide chloride, zirconium dioxide, zirconium oxychloride, zirconium tetrachloride. These alkali earth metallic salts and fourth group (IVA group) metallic salts can be used in either of a single form or combinations of two kinds or more.

An amount of Si adsorbed by alkali metal silicate treatment can be measured with a flourescent X-ray analyzer, and its adsorbed amount should preferably be 1.0 to 15.0 mg/m$^2$.

An effect to improve insolubility of the surface of a support for a lithographic printing plate with respect to an alkali developer can be obtained by performing this alkali metal silicate treatment. Further, since the elution of an aluminum component into the developer is suppressed, the generation of a development scum attributable to the exhaust of the developer can be reduced.

Since the support for the lithographic printing plate according to the present invention is excellent in the well balanced numeric value ranges of each factor showing the surface shape and the adhesion between the image recording layer and the support for the lithographic printing plate as mentioned above, a sufficient press life can be obtained although an alkali metal silicate treatment is performed. Therefore, although alkali metal silicate treatment is performed, there is no anxiety about the possible deterioration in the press life, a user can enjoy only the advantages such as the improvement of scum resistance and the reduction of development scum generation.

In addition, treatment for water wettability by forming a hydrophilic undercoat layer may be performed under the conditions and steps as described in JP 59-101651 A and JP 60-149491 A.

An example of hydrophilic vinylpolymer to be used in this method is a copolymer of vinylpolymerizable compound having sulfo group such as polyvinylsulfonic acid and p-styrenesulfonic acid that has sulfo group, with ordinary vinylpolymerizable compound such as (meta)acrylic alkylester. In addition, an example of a hydrophilic compound to be used in the method is a compound containing at least one selected from a group consisting of —$NH_2$ group, —COOH group, and sulfo group.

<Water Washing Treatment>

It is preferable that water washing is performed after aforementioned each treatment is finished. Pure water, well water, city water or the like can be used for water washing. It is acceptable that a nip device may be used to prevent the treatment solution from being brought into the next process.

<Aluminum Plate (Rolled Aluminum)>

An aluminum plate publicly known can be used to obtain a support for a lithographic printing plate according to the present invention. An aluminum plate used in the present invention is a metal having an aluminum which is stable in dimension as a main component, and is composed of aluminum or aluminum alloy. Besides a pure aluminum plate, an alloy plate containing aluminum as main component and a trace of different elements can be used.

In the present invention, various substrates composed of the aforementioned aluminum or aluminum alloys, and referred to collectively as an aluminum plate. Different elements that may be contained in the aluminum alloy are silicon, iron, manganese, copper, magnesium, chromium, zinc, bismuth, nickel, titanium or the like, and the contents of the different elements in the alloy is 10 wt % or less.

Like this, the composition of an aluminum plate used in the present invention is not specified. For example, the materials conventionally known as described in Aluminum Handbook 4th edition (published by Japan Light Metal Association in 1990) that are, for example, an Al—Mn system aluminum plate of JIS A1050, JIS A1100, JIS A1070, JIS A3004 containing Mn, the internationally registered alloy 3103A and the like can be appropriately utilized. In addition, an Al—Mg system alloy and Al—Mn—Mg system alloy (JIS A3005) into which 0.1 wt % or more of Mg is added can be used to increase tensile strength. Moreover, Al—Zr system or Al—Si system alloy containing Zr or Si can be used. Further, Al—Mg—Si system alloy can also be used.

In addition, the scrap of these aluminum materials may be used.

With regard to JIS1050 materials, the arts that have been proposed by the inventors of the present invention are described in JP 59-153861 A, JP 61-51395 A, JP 62-146694 A, JP 60-215725 A, JP 60-215726 A, JP 60-215727 A, JP 60-216728 A, JP 61-272367 A, JP 58-11759 A, JP 58-42493 A, JP 58-221254 A, JP 62-148295 A, JP 4-254545 A, JP 4-165041 A, JP 3-68939 B, JP 3-234594 A, JP 1-47545 B and JP 62-140894 A. Also known are the arts which have been described in JP 1-35910 B and JP 55-28874 B.

With regard to JIS1070 materials, the arts which have been proposed by the inventors of the present invention are described in JP 7-81264 A, JP 7-305133 A, JP 8-49034 A, JP 8-73974 A, JP 8-108659 A and JP 8-92679 A.

Cu is an element which is contained in JIS 2000 series, 4000 series materials and is relatively likely to make a solid solution with aluminum.

Cu content affects electrochemical graining treatment. Particularly, if Cu content exceeds 0.05 wt %, uneven pits with maximum height $R_{max}$ of 8.0 μm over may be produced.

In the second embodiment according to the present invention, Cu content is preferably 0.00 to 0.05 wt % and more preferably 0.001 to 0.04 wt %.

With regard to Al—Mg system alloys, the arts which have been proposed by the inventors of the present invention are described in JP 62-5080 B, JP 63-60823 B, JP 3-61753 B, JP 60-203496 A, JP 60-203497 A, JP 3-11635 B, JP 61-274993 A, JP 62-23794 A, JP 63-47347 A, JP 63-47348 A, JP 63-47349 A, JP 64-1293 A, JP 63-135294 A, JP 63-87288 A, JP 4-73392 B, JP 7-100844 B, JP 62-149856 A, JP 4-73394 B, JP 62-181191 A, JP 5-76530 B, JP 63-30294 A and JP 6-37116 B. The arts are also described in JP 2-215599 A and JP 61-201747 A.

With regard to Al—Mn system alloys, the arts which have been proposed by the inventors of the present invention are described in JP 60-230951 A, JP 1-306288 A and JP 2-293189 A. In addition, others are also described in JP 54-42284 B, JP 4-19290 B, JP 4-19291 B, JP 4-19292 B, JP 61-35995 A, JP 64-51992 A, JP 4-226394 A, U.S. Pat. No. 5,009,722, U.S. Pat. No. 5,028,276 or the like.

With regard to Al—Mn—Mg system alloys, the arts which have been proposed by the inventors of the present invention are described in JP 62-86143 A and JP 3-222796 A. In addition, others are also described in JP 63-60824 B, JP 60-63346 A, JP 60-63347 A, JP 1-293350 A, EP 223,737, U.S. Pat. No. 4,818,300, GB 1,222,777 or the like.

With regard to Al—Zr system alloys, the arts which have been proposed by the inventors of the present invention are described in JP 63-15978 B and JP 61-51395 A. In addition, others are also described in JP 63-143234 A, JP 63-143235 A, or the like.

With regard to Al—Mg—Si system alloys, the arts are described in GB 1,421,710.

The following method can be, for example, employed to prepare a plate from an aluminum alloy. First, purification treatment is performed on a molten aluminum alloy adjusted to a predetermined alloy component content and is cast according to a normal method. For the purification treatment, in order to remove unnecessary gases such as hydrogen from the molten metal, such treatment is performed as flux treatment; degassing treatment with argon gas, chlorine gas or the like; filtering treatment using a so-called rigid media filter such as ceramics tube filter, ceramics form filter or the like, a filter using alumina flake, alunima ball and the like as filtering media, or a glass cloth filter, or the like; or a combination of degassing treatment with filtering treatment.

It is preferable that purification treatment as aforementioned be performed to prevent defects caused by foreign matter such as non-metal inclusion in the molten metal and oxides, and defects caused by gasses dissolved in the molten metal. Filtering of a molten metal is described in JP 6-57432 A, JP 3-162530 A, JP 5-140659 A, JP 4-231425 A, JP 4-276031 A, JP 5-311261 A, JP 6-136466 A or the like. In addition, degassing of a molten metal is described in JP 5-51659 A, JP 5-49148 A or the like. The inventors of the present invention have also proposed an art regarding degassing of a molten metal in JP 7-40017 A.

Next, the molten metal to which purification treatment is performed as aforementioned is cast. Casting uses either a method by using a solid mold represented by DC casting method and a method by using a drive mold represented by continuous casting method.

In DC casting, a molten metal is solidified at a cooling rate within a range of 0.5 to 30° C./sec. If the cooling rate is less than 1° C./sec, many large intermetallic compounds may be formed. When DC casting is performed, an ingot plate 300 to 800 mm in thickness can be produced. Chipping is performed on this ingot according to a usual method as required, and normally, it is cut by 1 to 30 mm of the surface layer, and by 1 to 10 mm preferably. Before and after the chipping, soaking treatment is performed as required. If heat soaking treatment is performed, heat treatment is performed at 450 to 620° C. for 1 to 48 hours so as not to allow intermetallic compounds to become larger. If treatment time is shorter than 1 hour, an effect of soaking treatment may be insufficient.

Thereafter, hot rolling and cold rolling are performed to produce the rolled plate of an aluminum plate. It is appropriate that the starting temperature of hot rolling is 350 to 500° C. Before or after, or halfway of hot rolling, intermediate annealing may be performed. The conditions of intermediate annealing are either a heating with a batch type annealer at 280 to 600° C. for 2 to 20 hours, more preferably at 350 to 500° C. for 2 to 10 hours, or a heating with continuous type annealer at 400 to 600° C. for 6 minutes or less, and more preferably at 450 to 550° C. for 2 minutes or less. Crystal structure can be fined by heating an aluminum plate with a continuous type annealer at a temperature rising speed of 10 to 200° C./sec.

With regard to an aluminum plate finished to a plate of a predetermined thickness, for example, 0.1 to 0.5 mm by the aforementioned processes, in addition, the flatness thereof may be improved with correcting device such as a roller leveler and a tension leveler. Although improvement of the flatness may be performed after the aluminum plate is cut into a sheet form, it is preferable that the improvement is performed in a continuous coil form to enhance its productivity. In addition, an aluminum plate is allowed to pass through a slitter line in order to process the aluminum plate to have a predetermined plate width. Further, a thin oil film may be provided on the surface of the aluminum plate to prevent generation of scratches due to friction between the aluminum plates. An oil film which is volatile or non-volatile is appropriately used as required.

On the other hand, methods to be industrially used as continuous casting method include two-roll method (Hunter method), method with cold rolling represented by 3C method, two-belt method (Huxley method), a method using a cooling belt and a cooling block represented by Alysuisse caster II model. If continuous casting method is used, solidification develops at a cooling rate in a range of 100 to 1,000° C./sec. Continuous casting method is characterized by that the solid solubility percentage of an alloy component with respect to an aluminum matrix can be increased since it generally has a faster cooling speed than that of DC casting method. With regard to continuous casting method, the arts which have been proposed by the inventors of the present invention are described in JP 3-79798 A, JP 5-201166 A, JP 5-156414 A, JP 6-262203 A, JP 6-122949 A, JP 6-210406 A, JP 6-26308 A and the like.

If continuous casting method is performed, for example, with a method using a chill roll such as Hunter method or the like, since a cast plate of thickness 1 to 10 mm can be directly and continuously produced, resulting in a merit that hot rolling process can be omitted. In addition, if a method with a cooling belt such as Huxley method or the like is used, a cast plate of thickness 10 to 50 mm can be produced. Generally, a continuously cast rolled-plate of thickness 1 to 10 mm can be obtained by disposing a hot roll just after casting to continuously roll a plate.

These continuously cast rolled plates are as discussed in DC casting, subjected to treatments such as cold rolling, intermediate annealing, improvement of flatness, treatment of slit and the like, and are finally finished into a predetermined thickness, for example, 0.1 to 0.5 mm. With regard to intermediate annealing and cold rolling conditions in case where continuous casting method is used, the arts which have been proposed by the inventors of the present invention are described in JP 6-220593 A, JP 6-210308 A, JP 7-54111 A, JP 8-92709 A and the like.

An aluminum plate thus manufactured is expected to have various characteristics as mentioned below.

It is preferable, regarding strength of an aluminum plate, 0.2% proof stress is 140 MPa or more to obtain an elasticity required as a support for a lithographic printing plate. In addition, it is preferable that 0.2% proof stress after heating treatment is performed at 270° C. for 3 to 10 minutes is 80 MPa or more, more preferably 100 Mpa or more in order to obtain an elasticity to some extent even if burning treatment is performed. Particularly, if an aluminum plate requires some elasticity, an aluminum material to which Mg or Mn is added can be adopted. Attachment of a plate to the plate cylinder of a printing machine, however, deteriorates if the elasticity is enhanced. For that reason, the material and an amount of the trace components to be added are appropriately selected in accordance with the application. In connection with this, the arts which have been proposed by the inventors of the present invention are described in JP 7-126820 A, JP 62-140894 A and the like.

Since the crystal texture of an aluminum plate surface may cause a defect in surface quality if chemical graining treatment or electrochemical graining treatment is performed on an aluminum plate, it is preferable that the crystal texture graining on the surface is not too coarse. The width of a particle of the crystal texture on the surface of an aluminum plate should preferably be 200 μm or less, more preferably be 100 μm or less, and further preferably be 50 μm or less. In addition, the length of a particle of the crystal texture should preferably be 5,000 μm or less, more preferably be 1,000 μm or less, and further preferably be 500 μm or less. In connection with these, the arts which have been proposed by the inventors of the present invention are described in JP 6-218495 A, JP 7-39906 A, JP 7-124609 A and the like.

Since a defect in surface quality may take place due to the uneven distribution of an alloy component on the surface of an aluminum plate if chemical graining treatment or electrochemical graining treatment is performed, it is preferable that the distribution of the alloy component is not too uneven on the surface. With regard to these, the arts which have been proposed by the inventors of the present invention are described in JP 6-48058 A, JP 5-301478 A, JP 7-132689 A and the like.

The size or density of intermetallic compounds in an aluminum plate may affect chemical graining treatment or electrochemical graining treatment. In connection with this, the arts which have been proposed by the inventors of the present invention are described in JP 7-138687 A, JP 4-254545 A and the like.

According to the present invention, for use, the aluminum plate as described above can be provided with asperities by laminating rolling, transfer or the like in the final rolling process.

An aluminum plate used in the present invention is a continuous belt-like sheet material or plate material. That is, an aluminum web is acceptable and a sheet material cut into a size or the like corresponding to a presensitized plate to be shipped as a product is also acceptable.

Since a scratch on the surface of an aluminum plate may become a defect when processed into a support for a lithographic printing plate, it is necessary to suppress as much as possible the generation of a scratch at a stage before a surface treatment process to produce a support for a lithographic printing plate is performed. For that reason, it is preferable that an aluminum plate is packed in a stable form and style so as to avoid being scratched.

In case of aluminum web, as a style of packing aluminum, for example, a hard board and a felt sheet are laid over a pallet made of iron, toroidal cardboards are put at both ends of a product, the entire product is wrapped with a polymer tube, a wooden toroid is inserted into the inner diameter section of a coil, the periphery of a coil is covered with a felt sheet, the product is fastened with a hoop iron and the indication is attached to its periphery. In addition, a polyethylene film can be used for packing material, and a needle felt and a hard board can be used for buffer. There are various packing forms besides this one. As long as it provides stable and scratch-free transportation or the like, packing is not limited to this method mentioned above.

The thickness of an aluminum plate used in the present invention is about 0.1 to 0.6 mm, preferably be 0.15 to 0.4 mm, and more preferably be 0.2 to 0.3 mm. This thickness can be appropriately changed according to the size of a printing machine, the size of a printing plate, the request of a user, or the like.

[Presensitized Plate]

The presensitized plate using a support for a lithographic printing plate and its manufacturing process according to the present invention will be described below.

<Undercoat Layer>

For example, inorganic undercoat layers such as water-soluble metal salts of zinc borates or organic undercoat layer may be provided before providing the image recording layer on the support for the lithographic printing plate obtained according to the present invention.

Taken up as organic compounds used for the undercoat layer for example are carboxymethylcellulose; dextrin; gum Arabic; polymer or copolymer having sulfonic acid group at the side chain thereof; polyacrylic acid; phosphonic acid having amino group such as 2-aminoethylphosphonic acid; organic phosphonic acid which may have a substitute such as phenylphosphonic acid, naphtylphosphonic acid, alkylphosphonic acid, glycerophosphonic acid, methylendiphosphonic acid, ethylendiphosphonic acid; organic phosphoric acid which may have a substitute such as phenylphosphoric acid, naphtylphosphoric acid, alkylphosphoric acid, glycerophosphoric acid; organic phosphinic acid which may have a substitute such as phenylphosphinic acid, naphtylphosphinic acid, alkylphosphinic acid, glycerophosphinic acid; amino acid such as glycine and β-alanine; hydrochloric acid salt of amine having hydroxy group such as triethanolamine hydrochloric acid salt; and a yellow dye. These compounds may be singly used or may be used by mixing two kinds or more.

An organic undercoat layer is provided by coating a solution where the aforementioned organic compounds are dissolved in water or in an organic solvent such as methanol, ethanol and methyl ethyl ketone or their mixed solvent over an aluminum plate and drying the same. It is preferable that the concentration of the solution where the aforementioned organic compounds are dissolved is 0.005 to 10 wt %. The coating method is not particularly limited, but any method of bar coater coating, roller coating, spray coating, curtain coating or the like can be used.

It is preferable that the coated quantity of the organic undercoat layer after drying is 2 to 200 $mg/m^2$, and more preferably 5 to 100 $mg/m^2$. If the quantity stays within the aforementioned range, press life is further improved.

<Image Recording Layer>

A presensitized plate according to the present invention can be prepared by providing an image recording layer such as a photosensitive layer, thermosensitive layer or the like on the support for a lithographic printing plate. Preferred examples of an image recording layer includes conventional positive type, conventional negative type, photopolymer type, thermal positive type, thermal negative type and development-dispensable type that can be developed on a printer Described below in details are these preferred image recording layers.

<Conventional Positive Type>

As a photosensitive resin composition used suitably for the photosensitive layer of the conventional positive type, for example, a composition containing an o-quinonediazide compound and a high-molecular compound that is water-insoluble and alkali-soluble (hereinafter, referred to as an "alkali-soluble high-molecular compound") is cited.

Cited as such an o-quinonediazide compound are, for example, the ester of 1,2-naphthoquinone-2-diazide-5-sulfonyl chloride and phenol-formaldehyde resin or cresol-formaldehyde resin, and the ester of 1,2-naphthoquinone-2-diazide-5-sulfonyl chloride and pyrogallol-acetone resin, which is described in U.S. Pat. No. 3,635,709.

Cited as such an alkali-soluble high-molecular compound are, for example, phenol-formaldehyde resin, cresol-formaldehyde resin, phenol-cresol-formaldehyde co-condensed resin, polyhydroxystyrene, copolymer of N-(4-hydroxyphenyl)methacrylamide, carboxy group-containing polymer described in JP 7-36184 A, acrylic resin containing a phenolic hydroxy group as described in JP 51-34711 A, acrylic resin containing a sulfonamide group described in JP 2-866 A, and urethane resin.

Furthermore, it is preferable that a compound such as a sensitivity regulator, a printing agent and a dye, which are described in [0024] to [0027] of JP 7-92660 A, or a surfactant for improving a coating property of the photosensitive resin composition, which is as described in [0031] of JP 7-92660 A, is added to the photosensitive resin composition.

<Conventional Negative Type>

As a photosensitive resin composition used suitably for the photosensitive layer of the conventional negative type, a composition containing diazo resin and a high-molecular compound that is alkali-soluble or alkali-swellable (hereinafter, referred to as a "binding agent") is cited.

Cited as such diazo resin is, for example, a condensate of an aromatic diazonium salt and a compound containing an active carbonyl group such as formaldehyde, and an inorganic salt of organic solvent-soluble diazo resin, which is a reaction product of a condensate of p-diazo phenyl amines group and formaldehyde with hexafluorophosphate or tetrafluoroborate. Particularly, a high-molecular-weight diazo compound containing 20 mol % or more of a hexamer or larger, which is described in JP 59-78340 A, is preferable.

For example, copolymer containing, as an essential component, acrylic acid, methacrylic acid, crotonic acid or maleic acid is cited as a suitable binding agent. Specifically, multi-copolymer of monomer such as 2-hydroxyethyl(meth)acrylate, (meth)acrylonitrile and (meth)acrylic acid, which is as described in JP 50-118802 A, and multi-copolymer composed of alkylacrylate, (metha)acrylonitrile and unsaturated carboxylic acid, which is as described in JP 56-4144 A, are cited.

Furthermore, to the photosensitive resin composition, it is preferable to add a compound such as a printing agent, a dye, a plasticizer for imparting the flexibility of the coating layer, abrasion resistance, a development accelerator, and a surfactant for improving the coating property, which are described in [0014] and [0015] of JP 7-281425 A.

It is preferable that an intermediate layer containing a high-molecular compound having a constituent with an acid group and a constituent with an onium group, which is described in JP 2000-105462 A, is provided as an undercoat layer of the above-described positive or negative photosensitive layer of the conventional type.

<Photopolymer Type>

A photosensitive composition of a photopolymerization type (hereinafter, referred to as a "photopolymerizable composition"), which is used suitably for the photosensitive layer of the photopolymer type, contains a compound containing ethylenic unsaturated bonding capable of addition polymerization (hereinafter, simply referred to as a "compound containing ethylenic unsaturated bonding"), a photopolymerization initiator and a high-molecular binding agent as essential components. According to needs, the photopolymerizable composition contains various compounds such as a colorant, a plasticizer and a thermal polymerization inhibitor.

A compound containing ethylenic unsaturated bonding, which is contained in the photopolymerizable composition, is a compound having the ethylenic unsaturated bonding as carrying out addition polymerization, crosslinking and curing by the action of the photopolymerization initiator when the photopolymerizable composition is irradiated by active light ray. The compound containing the ethylenic unsaturated bonding can be arbitrarily selected from compounds, each having at least one, and preferably two or more of end ethylenic unsaturated bondings. For example, this compound has a chemical form of monomer, prepolymer (that is, dimmer, trimer or oligomer), a mixture thereof, a copolymer thereof or the like. Cited as examples of the monomer are the ester of unsaturated carboxylic acid (for example, acrylic acid, methacrylic acid, itaconic acid, crotonic acid, isocrotonic acid and maleic acid) and an aliphatic polyhydric alcohol compound and the amide of unsaturated carboxylic acid and an aliphatic polyamine compound. Moreover, a urethane addition polymerizable compound is also suitable.

As the photopolymerization initiator contained in the photopolymerizable composition, a variety of photopolymerization initiators or combined systems of two or more photopolymerization initiators (photo initiation systems) can be appropriately selected for use according to a wavelength of a light source to be used. For example, initiation systems described in [0021] to [0023] of JP 2001-22079 A are preferable.

Since the high-molecular binding agent contained in the photopolymerizable composition needs not only to function as a coating layer forming agent for the photopolymerizable composition but also to dissolve the photosensitive layer in an alkali developer, an organic high-molecular polymer that is soluble or swellable in an aqueous solution of alkali is used. As the above-described high-molecular binding agent, the agent described in [0036] to [0063] of JP 2001-22079 A.

It is preferable to add the additive described in [0079] to [0088] of JP 2001-22079 A (for example, a surfactant for improving the coating property) to the photopolymerizable composition.

Moreover, it is also preferable to provide an oxygen-shieldable protective layer on the above-described photosensitive layer for preventing the polymerization inhibiting action of oxygen. Polyvinyl alcohol and a copolymer thereof are cited as a polymer contained in the oxygen-shieldable protective layer.

Furthermore, it is also preferable that, as a lower layer of the above-described photosensitive layer, an adhesive layer as described in [0131] to [0165] of JP 2001-228608 A is provided.

<Thermal Positive Type>

The thermosensitive layer of the thermal positive type contains alkali-soluble high-molecular compound and a photothermal conversion agent.

The alkali-soluble high-molecular compound includes a homopolymer containing an acid group in the polymer, a copolymer thereof and a mixture thereof. Particularly, the one having an acid group such as a (1) phenolic hydroxy group (—Ar—OH) and a (2) sulfonamide group (—$SO_2$NH—R) is preferable in terms of solubility to the alkali developer. Above all, the one having the phenolic hydroxy group is preferable since it is excellent in image-forming capability in the exposure by an infrared ray laser or the like. For example, novolac resin such as phenol-formaldehyde resin, m-cresol-formaldehyde resin, p-cresol-formaldehyde resin, m-/p-mixed cresol-formaldehyde resin and phenol/cresol (any of m-, p- and m-/p-mixed may be allowed)-mixed-formaldehyde resin, and pyrogallol-acetone resin are preferably cited. More specifically, the polymers described in [0023] to [0042] of JP 2001-305722 A are preferably used.

The photothermal conversion agent converts exposure energy into heat to enable efficient release execution of an interaction in an exposed region of the thermosensitive layer. From a viewpoint of a recording sensitivity, pigment or dye, which has a light absorbing band in the infrared band ranging from 700 to 1200 nm in wavelength, is preferable. Concretely cited as the dye are azo dye, azo dye in the form of metallic complex salt, pyrazolone azo dye, naphthoquinone dye, anthraquinone dye, phthalocyanine dye, carbonium dye, quinonimine dye, methine dye, cyanine dye, squarylium dyestuff, pyrylium salt, metal thiolate complex (for example, nickel thiolate complex) and the like. Particularly, the cyanine dye is preferable and, for example, the cyanine dye represented by the general formula (I) in JP 2001-305722 A is cited.

To the composition for use in the thermosensitive layer of the thermal positive type, it is preferable to add a compound such as a sensitivity regulator, a printing agent and a dye, and the surfactant for improving the coating capability, which are similar to those described in the paragraph of the foregoing conventional positive type. Specifically, the compounds described in [0053] to [0059] of JP 2001-305722 A are preferable.

The thermosensitive layer of the thermal positive type may be a single layer or may have a two-layer structure as described in JP 11-218914 A. A single-layer of thermal sensitive layer can use the photosensitive materials as described in WO97/39894 and JP 10-268512 A, and a two-layer structured thermal sensitive layer can use the photosensitive materials as described in WO99/67097 and EP864420B1.

It is preferable to provide an undercoat layer between the thermosensitive layer of the thermal positive type and a support thereof. As a component contained in the undercoat layer, the variety of organic compounds described in [0068] of JP 2001-305722 A are cited.

<Thermal Negative Type>

The thermosensitive layer of the thermal negative type is a negative thermosensitive layer in which an infrared laser-irradiated areas are cured to form image areas.

As one of such thermosensitive layers of the thermal negative type, a polymerizable-type layer (polymerizable layer) is suitably cited. The polymerizable layer contains an (A) infrared absorbent, a (B) radical generator (radical polymerization initiator), a (C) radical polymerizable compound causing a polymerization reaction by the generated radicals and curing, and a (D) binder polymer.

In the polymerizable layer, the infrared ray absorbed by the infrared absorbent is converted into heat, then the radical polymerization initiator such as onium salt is decomposed by the heat generated, and thus radicals are generated. The radical polymerizable compound is selected from compounds having end ethylenic unsaturated bondings, and a chain polymerization reaction occurs by the generated radicals, and thus the radical polymerizable compound cures.

As the (A) infrared absorbent, for example, the photothermal conversion agent contained in the above-described thermosensitive layer of the thermal positive type is cited. Particularly, the ones described in [0017]to [0019] of JP 2001-133969 A are cited as concrete examples of the cyanine dyestuff. The onium salt is cited as the (B) radical generator. The ones described in [0030] to [0033] of JP 2001-133969 A are cited as concrete examples of the onium salt used suitably. The (C) radical polymerizable compound is selected from compounds, each having at least one, and preferably two or more of the end ethylenic unsaturated bondings. It is preferable to use linear organic polymer as the (D) binder polymer, and linear organic polymer that is soluble or swellable in water or alkalescent water is selected. Among such polymers, particularly, (meth)acrylic resin having a benzyl group or an allyl group and a carboxy group in side chains is excellent in a balance of layer strength, sensitivity and development property, and is suitable. For the (C) radical polymerizable compound and the (D) binder polymer, the ones described in detail in [0036] to [0060] of JP 2001-133969 A can be used. It is also preferable to add the additives described in [0061] to [0068] of JP 2001-133969 A (for example, the surfactant for improving the coating property) as other additives.

Besides the polymerizable-type layer, an acid cross-linkable-type layer (acid cross-linkable layer) is suitably cited as one of the thermosensitive layers of the thermal negative type. The acid cross-linkable layer contains a (E) compound generating acid by light or heat (hereinafter, referred to as an "acid generator"), a (F) compound cross-linking by the generated acid (hereinafter, referred to as a "cross-linking agent"), and a (G) alkali-soluble high-molecular compound capable which can react with the cross-linking agent under the presence of the acid. The (A) infrared absorbent may be mixed in the acid cross-linkable in order to absorb the energy of the infrared laser efficiently. Cited as the (E) acid generator is a compound capable of generating acid by thermal decomposition, such as a photoinitiator for the photopolymerization, a color-turning agent (i.e., dye stuff) and an acid generator for use in microresist or the like. Cited as the (F) cross-linking agent are an (i) aromatic compound substituted with a hydroxymethyl group or an alkoxymethyl group, a (ii) compound having a N-hydroxymethyl group, a N-alkoxymethyl group or a N-acyloxymethyl group, and an (iii) epoxy compound. As the (G) alkali-soluble high-molecular compound, novolac resin, polymer having a hydroxyaryl group in the side chain, and the like are cited.

<Development-dispensable Type>

There are various types including a thermoplastic particle polymer type, a microcapsule type, a type containing sulfonic acid-generating polymer and the like in the thermosensitive layer of the development-dispensable type. The present invention is particularly preferable for the development-dispensable type which can be developed on a printing machine.

In the thermoplastic particle polymer type, (H) hydrophobic thermowelding (melting) resin particles are dispersed in a (J) hydrophilic polymer matrix, and can be welded by heat of exposed areas and fused mutually, thus forming hydrophobic areas, that is, image areas formed by polymers.

The (H) hydrophobic thermowelding resin particles (hereinafter, referred to as "particulate polymers"), which mutually fuse and coalesce by the heat, are preferable. The particulate polymers, which have hydrophilic surfaces and can be dispersed in a hydrophilic component such as a fountain solution, are preferable. Suitably cited as the particulate polymers are thermoplastic particulate polymers described in Research Disclosure No. 33303 (Published in January, 1992), JP 9-123387 A, JP 9-131850 A, JP 9-171249 A, JP 9-171250 A, EP 931,647 A and the like. Cited as concrete examples are homopolymers of monomers of ethylene, styrene, vinyl chloride, methyl acrylate, ethyl acrylate, methyl methacrylate, ethyl methacrylate, vinylidene chloride, acrylonitrile, vinyl carbazole or the like; copolymers thereof; or mixtures thereof. Among them, it is preferable to use polystyrene and polymethyl methacrylate. The particulate polymers having the hydrophilic surfaces include: polymers which are hydrophilic themselves such as polymers constituting the particles, which are hydrophilic themselves, and polymers to which hydrophilicity is imparted by introducing hydrophilic groups into main chains or side chains of the polymers; and polymers of which surfaces are made hydrophilic by adsorbing hydrophilic polymer such as poly(vinyl alcohol) and poly(ethylene glycol), hydrophilic oligomer or a hydrophilic low-molecular weight compound to the surfaces of the particulate polymers. As the particulate polymers, particulate polymers having thermoreactive functional groups are more preferable. The particulate polymers as described above are dispersed in the (J) hydrophilic high-molecular matrix, and thus obtaining good on-machine development property in the case of carrying out development on a machine, and further, the coating layer strength of the thermosensitive layer is also improved.

As the microcapsule type, a type described in JP 2000-118160 A and a microcapsule type containing a compound having a thermoreactive functional group as described in JP 2001-277740 A are preferably cited.

As the sulfonic acid-generating polymer for use in the type containing the sulfonic acid-generating polymer, for example, polymer having a sulfonic acid ester group, a disulfonic group or a sec- or tert-sulfonamide group in the side chain described in JP 10-282672 A is cited.

The hydrophilic resin can be contained in the thermosensitive layer of the development-dispensable type, and thus, not only the on-machine development property would be improved, but also the coating layer strength of the thermosensitive layer itself would be improved. Moreover, the hydrophilic resin is cross-linked and cured, thus making it possible to obtain a presensitized plate eliminating a necessity of development process. As the hydrophilic resin, for example, the one having a hydrophilic group such as a hydroxy group, a carboxy group, a hydroxyethyl group, a hydroxypropyl group, an amino group, an aminoethyl group, an aminopropyl group and a carboxymethyl group, and sol-gel conversion type bonding resin that is hydrophilic are preferable.

As concrete examples of the hydrophilic resin, the ones enumerated as the hydrophilic resins for use as the above-described (J) hydrophilic high-molecular matrix are cited.

Among them, the sol-gel conversion type bonding resin is preferable.

It is necessary to add the photothermal conversion agent to the thermosensitive layer of the development-dispensable type. It is satisfactory that the photothermal conversion agent may be a substance absorbing light with a wavelength of 700 nm or more, and a dye similar to the dye for use in the above-described thermal positive type is particularly preferable.

<Backcoat Layer>

On the reverse side of the presensitized plate of the present invention, which is obtained by providing various types of image recording layers on the support for the lithographic printing plate of the present invention, a backcoat layer composed of an organic high-molecular compound can be provided according to needs in order to prevent the image recording layers from being scratched in the case of stacking the presensitized plate or the like.

<Method of Producing a Presensitized Plate>

Usually, the respective layers of the image recording layer and the like can be produced by coating a coating liquid obtained by dissolving the foregoing components into a solvent on the support for the lithographic printing plate.

Cited as solvents used herein are ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolan, γ-butyrolactone, toluene, water and the like. However, the present invention is not limited to this. These solvents are used singly or mixedly.

It is preferable that the concentration of the foregoing components (entire solid part) in the solvent range from 1 to 50 wt %.

Various coating methods can be used. For example, bar coater coating, rotation coating, spray coating, curtain coating, dip coating, air knife coating, blade coating, roll coating and the like can be cited.

<Coating Method>

As the method of coating a solution which forms the aforementioned image recording layer over the grained surface of the support for the lithographic printing plate, the methods as conventionally known such as the method of using a coating rod, the method of using an extrusion-type coater and the method of using a slide bead coater can used, and coating can be performed in the condition in accordance with the already known ones.

Taken up as dryers which dry the aluminum plate after coating are an arched dryer where pass rolls are disposed in a dryer and the aluminum plate is dried while the same is transferred therein, an air dryer where the air is supplied by nozzles from the upper direction and the lower direction and the web is dried while being floated, a radiant heat dryer where the aluminum plate is dried by a radiant heat from a medium heated at high temperature, and a roller dryer where rollers are heated and the aluminum plate is dried by heat transmitted by contacting with the aforementioned rollers as described in JP 6-638487 A or the like.

<Lithographic Printing Plate>

The presensitized plate of the present invention is made into a lithographic printing plate by various treatment methods in accordance with the kind of the image recording layer.

In general, image exposure is carried out. Cited as light sources of active rays for use in the image exposure are, for example, a mercury lamp, a metal halide lamp, a xenon lamp and a chemical lamp. As laser beams, for example, helium-neon (He—Ne) laser, argon laser, krypton laser, helium-cadmium laser, KrF excimer laser, semiconductor laser, YAG laser and YAG-SHG laser are cited.

When the image recording layer is of any of the thermal types, the conventional types and the photopolymer type, it is preferable that the presensitized plate is developed by use of a developer after the exposure to obtain the lithographic printing plate. Although a preferable developer for use in the presensitized plate of the present invention is not particularly limited as long as the developer is an alkali developer, an alkali aqueous solution that does not substantially contain an organic solvent is preferable. Moreover, the development can be carried out by use of a developer that does not substantially contain alkali metal silicate. The developing method using the developer that does not substantially contain the alkali metal silicate is described in detail in JP 11-109637 A, and the contents described in JP 11-109637 A can be used. Moreover, the presensitized plate of the present invention can be developed by use of a developer that contains the alkali metal silicate.

EXAMPLE

Although the present invention is described in detail by showing Examples, the present invention is not limited to these Examples.

[1] Example in the 1st Emodiment According to the Present Invention and Comparative Examples

Examples 1-1 to 1-16 and Comparative Examples 1-1 to 1-7] 1-(1) Preparation of Support for Lithographic Printing Plate

Examples 1-1 to 1-13, 1-16 and Comparative Examples 1-1 to 1-6

(Aluminum Plate 1)

A molten metal was prepared by using an aluminum alloy containing Si: 0.08 wt %, Fe: 0.3 wt %, Cu: 0.001 wt %, Ti: 0.015 wt % and the rest of which is Al and unavoidable impurities. After foregoing cast treatment and filtration were performed, an ingot which is 500 mm thick and 1200 mm wide is prepared in DC casting process. After the surface was ground by average 10 mm thick with a facing tool, the ingot was kept thermally constant at 550° C. for about 5 hours. When the temperature dropped to 400° C., a rolled plate with thickness of 2.7 mm was prepared with a hot rolling mill. Further, after a thermal treatment was performed at 500° C. using a continuous annealing machine, the plate was finished to the thickness of 0.24 mm by a cold rolling to obtain the aluminum plate. After this aluminum plate was prepared to be 1,030 mm wide, the following surface treatments were performed on this aluminum plate.

(Aluminum Plate 2)

Aluminum plate 2 was prepared as in aluminum plate 1 excluding that Fe content was 0.27 wt % and Cu content was 0.025 wt %, and the following surface treatments were performed on the aluminum plate.

<Surface Treatment>

The following various surface treatments (a) to (k) were continuously performed on the obtained aluminum plate in the combinations as shown in Table [1]-1, and the supports for the lithographic printing plate in Examples 1-1 to 1-13, 1-16 and Comparative Example 1-1 to 1-6 were obtained. A squeegeeing was performed with a nip roller after each treatment and water washing. By the way, "-" in Table [1]-1 shows that a surface treatment was not performed.

TABLE [1]-1

| | Aluminum plate | (a) Mechanical graining treatment | (b) Alkali etching treatment | (c) Desmutting treatment | (d) Electrochemical graining treatment | (e) Alkali etching treatment | (f) Desmutting treatment | (g) Electrochemical graining treatment | (h) Alkali etching treatment | (i) Desmutting treatment | (j) Anodizing treatment | (k) Silicate treatment |
|---|---|---|---|---|---|---|---|---|---|---|---|---|
| Example 1-1 | 1 | B-1 | E-1 | D-1 | C-1 | E-6 | D-2 | — | — | — | A-1 | S-1 |
| Example 1-2 | 1 | B-2 | E-1 | D-1 | C-1 | E-6 | D-2 | M-3 | E-9 | D-2 | A-1 | S-1 |
| Example 1-3 | 1 | — | E-2 | D-1 | M-2 | E-6 | D-2 | M-3 | E-9 | D-2 | A-1 | S-1 |
| Example 1-4 | 1 | B-3 | E-1 | D-1 | C-1 | E-6 | D-2 | M-3 | E-9 | D-2 | A-1 | S-1 |
| Example 1-5 | 1 | — | E-2 | D-1 | C-2 | E-8 | D-2 | M-3 | E-9 | D-2 | A-1 | S-1 |
| Example 1-6 | 1 | B-1 | E-1 | D-1 | C-2 | E-4 | D-2 | M-3 | E-11 | D-2 | A-1 | S-1 |
| Example 1-7 | 1 | B-1 | E-1 | D-1 | C-4 | E-2 | D-2 | M-3 | E-8 | D-2 | A-1 | S-1 |
| Example 1-8 | 1 | B-1 | E-1 | D-1 | C-1 | E-6 | D-2 | — | — | — | A-1 | S-1 |
| Example 1-9 | 1 | B-4 | E-1 | D-1 | C-1 | E-6 | D-2 | — | — | — | A-1 | S-1 |
| Example 1-10 | 1 | B-5 | E-1 | D-1 | C-1 | E-6 | D-2 | — | — | — | A-1 | S-1 |
| Example 1-11 | 1 | B-6 | E-1 | D-1 | C-1 | E-6 | D-2 | — | — | — | A-1 | S-1 |
| Example 1-12 | 2 | B-1 | E-1 | D-1 | C-5 | E-3 | D-2 | M-3 | E-12 | D-2 | A-1 | S-1 |
| Example 1-13 | 2 | — | E-2 | D-1 | C-2 | E-7 | D-2 | M-3 | E-9 | D-2 | A-1 | S-1 |
| Example 1-16 | 1 | B-10 | E-1 | D-1 | C-1 | E-6 | D-2 | — | — | — | A-1 | S-1 |
| Comparative Example 1-1 | 1 | B-1 | E-1 | D-1 | M-2 | E-9 | D-2 | — | — | — | A-1 | S-1 |
| Comparative Example 1-2 | 1 | B-3 | E-1 | D-1 | C-3 | E-6 | D-2 | — | — | — | A-1 | S-1 |

TABLE [1]-1-continued

| | Aluminum plate | (a) Mechanical graining treatment | (b) Alkali etching treatment | (c) Desmutting treatment | (d) Electrochemical graining treatment | (e) Alkali etching treatment | (f) Desmutting treatment | (g) Electrochemical graining treatment | (h) Alkali etching treatment | (i) Desmutting treatment | (j) Anodizing treatment | (k) Silicate treatment |
|---|---|---|---|---|---|---|---|---|---|---|---|---|
| Comparative Example 1-3 | 1 | — | E-2 | D-1 | M-2 | E-4 | D-2 | — | — | — | A-1 | S-1 |
| Comparative Example 1-4 | 1 | B-7 | E-2 | D-2 | M-1 | E-6 | D-2 | — | — | — | A-1 | S-1 |
| Comparative Example 1-5 | 1 | B-8 | E-2 | D-2 | M-1 | E-6 | D-2 | — | — | — | A-1 | S-1 |
| Comparative Example 1-6 | 1 | B-9 | E-2 | D-2 | M-1 | E-6 | D-2 | — | — | — | A-1 | S-1 |

Each of the surface treatment (a) to (k) was described below.

(a) Mechanical Graining Treatment (Brush Graining Method)

A mechanical graining treatment was performed by a rotating bundled bristles-implanted brush while supplying a pumice suspension (specific gravity: 1.1 g/$cm^3$) as an abrasive slurry liquid using the device as shown in FIG. 1 to the surface of the aluminum plate. In FIG. 1, 1 is the aluminum plate, 2 and 4 are roller-like brushes (in the Example, bundled bristles-implanted brush), 3 is the abrasive slurry liquid, and 5, 6, 7 and 8 are support rollers.

The mechanical graining treatment was performed in the mechanical graining treatment conditions B-1 to B-10 where median diameter (μm) of the abrasive, number of brushes, revolution of brushes (rpm) were changed to the conditions as shown in Table [1]-2.

The material of bundled bristles-implanted brush was 6·10 nylon, the diameter of a brush bristle was 0.3 mm, and the length of the bristles was 50 mm. For the brush, the bristles were implanted so as to be thick on a 300 mmϕ stainless steel-made cylinder by arranging holes thereon. The distance between two support rollers (200 mmϕ) under the bundled bristles-implanted brush was 300 mm. The bundled bristles-implanted brush was pressed against the aluminum plate until the load of the drive motor which rotates the brush increased by 10 kW to the load before the bundled bristles-implanted brush was pressed against the aluminum plate. The rotational direction of the brushes was the same direction to the movement of the aluminum plate.

Note that the revolutions in Table [1]-2 showed each of the first brush, the second brush, the third brush and the fourth brush in order from the upstream side (the right side in FIG. 1) in the direction to which the aluminum plate was transferred.

TABLE [1]-2

| Condition | Median diameter (μm) | Number of brushes (number) | Revolution (rpm) |
|---|---|---|---|
| B-1 | 30 | 4 | 1st, 3rd and 4th brushes: 250<br>2nd brush: 200 |
| B-2 | 20 | 3 | 1st brush: 250<br>2nd and 3rd brushes: 200 |
| B-3 | 70 | 4 | 1st, 3rd and 4th brushes: 300<br>2nd brush: 250 |
| B-4 | 60 | 4 | 1st, 3rd and 4th brushes: 250<br>2nd brush: 200 |
| B-5 | 40 | 4 | 1st, 3rd and 4th brushes: 250<br>2nd brush: 200 |

TABLE [1]-2-continued

| Condition | Median diameter (μm) | Number of brushes (number) | Revolution (rpm) |
|---|---|---|---|
| B-6 | 38 | 3 | 1st brush: 250<br>2nd and 3rd brushes: 200 |
| B-7 | 80 | 4 | 1st, 3rd and 4th brushes: 250<br>2nd brush: 200 |
| B-8 | 80 | 4 | 1st, 3rd and 4th brushes: 300<br>2nd brush: 250 |
| B-9 | 50 | 4 | 1st to 4th brushes: 350 |
| B-10 | 60 | 4 | 1st to 4th brushes: 300 |

(b) Alkali Etching Treatment

Etching treatment was performed in an aluminum meltage (g/$m^2$) as shown in Table [1]-3 on the obtained aluminum plate described above by using an aqueous sodium hydroxide solution with sodium hydroxide concentration (wt %) and aluminum ion concentration (wt %) as shown in Table [1]-3 with a spray. Thereafter, rinsing was performed with a spray. Alkali etching was performed at 70° C.

TABLE [1]-3

| Condition | Sodium hydroxide concentration (wt %) | Aluminum ion concentration (wt %) | Aluminum meltage (g/$m^2$) |
|---|---|---|---|
| E-1 | 26 | 5 | 10 |
| E-2 | 26 | 5 | 5 |
| E-3 | 26 | 5 | 3 |
| E-4 | 26 | 5 | 1 |
| E-5 | 26 | 5 | 0.7 |
| E-6 | 26 | 5 | 0.5 |
| E-7 | 26 | 5 | 0.3 |
| E-8 | 26 | 7 | 0.2 |
| E-9 | 5 | 0.5 | 0.1 |
| E-10 | 5 | 0.5 | 0.05 |
| E-11 | 5 | 0.5 | 0.5 |
| E-12 | 5 | 0.5 | 0.2 |

(c) Desmutting Treatment

Condition D-1: a 1 wt % aqueous nitric acid solution at temperature of 30° C. (containing aluminum ion of 0.5 wt %), or Condition D-2: in a 25 wt % aqueous sulfuric acid solution at temperature of 60° C., Desmutting treatment was performed in each case with a spray in Condition D-1 or Condition D-2 and then, rinsing was performed with a spray.

For the aqueous nitric acid solution used for the desmutting treatment, the wastewater in a process where electrochemical graining treatment was performed by using AC in an aqueous nitric acid solution was applied.

(d) Electrochemical Graining Treatment (d-1) Nitric Acid Electrolysis

Electrochemical graining treatment was continuously performed by using AC of 60 Hz. The electrolytic solution in this case was a 1 wt % aqueous nitric acid solution (containing aluminum ion of 0.5 wt %) at a solution temperature of 50° C. The AC power supply waveform was a waveform as shown in FIG. 2, that is, the time TP for the current value to reach the peak from zero was 0.8 msec, duty ratio 1:1, and the current a trapezoidal rectangular wave AC. Electrochemical graining treatment was performed with a carbon electrode as a counter electrode by using this current. An auxiliary anode used was ferrite. The electrolysis bath used was the one as shown in FIG. 3.

The current density was 30 $A/dm^2$ at the peak value and 5% of the current flowing from the power supply was shunted to the auxiliary electrode. The quantity of electricity ($C/dm^2$) was set to be the total sum of quantities of electricity when the aluminum plate was anode, which was determined to be the value as shown in Table [1]-4.

Thereafter, rinsing was performed with a spray.

TABLE [1]-4

| Condition | Quantity of electricity ($C/dm^2$) |
|---|---|
| C-1 | 175 |
| C-2 | 220 |
| C-3 | 400 |
| C-4 | 60 |
| C-5 | 200 |

(d-2) Hydrochloric Acid Electrolysis

Electrochemical graining treatment was continuously performed by using AC of 60 Hz. The temperature of the electrolytic solution was 50° C. The AC power supply waveform was a waveform as shown in FIG. 2, in which the time TP for the current value to reach the peak from zero is 0.8 msec, duty ratio 1:1, and the current a trapezoidal rectangular wave AC. Electrochemical graining treatment was performed with a carbon electrode as a counter electrode by using this current. An auxiliary anode used was ferrite. The electrolysis bath used was the one as shown in FIG. 3.

The current density was 25 $A/dm^2$ at the peak.

The electrolytic solution used for hydrochloric acid electrolysis was an aqueous hydrochloric acid (wt %) solution (containing aluminum ion of 0.5 wt %) as shown in Table [1]-5, and the quantity of electricity ($C/dm^2$) in hydrochloric acid electrolysis was indicated in the total sum of quantities of electricity when the aluminum plate was anode, as shown similarly in Table [1]-5.

Thereafter, rinsing was performed with a spray.

TABLE [1]-5

| Condition | Hydrochloric acid concentration (wt %) | Quantity of electricity ($C/dm^2$) |
|---|---|---|
| M-1 | 1 | 400 |
| M-2 | 1 | 600 |
| M-3 | 0.5 | 50 |

(e) Alkali Etching Treatment

Alkali etching treatment was performed in the conditions as described in the aforementioned (b).

(f) Desmutting Treatment

Desmutting treatment was performed in the condition D-2 as described in the aforementioned (c).

(g) Electrochemical Graining Treatment

Electrochemical graining treatment was performed in the condition M-3 as described in the aforementioned (d-2). Thereafter, rinsing was performed with a spray.

(h) Alkali Etching Treatment

Alkali etching treatment was performed in the condition as described in the aforementioned (b). Thereafter, rinsing was performed with a spray.

(i) Desmutting Treatment

Desmutting treatment was performed in the condition D-2 as described in the aforementioned (c). Thereafter, rinsing was performed with a spray.

(j) Anodizing Treatment (Condition A-1)

Anodizing treatment was performed by using the anodizing device with the AC electrolysis of the structure as shown in FIG. 4 to obtain the support for the lithographic printing plate. For the electrolytic solution supplied to the primary and secondary electrolysis sections, sulfuric acid was used. Each of the electrolytic solution was of sulfuric acid concentration of 15 wt % (containing aluminum ion of 0.5 wt %) at 38° C. Thereafter, rinsing was performed with a spray. The final quantity of the anodized coating was 2.5 $g/m^2$.

(k) Silicate Treating (Condition S-1)

Dipping treatment was performed in No. 3 aqueous sodium silicate solution ($Na_2O:SiO_2=1:3$, $SiO_2$ content: 30 wt %, made by Nippon Chemical Industrial Co., Ltd., concentration: 1 wt %) at 35° C. for 10 seconds. Thereafter, rinsing was performed by using a well water with a spray.

Examples 1-14, 1-15 and Comparative Example 1-7

Example 1-14 used the support for the lithographic printing plate obtained in the aforementioned Example 1-2, Example 1-15 used the support for the lithographic printing plate obtained in the aforementioned Example 1-12, and Comparative Example 1-7 used the support for the lithographic printing plate obtained in the aforementioned Comparative Example 1-1, respectively.

1-2) Calculation of Factors of Surface Shape of Support for Lithographic Printing Plate For the surface of the support for the lithographic printing plate obtained as mentioned above, surface area ratios $\Delta S^{50(50)}$, $\Delta S^{50(2-50)}$, $\Delta S^{50(0.2-2)}$ and the number of recesses with specific depth were measured.

The results are shown in Tables [1]-6 to [1]-8.

(1) Measurement of Surface Shape with Atomic Force Microscope

<1> The Surface Shape was Measured with the Atomic Force Microscope (SPA300/SPI3800N, Made by Seiko Instruments Inc.) to Find a Three-Dimensional Data. Described Below is the Concrete Procedure.

A piece of 1 cm square in size was cut off from the support for the lithographic printing plate, the piece was set at the horizontal specimen block on the piezo scanner, a cantilever was allowed to approach the surface of the specimen for the cantilever to reach an area where an atomic force works, and then scanning was performed in XY directions. In this case, the irregularities of the specimen were captured as the piezo scanner's displacement in Z direction. The piezo scanner capable of scanning in 150 μm in XY directions and 10 μm in Z direction was used. The cantilever with resonance frequency of 120 to 400 kHz and spring constant of 12 to 90 N/m (SI-DF20, made by Seiko Instruments Inc.) was used, and the measurement was performed in DMF mode (dynamic force mode). In addition, the subtle slant of the specimen was compensated by the least square estimate of the found three-dimensional data to find a reference plane.

The 512×512 points in 50 μm square on the surface were measured. The resolution in XY directions was set to 0.1 μm, the resolution in Z direction to 0.15 nm, and the scanning velocity to 50 μm/sec.

<2> Measurement of $\Delta S^{50}$

By using the three-dimensional data (f(x, y)) found in the aforementioned <1>, the three adjacent points were extracted, and the total sum of the areas of the micro triangles formed by the three points was found to be actual area $S_x^{50}$. Surface area ratio $\Delta S^{50}$ was found by the following equation from the obtained actual area $S_x^{50}$ and the geometrically measured area $S_o^{50}$:

$$\Delta S^{50}=[(S_x^{50}-S_o^{50})/S_o^{50}]\times 100(\%)$$

(i) The three-dimensional data found in the aforementioned <1> was used in an intact state to calculate $\Delta S^{50(50)}$.

(ii) The data that the components with wavelength of 2 μm or more and 50 μm or less were extracted from the three-dimensional data found in the aforementioned <1> was used to calculate the surface area ratio $\Delta S^{50(2\text{-}50)}$. Fast Fourier transformation was performed on the three-dimensional data found in the aforementioned <1> to find the frequency distribution, and next, after the components with wavelength of less than 2 μm was removed, Fourier inverse transformation was performed to extract the components with wavelength of 2 μm or more and 50 μm or less.

Namely, by using the three-dimensional data (f(x, y)) thus obtained, the three adjacent points were extracted, and the total sum of the areas of the micro triangles formed by the points was found to be actual area $S_x^{50(2\text{-}50)}$. Surface area ratio $\Delta S^{50(2\text{-}50)}$ was found by the following equation from the obtained actual area $S_x^{50(2\text{-}50)}$ and the geometrically measured area $S_o^{50}$:

$$\Delta S^{50(2\text{-}50)}=[(S_x^{50(2\text{-}50)}-S^{50})/S_o^{50}]\times 100(\%)$$

(iii) The data that the components with wavelength of 0.2 μm or more and 2 μm or less were extracted from the three-dimensional data found in the aforementioned <1> was used to calculate surface area ratio $\Delta S^{50(0.2\text{-}2)}$. Fast Fourier transformation was performed on the three-dimensional data found in the aforementioned <1> to find the frequency distribution, and next, after the components with wavelength of less than 0.2 μm and more than 2 μm were removed, Fourier inverse transformation was performed to extract the components with wavelength of 0.2 μm or more and 2 μm or less.

Namely, by using the three-dimensional data (f(x, y)) thus obtained, the three adjacent points were extracted, and the total sum of the areas of the micro triangles formed by the points was found to be actual area $S_x^{50(0.2\text{-}2)}$ Surface area ratio $\Delta S^{50(0.02\text{-}0.2)}$ was found by the following equation from the obtained actual area $S_x^{50(0.2\text{-}2)}$ and the geometrically measured area $S_o^{50}$:

$$\Delta S^{50(0.2\text{-}2)}=[(S_x^{50(0.2\text{-}2)}-S_o^{50})/S_o^{50}]\times 100(\%)$$

(2) Number of Recesses with Certain Depth

The numbers of recesses with the specific depth on the support for the lithographic printing plate in Examples 1-2 (1-14), 1-8 to 1-12 (1-15), 1-16 and Comparative Examples 1-1 (1-7), 1-4 to 1-6 were found.

<1> Number of Recesses with Depth of 4 μm or More

The three-dimensional data was found without contact by scanning 400 μm×400 μm on the surface by 0.01 μm with a laser microscope (Micromap520, made by Ryoka-Systems Inc.) and the number of recesses with the depth of 4 μm or more was counted in this three-dimensional data.

For the number of recesses with the aforementioned depth of 4 μm or more, the number of recesses was counted on each of the three-dimensional data obtained by arbitrarily scanning 5 positions on the surface and their average value was determined to be the number of recesses with the depth of 4 μm or more.

In addition to the laser microscope as used above, for example, made by Keyence Corporation, ultra-deep profile measurement microscope VK5800 can be similarly used. The number of the recesses is indicated as "Dpn (4 μm)" in Tables 1-[7] and 1-[8].

<2> Number of Recesses with Depth of 3 μm or More

Similarly, the three-dimensional data was found and the number of recesses with depth of 3 μm or more was counted.

For the number of recesses with the aforementioned depth of 3 μm or more, the number of recesses was counted on each of the three-dimensional data obtained by arbitrarily scanning 5 positions on the surface and their average value was determined to be the number of recesses with depth of 3 μm or more.

Note that the number of the recesses is indicated as "Dpn (3 μm)" in Tables 1-[7] and 1-[8].

1-(3) Preparation of Presensitized Plate

Examples 1-1 to 1-13, 1-16 and Comparative Examples 1-1 to 1-6

The presensitized plate was obtained by providing a thermal positive working image recording layer A (a single-layer thermal sensitive layer) on the support for the lithographic printing plate obtained in Examples 1-1 to 1-13, 1-16, and Comparative Examples 1-1 to 1-6. Before the image recording layer A was provided, an undercoat surface treatment was performed in the following conditions.

The undercoat solution with the following composition was coated on the support for the lithographic printing plate, obtained as abovementioned, after alkali metal silicate treatment was performed. The support was dried at 80° C. for 15 seconds, thus the coated film was formed. The coated quantity of the film after dried was 10 mg/m$^2$.

| <Undercoat solution composition> | |
|---|---|
| High molecular compound written below | 0.2 g |
| Methanol | 100 g |
| Water | 1 g |

[Chemical formula 1]

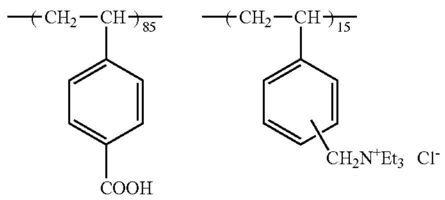

MOLECULAR WEIGHT 280,000

<Image Recording Layer (Single Layer-type Thermal Sensitive Layer>

The following composition of thermal sensitive layer coating solution was further prepared and coated on the support for the lithographic printing plate on which the undercoat treated as abovementioned so as to allow the coated quantity after dried to be 1.7 $g/m^2$. The layer was dried and the thermal sensitive layer A (thermal positive working image recording layer A) was formed to obtain the presensitized plate.

| (Thermal sensitive layer coating solution composition> | |
|---|---|
| Novolak resin (m-cresol/p-cresol = 60/40, weight average molecular weight 7,000, unreacted cresol 0.5 wt % contained) | 1.0 g |
| Cyanine dye A expressed by the following structural formula | 0.1 g |
| Tetrahydro phthalic anhydride | 0.05 g |
| p-Toluenesulfonic acid | 0.002 g |
| A compound in which the counter ion of ethylviolet is substituted to 6-hydroxy-β-naphthalenesulfonic acid | 0.02 g |
| Fluoro-surfactant (Megaface F-177, made by Dainippon Ink and Chemicals, Inc.) | 0.05 g |
| Methyl ethyl ketone | 12 g |

[Chemical formula 2]

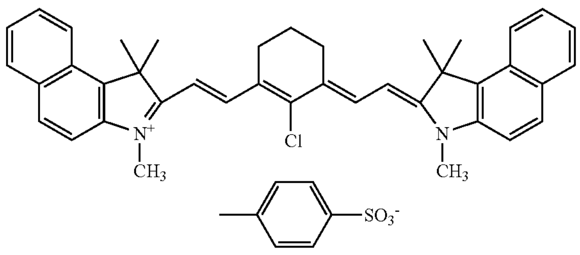

CYANINE DYE A

Example 1-14, 1-15 and Comparative 1-7

The presensitized plates in Examples 1-14, 1-15 and Comparative Example 1-7 were each obtained by providing a thermal positive working image recording layer B (multilayered thermal sensitive layer) on each of the support for the lithographic printing plate obtained in the aforementioned Examples 1-2, 1-12 and Comparative 1-1. Before the image recording layer B was provided, the undercoat surface treatment was performed in the aforementioned conditions.

The aforementioned composition of the undercoat solution was coated on the support for the lithographic printing plate obtained as above after alkali metal silicate treatment was performed, the support was dried at 80° C. for 15 seconds and thus the film was formed. The coated quantity of the film after dried was 15 $mg/m^2$.

<Image Recording Layer B (Multilayered Thermal Sensitive Layer)>

After the thermal sensitive layer coating solution B1 having the following composition was further coated on the support for the lithographic printing plate obtained as above on which the undercoat treatment was performed so as to allow the coated quantity to be 0.85 $g/m^2$, the support was dried at 140° C. for 50 seconds in PERFECT OVEN PH200 made by Tabai Co., Ltd. with Wind Control set at 7, and then, after the thermal sensitive layer coating solution B2 having the following composition was coated so as to allow the coated quantity to be 0.15 $g/m^2$, the support was dried at 120° C. for 1 minute, and the thermal sensitive layer B (thermal positive working image recording layer B) was formed to obtain the presensitized plate.

| (Composition of thermal sensitive solution B1) | |
|---|---|
| Copolymer of N-(4-aminosulfonyl)methacrylamide, acrylonitrile, and methyl methacrylate (mole ratio: 36/34/30, weight average molecular weight: 50,000, acid value: 2.65) | 2.133 g |
| Cyanine dye A expressed by the aforementioned formula | 0.109 g |
| 4,4'-Bishydroxyphenylsulfone | 0.126 g |
| Tetrahydrophthalic anhydride | 0.190 g |
| p-Toluenesulfonic acid | 0.008 g |
| 3-Methoxy-4-diazophenylamine hexafluorophosphate | 0.030 g |
| A compound in which the counter ion of ethylviolet substituted to 6-hydroxy-2-naphthalenesulfone | 0.100 g |
| Fluoro surfactant for improving coated surface properties (Megaface F-176, 20% solution, made by Dainippon Ink and Chemicals, Inc.) | 0.035 g |
| Methyl ethyl ketone | 25.38 g |
| 1-Methoxy-2-propanol | 13.0 g |
| γ-Butylolactone | 13.2 g |

| (Composition of thermal sensitive layer coating solution B2) | |
|---|---|
| m, p-Cresol novolak (m/p ratio = 6/4, weight average molecular weight 4,500, unreacted cresol 0.8 wt % contained) | 0.2846 g |
| Cyanine dye A expressed by the aforementioned structure | 0.075 g |
| Behenic acid amide | 0.060 g |
| Fluoro surfactant for improving coated surface properties (Megaface F-176, 20% solution, made by Dainippon Ink and Chemicals, Inc.) | 0.022 g |
| Fluoro surfactant for improving image formation (Megaface MCF-312, 30% solution, made by Dainippon Ink and Chemicals, Inc.) | 0.120 g |
| Methyl ethyl ketone | 15.1 g |
| 1-Methoxy-2-propanol | 7.7 g |

1-(4) Exposure and Development Treatment

Image exposure and development treatment were performed on each of the presensitized plates obtained above in the following method to obtain the lithographic printing plate.

Image-wise exposure was performed at a main scanning rate of 5 m/sec. and in plate-surface energy quantity of 140 $mJ/cm^2$ with Creo Co., Ltd-made TrendSetter 3244 equipped with a semiconductor laser with output of 500 mW, wavelength 830 nm and beam diameter of 7 μm ($1/e^2$).

Thereafter, development treatment was performed by using an alkali developer (developer 1) where the following compound a of 1.0 g was added to 1 liter of an aqueous solution containing potassium salt of 5.0 wt % including D-sorbitol/potassium oxide, $K_2O$, in which a non-reducing sugar and a base were combined, and olefin AK-02 (made by Nissin Chemical Industry Co., Ltd.). Development treatment was performed under the conditions of a development temperature of 25° C. for 12 seconds by using automatic processor PS900NP (made by Fuji Photo Film Co., Ltd.) filled with developer 1. After the development treatment was completed, and rinsing process done, a treatment was performed on the plate with gum (GU-7 (1:1)) or the like to obtain the lithographic printing plate with plate making completed.

In addition, in order to evaluate the dot residual layers later described, samples where exposure was performed by changing a plate energy quantity every 20 mJ/$cm^2$ from 20 to 140 mJ/$cm^2$ was prepared.

In addition, development treatment could be similarly performed although an alkali developer where the following compound b or c of the same quantity added was used in place of the compound a.

<Compounds a to c>

Compound a: $C_{12}H_{25}N\ (CH_2CH_2COONa)_2$

Compound b: $C_{12}H_{25}O(CH_2CH_2O)_7H$

Compound c: $(C_6H_{13})_2CHO(CH_2CH_2O)_{20}H$ 1-(5) Evaluation of Lithographic Printing Plate For the lithographic printing plate obtained above, ink spreading resistance, left-plate scum resistance, scum resistance and generation/non-generation of dot residual layers were evaluated in the following method.

In addition, sum resistance was evaluated by scumming.

(1) Ink Spreading Resistance

This was evaluated in 10 steps according to the extent of ink spreading in the halftone dot areas by reducing the fountain solution with SOR-M printing machine made by Heidelberg Druckmachinen AG using DIC-GEOS (H) black ink made by Dainippon Ink and Chemicals, Inc. The results are shown in Tables 1-[6] to 1-[8]. The larger the number is, the more excellent the ink spreading resistance is. If the evaluation is 5 or higher, ink spreading resistance is excellent. If the evaluation is 6 or higher, as the lithographic printing plate where ink spreading can be avoided, it is at a practical level, and 8 or higher is further preferable.

(2) Left-plate Scum Resistance

In the evaluation of the aforementioned ink spreading resistance, after 10,000 sheets were printed out, the plate was left as its stand for 1 hour under the conditions of a low humidity environment (concretely, 50 RH %), and then, printing was again started. The evaluation was performed in 10 steps according to the extent of scum in the halftone dot areas. The results are shown in Tables [1]-6 to [1]-8. The larger the number is, the more excellent the left-plate scum resistance is. If the evaluation is 5 or higher, as the lithographic printing plate where left-plate scum resistance is excellent, it is at a practical level.

(3) Scum Resistance (Scumming)

In the printing test, the water scale of the printing machine was adjusted, and then the scumming was evaluated by the water scale at which scumming occurs. The results are shown in Tables [1]-6 to [1]-8. The larger the number is, the more excellent the left-plate scum resistance is. It is determined to be "excellent" if the water scale at which scumming occurs is less than 1, "very good" if the water scale at which scumming occurs is 1 or higher and less than 2, "good" if the water scale at which scumming occurs is 2 or higher and less than 3, "fair" if the water graduation at which scumming occurs is 3 or higher and less than 4, and "poor" if the water scale at which scumming occurs is 4 or higher. If the evaluation is "good" or higher, scum resistance is excellent.

(4) Generation/Non-generation of Dot Residual Layers

The non-image area after development was observed on the sample exposed by each plate surface energy quantity with an optical microscope at a magnification of 100 to check the existence of dot residual layers in an area of 1 mm square. The generation/non-generation of dot residual layers were evaluated in 12 steps from the minimum value of the plate surface energy quantity of a sample where dot residual layers are not observed. The results are shown in Tables [1]-6 to [1]-8.

The smaller the plate surface energy is, in other words, the larger the evaluation number is, the more hardly the dot residual layers occur.

As clearly shown from Tables [1]-6 to [1]-8, for the support for the lithographic printing plate (Examples 1-1 to 1-16) where the aforementioned $\Delta S^{50(50)}$, $\Delta S^{50(2-50)}$ and $\Delta S^{50(0.2-2)}$ obtained from the three-dimensional data found by measuring 512×512 points in 50 μm square on the surface with the atomic force microscope stay within the range according to the present invention, water wettability and water receptivity can be improved irrespective of the image recording layer provided thereon, and the presensitized plate using the same is scum resistant in the non-image areas, ink spreading in the halftone dot areas hardly occurs, and left-plate scum resistance under a low-humidity environment is excellent when the lithographic printing plate is manufactured.

In addition, for the support for the lithographic printing plate (Examples 1-8 to 1-11, 1-14 and 1-15) where the number of recesses having a certain depth existing on the surface on the support for the lithographic printing plate with the aforementioned surface area ratio $\Delta S^{50}$ stays within the range according to the present invention, the generation of dot residual layers can be particularly suppressed although the conditions of exposure and development becomes tight.

TABLE [1]-6

| | Surface area ratio ΔS | | | Ink spreading | Left-plate scum | Scum |
|---|---|---|---|---|---|---|
| | $\Delta S^{50(50)}$ | $\Delta S^{50(2-50)}$ | $\Delta S^{50(0.2-2)}$ | resistance | resistance | resistance |
| Example 1-1 | 50 | 6 | 35 | 9 | 8 | very good |
| Example 1-2 | 40 | 5 | 26 | 7 | 7 | very good |
| Example 1-3 | 30 | 10 | 18 | 8 | 7 | very good |

TABLE [1]-6-continued

| | Surface area ratio ΔS | | | Ink spreading | Left-plate scum | Scum |
|---|---|---|---|---|---|---|
| | $\Delta S^{50(50)}$ | $\Delta S^{50(2-50)}$ | $\Delta S^{50(0.2-2)}$ | resistance | resistance | resistance |
| Example 1-4 | 85 | 28 | 38 | 10 | 7 | good |
| Example 1-5 | 38 | 3 | 39 | 6 | 8 | very good |
| Example 1-6 | 24 | 6 | 23 | 9 | 9 | very good |
| Example 1-7 | 22 | 4 | 7 | 7 | 9 | very good |
| Example 1-12 | 33 | 7 | 21 | 9 | 8 | very good |
| Example 1-13 | 55 | 5 | 39 | 6 | 8 | very good |
| Comparative Example 1-1 | 60 | 19 | 42 | 5 | 4 | very good |
| Comparative Example 1-2 | 90 | 32 | 40 | 10 | 7 | poor |
| Comparative Example 1-3 | 15 | 10 | 3 | 4 | 3 | very good |

TABLE [1]-7

| | Dpn | Dpn | Surface area ratio ΔS | | | Ink spreading | Left-plate scum | Scum | Generation/non-generation of dot residual |
|---|---|---|---|---|---|---|---|---|---|
| | (3 μm) | (4 μm) | $S^{50(50)}$ | $\Delta S^{50(2-50)}$ | $\Delta S^{50(0.2-2)}$ | resistance | resistance | resistance | layers |
| Example 1-8 | 15 | 5 | 50 | 6 | 35 | 9 | 8 | very good | 8 |
| Example 1-9 | 21 | 8 | 55 | 10 | 36 | 9 | 8 | very good | 7 |
| Example 1-10 | 11 | 1.5 | 49 | 5 | 33 | 9 | 8 | very good | 9 |
| Example 1-11 | 8 | 0.8 | 38 | 6 | 28 | 7 | 7 | very good | 11 |
| Example 1-16 | 29 | 12 | 58 | 25 | 36 | 9 | 8 | good | 4 |
| Comparative Example 1-4 | 29 | 10 | 60 | 32 | 30 | 9 | 8 | poor | 5 |
| Comparative Example 1-5 | 35 | 11 | 60 | 32 | 38 | 9 | 8 | poor | 1 |
| Comparative Example 1-6 | 33 | 10 | 62 | 33 | 40 | 9 | 6 | poor | 1 |

TABLE [1]-8

| | Dpn | Dpn | SURFACE AREA RATIO ΔS | | | Ink spreading | Left-plate scum | Scum | Generation/non-generation of dot residual |
|---|---|---|---|---|---|---|---|---|---|
| | (3 μm) | (4 μm) | $\Delta S^{50(50)}$ | $\Delta S^{50(2-50)}$ | $\Delta S^{50(0.2-2)}$ | resistance | resistance | resistance | layers |
| Example 1-14 | 14 | 3.2 | 40 | 5 | 26 | 7 | 7 | very good | 6 |
| Example 1-15 | 8 | 1 | 33 | 7 | 21 | 9 | 8 | excellent | 12 |
| Comparative Example 1-7 | 45 | 25 | 60 | 19 | 42 | 5 | 4 | good | 2 |

[2] Example and Comparative Example in Second Embodiment According the Present Invention

2-(1) Preparation of Support for Lithographic Printing Plate

Examples 2-1 to 2-8 and Comparative Examples 2-1 to 2-5)

<Aluminum Plate>

The surface treatments described below were conducted to each aluminum plate containing different elements as shown in Table [2]-1.

TABLE [2]-1

| Aluminum Plate | Fe [wt %] | Si [wt %] | Cu [wt %] | Ti [wt %] |
|---|---|---|---|---|
| 1 | 0.3 | 0.08 | 0.001 | 0.015 |
| 2 | 0.3 | 0.08 | 0.015 | 0.020 |
| 3 | 0.28 | 0.08 | 0.025 | 0.015 |

<Surface Treatment>

The supports for the lithographic printing plate in Examples 2-1 to 2-8 and Comparative Examples 2-1 to 2-5 were obtained by continuously performing the various surface treatments of the following (a) to (k) in the combinations as shown in Table [2]-2. Squeegeeing was performed with a nip roller after each treatment and after rinsing was performed.

In addition, "-" in Table [2]-2 shows that the corresponding treatment was not performed.

TABLE [2]-2

| | Aluminum plate | (a) Mechanical graining treatment | (b) Alkali etching treatment | (c) Desmutting treatment | (d) Electrochemical graining treatment | (e) Alkali etching treatment | (f) Desmutting treatment | (g) Electrochemical graining treatment | (h) Alkali etching treatment | (i) Desmutting treatment | (j) Anodizing treatment | (k) Silicate treatment |
|---|---|---|---|---|---|---|---|---|---|---|---|---|
| Example 2-1 | 2 | B-1 | E-1 | D-1 | C-2 | E-4 | D-2 | M-2 | E-7 | D-2 | A-1 | S-1 |
| Example 2-2 | 1 | B-1 | E-1 | D-1 | C-1 | E-5 | D-2 | M-2 | E-7 | D-2 | A-1 | S-1 |
| Example 2-3 | 2 | B-1 | E-1 | D-1 | C-2 | E-3 | D-2 | M-2 | E-7 | D-2 | A-1 | S-1 |
| Example 2-4 | 1 | B-1 | E-1 | D-1 | C-1 | E-6 | D-2 | M-2 | E-7 | D-2 | A-1 | S-1 |
| Example 2-5 | 2 | B-1 | E-1 | D-1 | C-2 | E-2 | D-2 | M-2 | E-7 | D-2 | A-1 | S-1 |
| Example 2-6 | 2 | B-1 | E-1 | D-1 | C-2 | E-6 | D-2 | M-2 | E-7 | D-2 | A-1 | S-1 |
| Example 2-7 | 2 | — | E-2 | D-2 | M-1 | E-7 | D-2 | — | — | — | A-1 | S-1 |
| Example 2-8 | 3 | B-1 | E-1 | D-1 | C-3 | E-3 | D-3 | M-3 | E-7 | D-2 | A-1 | S-1 |
| Comparative Example 2-1 | 2 | — | E-2 | D-1 | C-2 | E-7 | D-2 | — | — | — | A-1 | S-1 |
| Comparative Example 2-2 | 2 | B-1 | E-1 | D-1 | C-2 | E-4 | D-2 | — | — | — | A-1 | S-1 |
| Comparative Example 2-3 | 2 | B-1 | E-1 | D-1 | C-2 | E-4 | D-2 | M-2 | E-8 | D-2 | A-1 | S-1 |
| Comparative Example 2-4 | 2 | B-2 | E-1 | D-1 | C-2 | E-7 | D-2 | M-2 | E-7 | D-2 | A-1 | S-1 |
| Comparative Example 2-5 | 2 | — | E-2 | D-2 | M-1 | E-6 | D-2 | — | — | — | A-1 | S-1 |

Below described are each surface treatment (a) to (k).

(a) Mechanical Graining Treatment (Brush Graining Method)

Mechanical graining treatment was performed by the rotating roller-like brushes (in this Example, bundled bristles-implanted brushes) while supplying an aqueous abrasive (pumice) suspension (specific gravity: 1.1 g/cm$^3$) as an abrasive slurry to the surface of the aluminum plate with such a device as typically shown in FIG. 1.

The median diameter of the abrasive was as shown in Table [2]-3. The material of nylon brushes was 6–10 nylon, the length of the bristle was 50 mm, and the diameter of the bristles was 0.3 mm. For the nylon brushes, the bristles were implanted so as to be thick on 400 mmϕ stainless steel-made cylinders by arranging holes thereon. Although two nylon brushes only are shown in FIG. 1, the number of brushes as shown in Table 3 was actually used. The distance between the two support rollers (200 mmϕ) under the brushes was 300 mm. The brush rollers were pressed against the aluminum plate until the load of the drive motor which rotates the brushes increases up until 10 kW to the load before the brush rollers were pressed against the aluminum plate. The rotational direction of the brushes was the same direction of the movement of the aluminum plate. The revolutions of the brushes were as indicated in Table 3. In addition, the revolutions of the brushes in Table [2]-3 were shown as the first brush, the second brush and the third brush were shown in order from the upstream in the transferring direction of the aluminum plate.

TABLE [2]-3

| Condition | Median diameter of abrasive (μm) | Number of brushes (number) | Revolution of brush (rpm) |
|---|---|---|---|
| B-1 | 25 | 3 | 1st brush: 250<br>2nd and 3rd brushes: 200 |
| B-2 | 45 | 3 | 1st brush: 250<br>2nd and 3rd brushes: 200 |

(b) Alkali Etching Treatment

Alkali etching treatment was performed in any one of the conditions E-1 to E-8 as shown in Table [2]-4.

Concretely, etching treatment was performed by using an aqueous sodium hydroxide solution with sodium hydroxide concentration and aluminum ion concentration as shown in Table [2]-4 with a spray, and in the aluminum meltage as shown in Table [2]-4. Thereafter, rinsing was performed with a spray. In addition, the temperature of the alkali etching treatment was 70° C.

TABLE [2]-4

| Condition | Sodium hydroxide concentration (wt %) | Aluminum ion concentration (wt %) | Aluminum meltage (g/m$^2$) |
|---|---|---|---|
| E-1 | 26 | 5 | 10 |
| E-2 | 26 | 5 | 5 |
| E-3 | 26 | 5 | 3 |
| E-4 | 26 | 5 | 1 |
| E-5 | 26 | 5 | 0.5 |
| E-6 | 26 | 5 | 0.3 |
| E-7 | 5 | 0.5 | 0.1 |
| E-8 | 5 | 0.5 | 0.5 |

(c) Desmutting Treatment

Desmutting treatment was performed in any one of the conditions D-1 to D-3 as shown in Table [2]-5.

Concretely, desmutting treatment was performed with a spray by using the type of acid and the temperature and concentration of the aqueous acid solution as shown in Table [2]-5, thereafter, rinsing was performed with a spray. In addition, the aqueous nitric acid solution used in the condition D-1 was the wastewater in the process where electrochemical graining treatment was performed by using AC in the aqueous nitric acid solution.

TABLE [2]-5

| Condition | Kind of acid | Temperature (° C.) | Concentration (wt %) |
|---|---|---|---|
| D-1 | Nitric acid | 30 | 1 |
| D-2 | Sulfuric acid | 60 | 25 |
| D-3 | Sulfuric acid | 30 | 25 |

(d) Electrochemical Graining Treatment

Electrochemical graining treatment was performed in any one of conditions C-1 to C-3 as shown in Table [2]-6 and conditions M-1 to M-3 as shown in Table [2]-7. Concretely, the treatment was performed as mentioned below.

(d-1) Nitric Acid Electrolysis (Conditions C-1 to C-3)

Electrochemical graining treatment was continuously performed using AC of 60 Hz. The electrolytic solution in this case was a 1 wt % aqueous nitric acid solution (containing 0.5 wt % aluminum ion) at a solution temperature of 50° C. The AC power supply waveform was a waveform shown in FIG. 2, which was a trapezoidal rectangular wave AC of a time TP where current value reached the peak from zero in 0.8 msec and the duty ratio thereof was 1:1. The electrochemical graining treatment was performed with a carbon electrode as a counter electrode by using this current. An auxiliary anode used was ferrite. An electrolysis bath used was the one shown in FIG. 3.

The current density was 30 A/dm$^2$ at the peak value of the current and 5% of the current flowing from the power supply was shunted to the auxiliary anode electrode. The quantity of electricity in the nitric acid electrolysis was the total of the quantity of electricity when the aluminum plate was at the anode side, which was determined to be the value as shown in Table [2]-6.

Thereafter, rinsing was performed with a spray.

TABLE [2]-6

| Condition | Quantity of electricity (C/dm$^2$) |
|---|---|
| C-1 | 175 |
| C-2 | 220 |
| C-3 | 200 |

(d-2) Hydrochloric Acid Electrolysis (Conditions M-1 to M-3)

Electrochemical graining treatment was continuously performed using AC of 60 Hz. The temperature of the electrolytic solution was 50° C. The AC power supply waveform was a waveform shown in FIG. 2, which was a trapezoidal rectangular wave AC of a time TP where current value reached the peak from zero in 0.8 msec and the duty ratio thereof was 1:1. The electrochemical graining treatment was performed with a carbon electrode as a counter electrode by using this current. For an auxiliary anode, ferrite was used. For an electrolysis bath, the one shown in FIG. 3 was used.

The current density was 25 A/dm$^2$ at the peak value of the current.

The electrolytic solution used for hydrochloric acid electrolysis was an aqueous hydrochloric acid solution (containing 0.5 wt % aluminum ion) with a hydrochloric acid concentration shown in Table [2]-7, and the quantity of electricity in the hydrochloric acid electrolysis was the total of the quantity of electricity when the aluminum plate was at the anode side, which was shown in Table [2]-7.

Thereafter, rinsing was performed with a spray.

TABLE [2]-7

| Condition | Hydrochloric acid concentration wt %) | Quantity of electricity (C/dm$^2$) |
|---|---|---|
| M-1 | 1 | 400 |
| M-2 | 0.5 | 50 |
| M-3 | 0.5 | 65 |

(e) Alkali Etching Treatment

Alkali etching treatment was performed in any one of conditions E-1 to E-8 as shown in Table [2]-4. Thereafter, rinsing was performed with a spray.

(f) Desmutting Treatment

Desmutting treatment was performed in any one of conditions D-1 to D-3 as shown in Table [2]-5. Thereafter, rinsing was performed with a spray.

(g) Electrochemical Graining Treatment

Electrochemical graining treatment was performed in any one of the conditions C-1 to C-3 as shown in Table [2]-6 and M-1 to M-3 as shown in Table [2]-7. Thereafter, rinsing was performed with a spray.

(h) Alkali Etching Treatment

Alkali etching treatment was performed in any one of the conditions E-1 to E-8 as shown in Table [2]-4. Thereafter, rinsing was performed with a spray.

(i) Desmutting Treatment

Desmutting treatment was performed in any one of the conditions D-1 to D-3 as shown in Table [2]-5. Thereafter, rinsing was performed with a spray.

(j) Anodizing Treatment

Anodizing treatment was performed in the condition A-1 as in (j) in the first embodiment in the aforementioned [1].

(k) Silicate Treatment

Silicate treatment was performed in the condition S-1 as in (k) in the first embodiment in the aforementioned [1].

2-(2) Calculation of Factor of Surface Shape of Support for Lithographic Printing Plate For the surface of the support for the lithographic printing plate obtained as above, $\Delta S^{50}$, $a45^{50(0.2\text{-}2)}$, $\Delta S^{5(0.02\text{-}0.2)}$ and $a45^{5(0.02\text{-}0.2)}$ were found as indicated below.

The results are in Table [2]-8.

(1) Measurement of Surface Shape with Atomic Force Microscope

In order to determine $\Delta S^{50}$, $a45^{50(0.2\text{-}2)}$, $\Delta S^{5(0.02\text{-}0.2)}$ and $a45^{5(0.02\text{-}0.2)}$, the surface shape was measured with an atomic force microscope (SPA300/SPI3800N, made by Seiko Instruments Inc.) to obtain the three-dimensional data.

The method of obtaining the three-dimensional data was the same as in the first embodiment in the aforementioned [1].

In the measurement, for $\Delta S^{50}$ and $a45^{50(0.2\text{-}2)}$, 512×512 points in 50 μm square on the surface were measured. It was determined that the resolution in XY directions was 0.1 μm, the resolution in Z direction was 0.15 nm and the scanning rate was 50 μm/sec.

In addition, for $\Delta S^{5(0.02\text{-}0.2)}$ and $a45^{5(0.02\text{-}0.2)}$, 512×512 points in 5 μm square on the surface were measured. It was set as that the resolution in XY directions was 0.01 μm, the resolution in Z direction was 0.15 nm and the scanning rate was 5 μm/sec.

(2) Compensation of Three-dimensional Data

The three-dimensional data, based on the measurement of 50 μm square on the surface and found in the aforementioned (1), was used as it was to calculate $\Delta S^{50}$.

The one that the components with wavelength of 0.2 μm or more and 2 μm or less were extracted from the three-dimensional data, based on the measurement of 50 μm square on the surface and found in the aforementioned (1), was used to calculate $a45^{50(0.2\text{-}2)}$. Fast Fourier transformation was performed on the three-dimensional data found in the aforementioned (1) to determine the frequency distribution, and next, after the components with wavelength of less than 0.2 μm and of more than 2 μm were removed, Fourier inverse transformation was performed to extract the components with wavelength of 0.2 μm or more and 2 μm or less.

In addition, the one that the components with wavelength of 0.02 μm or more and 0.2 μm or less were extracted from the three-dimensional data, based on the measurement of 5 μm square on the surface and found in the aforementioned (1), was used to calculate $\Delta S^{5(0.02\text{-}0.2)}$ and $a45^{5(0.02\text{-}0.2)}$ Fast Fourier transformation was performed on the three-dimensional data found in the aforementioned (1) to determine the frequency distribution, and next, after the components with wavelength of less than 0.02 μm and of more than 0.2 μm were removed, Fourier inverse transformation was performed to extract the components with wavelength of 0.02 μm or more and 0.2 μm or less.

(3) Calculation of Each Factor

<1> $\Delta S^{50}$

Using the three-dimensional data (f(x, y)) obtained in the aforementioned (1), adjacent three points were extracted, and total of an area of a micro triangle formed by the three points was determined to be an actual area $S_x^{50}$. Surface area ratio $\Delta S^{50}$ was obtained by the aforementioned equation (1) from the obtained actual area $S_x^{50}$ and geometrically measured area $S_o^{50}$.

<2> $a45^{50(0.2\text{-}2)}$

Using the three-dimensional data (f(x, y)) obtained by the compensation in the aforementioned (2), a micro triangle formed by each reference point and adjacent second and third points in a predetermined direction (for example, the right and the lower) and an angle formed by the micro triangle and a reference plane were calculated for each reference point. The number of reference points of the micro triangle where gradients were 45° or more was divided by the number of all the reference points (the number determined by deducting the number of points, which had no two adjacent points in a predetermined direction, from 512×512 points which were the number of all the data, that is, 511×511 points) to calculate area ratio $a45^{50(0.2\text{-}2)}$ where gradients were 45° or more.

<3> $\Delta S^{5(0.02\text{-}0.2)}$

Using the three-dimensional data (f(x, y)) obtained by the compensation in the aforementioned (2), adjacent three points were extracted, and a total sum of areas of a micro triangle formed by the three points was determined to be an actual area $S_x^{5(0.02\text{-}0.2)}$. Surface area ratio $\Delta S^{5(0.02\text{-}0.2)}$ was obtained by the aforementioned equation (2) from the determined actual area $S_x^{5(0.02\text{-}0.2)}$ and geometrically measured area $S_o^{5}$.

<4> $a45^{5(0.02\text{-}0.2)}$

Using the three-dimensional data (f(x, y)) obtained by the compensation in the aforementioned (2), a micro triangle formed by each reference point and adjacent second and third points in a predetermined direction (for example, the right and the lower) and an angle formed by the micro triangle and a reference plane were calculated for each reference point. The number of reference points of the micro triangle where gradients were 45° or more was divided by the number of all the reference points (the number determined by deducting the number of the points, which had no two adjacent points in a predetermined direction, from 512×512 points which were the number of all the data, that is, 511×511 points) to calculate area ratio $a45^{5(0.02\text{-}0.2)}$ of parts where gradients were 45° or more.

In addition, for the number of local recesses with a depth of 4 μm or more existent on the surface, three-dimensional data was obtained by scanning without contact 400 μm×400 μm on the surface in resolution of 0.01 μm with a laser microscope (Micromap 520, made by Ryoka Systems Inc.), and the number of recesses with a depth of 4 μm or more was counted in this three-dimensional data. Five parts were measured per sample and the average value was found.

Other than the laser microscope used above, ultra-deep profile measurement microscope VK 5800 made by KEYENCE CORPORATION, for example, can be similarly used.

2-(3) Preparation of Presensitized Plate

A presensitized plate was obtained by similarly providing either a thermal positive working image recording layer A or B used in the first embodiment 1-(3) in the aforementioned [1] on each of the supports for lithographic printing plates obtained above. An undercoat layer was similarly provided before the image recording layer A or B was provided.

2-(4) Exposure and Development Treatment

Image exposure and development treatment were performed on each of the presensitized plates obtained above in the same method as in the first embodiment 1-(4) in the aforementioned [1] to obtain a lithographic printing plate.

2-(5) Evaluation of Lithographic Printing Plate

A press life, cleaner press life, scum resistance, ink-receptivity in solid areas and generation/non-generation of dot residual layers were evaluated with regard to the lithographic printing plate obtained above in the following methods.

(1) Press Life

Printing was performed using DIC-GEOS (N) ink made by Dainippon Ink and Chemicals, Inc. with a printing machine SPRINT made by Komori Corporation, and press life was evaluated by the impression number at a time when density of solid image started decreasing, which was visually recognized.

The results are shown in Table [2]-9. Incidentally, the press life is shown in a relative value, when the press life in Example 2-6 is assumed to be 100.

(2) Cleaner Press Life

Printing was performed in the same conditions as in the evaluation of press life, the solid image area was cleaned every 5,000 prints with a plate cleaner solution (MULTI-CLEANER, made by Fuji Photo Film Co., Ltd.) using a sponge, and cleaner press life was evaluated by the impression number at a time when the solid image area became light and faint, which was visually recognized.

The results are shown in Table [2]-9. Incidentally, cleaner press life is indicated in a relative value, when the cleaner press life in Example 2-6 is assumed to be 100.

(3) Scum Resistance (Scumming)

Printing was performed with a printing machine Mitsubishi Diamond F2 (made by Mitsubishi Heavy Industries, Ltd.) using LEOECOO violet ink, and blanket scum (scumming) after printing 10,000 sheets of paper was visually evaluated.

The results are shown in Table [2]-9. Scum resistance is evaluated on a scale of 1 to 12 according to the extent of the blanket scum. The larger the number is, the more excellent the scum resistance is. If the evaluation is 7 or higher, it is at a practical level as a lithographic printing plate where scum resistance is excellent.

(4) Ink-receptivity in Solid Area

Printing was performed with a printing machine Mitsubishi Diamond F2 (made by Mitsubishi Heavy Industries, Ltd.) using DIC-GEOS (s) magenta ink, and ink-receptivity in a solid area was evaluated by the number of printed sheets where non-image portions in the solid area, that is, inadequate inking occurred. Incidentally, coated recycled paper (OK coat, made by Oji Paper Co., Ltd.) was used as printing paper.

The results are shown in [2]-9. The property is evaluated on a scale of 1 to 12 according to the number of printed sheets where inadequate inking in the solid area occurred. The larger the number is, the more excellent the ink-receptivity is. If the evaluation is 7 or higher, it is at a practical level as a lithographic printing plate where scum resistance is excellent.

(5) Generation/Non-generation of Dot Residual Layers

This was evaluated in the same conditions as in the evaluation (4) of the lithographic printing plate in the first embodiment 1-(5) in the aforementioned [1].

The results are shown in Table [2]-9. They are shown as “excellent,” “very good,” “good,” and “poor” in the order from small to big minimum value of plate surface energy quantity.

As is clear from Tables [2]-8 and [2]-9, the presensitized plate according to the present invention using the support for the lithographic printing plate (Examples 2-1 to 2-8) of the present invention, each of surface area ratio $\Delta S^{50}$ and steepness $a45^{50(0.2\text{-}2)}$, found from the three-dimensional data obtained by measuring 512×512 points in 50 μm square on the surface with an atomic force microscope, meets certain conditions, is excellent in press life and scum resistance as a lithographic printing plate, and inadequate inking hardly occurs on a solid area.

In addition, the presensitized plate according to the present invention using the support for the lithographic printing plate (Examples 2-1 to 2-8) of the present invention, each of surface area ratio $\Delta S^{5(0.02\text{-}0.2)}$ and steepness $a45^{5}_{(0.02\text{-}0.2)}$, found from the three-dimensional data obtained by measuring 512×512 points in 5 μm square on the surface with an atomic force microscope, meets certain conditions, is excellent in cleaner press life.

Further, in the presensitized plate according to the present invention using the support for the lithographic printing plate of the present invention (Example 2-1 to 2-8) where the number of local recesses with depth of 4 μm or more existent on the surface is 6 or less per 400 μm×400 μm, dot residual layers hardly occur.

TABLE [2]-8

| | $\Delta S^{50}$ | $a45^{50(0.2\text{-}2)}$ | $\Delta S^{5(0.02\text{-}0.2)}$ | $a45^{5(0.02\text{-}0.2)}$ | Number of local recesses (number/400 μm square) |
|---|---|---|---|---|---|
| Example 2-1 | 45 | 25 | 33 | 26 | 0.8 |
| Example 2-2 | 39 | 21 | 43 | 30 | 0.2 |
| Example 2-3 | 38 | 10 | 41 | 27 | 0.6 |
| Example 2-4 | 46 | 31 | 42 | 31 | 1.2 |
| Example 2-5 | 30 | 13 | 37 | 29 | 1.0 |
| Example 2-6 | 55 | 35 | 57 | 40 | 3.8 |
| Example 2-7 | 34 | 6 | 30 | 10 | 5.5 |
| Example 2-8 | 58 | 28 | 50 | 30 | 0.2 |
| Comparative Example 2-1 | 45 | 41 | 45 | 31 | 0.0 |
| Comparative Example 2-2 | 25 | 12 | 12 | 7 | 1.8 |
| Comparative Example 2-3 | 29 | 33 | 28 | 19 | 1.9 |
| Comparative Example 2-4 | 50 | 42 | 62 | 45 | 7.8 |
| Comparative Example 2-5 | 25 | 9 | 20 | 11 | 3.5 |

TABLE [2]-9

| Support | Image recording layer | Press life | Cleaner press life | Scum resistance | Adequate inking in solid area | Generation/non-generation of dot residual layers |
|---|---|---|---|---|---|---|
| Example 2-1 | A | 110 | 110 | 11 | 11 | very good |
| Example 2-2 | A | 100 | 130 | 10 | 10 | very good |
| Example 2-3 | A | 100 | 100 | 12 | 12 | very good |
| Example 2-4 | A | 100 | 130 | 9 | 9 | very good |
| Example 2-5 | A | 95 | 95 | 12 | 12 | very good |
| Example 2-6 | A | 100 | 100 | 9 | 9 | good |
| Example 2-7 | A | 90 | 90 | 12 | 12 | very good |
| Example 2-8 | A | 120 | 120 | 12 | 11 | very good |
| Comparative Example 2-1 | A | 100 | 130 | 5 | 5 | very good |
| Comparative Example 2-2 | A | 50 | 30 | 12 | 9 | good |
| Comparative Example 2-3 | A | 100 | 70 | 9 | 9 | good |
| Comparative Example 2-4 | A | 110 | 130 | 4 | 3 | poor |
| Comparative Example 2-5 | A | 75 | 40 | 12 | 12 | good |
| Example 2-1 | B | 115 | 120 | 11 | 11 | good |
| Example 2-8 | B | 128 | 130 | 12 | 11 | excellent |
| Comparative Example 2-1 | B | 105 | 130 | 5 | 5 | very good |

[3] Examples and Comparative Example in 3rd Emodiment According to the Present Invention

3-(1) Preparation of Support for Lithographic Printing Plate

Examples 3-1 to 3-13, Comparative Examples 3-1 to 3-7

<Aluminum Plate>

A molten metal was prepared using an aluminum alloy containing Si, Fe, Cu and Ti in a quantity (wt %) as shown in Table [3]-1 and Al and inevitable impurities for the rest. Molten metal treatment and filtration were performed, and an ingot with thickness of 500 mm and width of 1,200 mm was prepared with DC casting process. After the surface was chipped with a surface chipper by thickness of average 10 mm, the ingot was kept at 550° C. for about 5 hours, and when the temperature dropped to 400° C., a rolled plate with thickness of 2.7 mm was prepared with a hot rolling mill. Further, after a thermal treatment was performed on the ingot at 500° C. with a continuous annealing machine, the plate was finished with thickness of 0.24 mm by cold rolling and an aluminum plate was obtained. After the width of this aluminum plate was made to 1,030 mm, the following treatments were performed on the aluminum plate surface.

TABLE [3]-1

| | Aluminum No. | Fe | Si | Cu | Ti |
|---|---|---|---|---|---|
| Examples 3-1~3-10 Comparative Examples 3-1~3-4 | Aluminum-1 | 0.3 | 0.08 | 0.001 | 0.015 |
| Example 3-11 | Aluminum-2 | 0.3 | 0.08 | 0.027 | 0.02 |
| Example 3-12 | Aluminum-3 | 0.3 | 0.08 | 0.04 | 0.02 |
| Comparative Examples 3-5, 3-6 | Aluminum-4 | 0.3 | 0.08 | 0.055 | 0.02 |
| Example 3-13 Comparative Example 3-7 | Aluminum-5 | 0.3 | 0.08 | 0.012 | 0.015 |

<Surface Treatment>

For the surface treatment, the following treatments (a) to (k) were continuously performed. Incidentally, squeegeeing was performed with a nip roller after each treatment and rinsing were performed.

(a) Mechanical Graining Treatment (Brush Grain Method)

Mechanical graining treatment was performed with a rolling bundled bristles-implanted brush while supplying pumice suspension with specific gravity of 1.1 g/cm$^3$ as abrasive slurry liquid to the surface of the aluminum plate using a device as shown in FIG. 1. Median diameter (μm) of an abrasive, the number of brushes and revolution of brush (rpm) shown in Table [3]-2 were applied. The bristles of the bundled bristles-implanted brush had diameter of 0.3 mm and length of 45 mm, and holes were arranged on a 400 mmϕ stainless steel-made cylinder so as to allow the bristles to be thickly implanted. The distance between two support rollers (200 mmϕ) under the brush was 300 mm. The bundled bristles-implanted brush was pressed against the aluminum plate until the load of a drive motor which rotates the brush increased by 10 kW compared to the load before the bundled bristles-implanted brush was pressed against the aluminum plate. The rotating direction of the brush was the same direction as the moving direction of the aluminum plate.

TABLE [3]-2

| | Surface treatment conditions | | |
|---|---|---|---|
| | Abrasive median diameter | Number of brushes | Revolution (rpm) |
| Condition B-1 | 33 μm | 3 | 1st brush 250 2nd brush, 3rd brush 200 |
| Condition B-2 | 25 μm | 4 | 1 to 3rd brush 300 4th brush 300 |
| Condition B-3 | 50 μm | 4 | 1 to 4th brush 300 |
| Condition B-4 | 33 μm | 3 | 1st brush, 250 2nd brush, 3rd brush 200 |

(b) Alkali Etching Treatment

Alkali etching treatment was performed on the aluminum plate with a spray using an aqueous sodium hydroxide solution with sodium hydroxide concentration (wt %) and aluminum ion concentration (wt %) shown in Table [3]-3, and the aluminum plate was dissolved in an aluminum meltage (g/m$^2$) shown in Table [3]-3. Thereafter, rinsing was performed with a spray. Incidentally, temperature of the alkali etching treatment was 70° C.

TABLE [3]-3

| | Sodium hydroxide concentration (wt %) | Aluminum ion concentration (wt %) | Aluminum meltage (g/m$^2$) |
|---|---|---|---|
| Condition E-1 | 26 | 5 | 10 |
| Condition E-2 | 26 | 5 | 5 |
| Condition E-3 | 26 | 5 | 3 |
| Condition E-4 | 26 | 5 | 1 |
| Condition E-5 | 26 | 5 | 0.7 |
| Condition E-6 | 26 | 5 | 0.5 |
| Condition E-7 | 26 | 5 | 0.3 |
| Condition E-8 | 26 | 7 | 0.2 |
| Condition E-9 | 5 | 0.5 | 0.1 |
| Condition E-10 | 5 | 0.5 | 0.05 |
| Condition E-11 | 5 | 0.5 | 0.5 |

(c) Desmutting Treatment

Under Condition D-1 with 1 wt % aqueous solution of nitric acid concentration (containing 0.5 wt % aluminum ion) at a temperature of 30° C., or Condition D-2 with 25 wt % aqueous solution of a sulfuric acid concentration at a temperature of 60° C., desmutting treatment was each performed with a spray in Condition D-1 or Condition D-2 and then, rinsing was performed with a spray. The aqueous nitric acid solution used in the desmutting treatment was the wastewater in the process where electrochemical graining treatment was performed by using AC in the aqueous nitric acid solution.

(d) Electrochemical Graining Treatment (d-1) Nitric Acid Electrolysis

Electrochemical graining treatment was continuously performed using AC of 60 Hz. The electrolytic solution in this case was a 1 wt % aqueous nitric acid solution (containing 0.5 wt % aluminum ion) at a solution temperature of 50° C. The AC power supply waveform was a waveform as shown in FIG. 2, which was a trapezoidal rectangular wave AC of a time TP where current value reached the peak from zero in 0.8 msec and the duty ratio thereof was 1:1. The electrochemical graining treatment was performed with a carbon electrode as a counter electrode using this current. For an auxiliary anode, ferrite was used. For an electrolytic bath, the one shown in FIG. 3 was used.

The current density was 30 A/$dm^2$ at the peak value of the current and 5% of the current flowing from the power supply was shunted to the auxiliary anode electrode. The quantity of electricity (C/$dm^2$) was the total of the quantity of electricity when the aluminum plate was at the anode side, which was determined to be the value as shown in Table [3]-4.

Thereafter, rinsing was performed with a spray.

TABLE [3]-4

| | Quantity of electricity (C/$dm^2$) |
|---|---|
| Condition C-1 | 175 |
| Condition C-2 | 220 |
| Condition C-3 | 400 |

(d) Hydrochloric Acid Electrolysis

Electrochemical graining treatment was continuously performed using AC of 60 Hz. The temperature of the electrolytic solution was 50° C. The AC power supply waveform was a waveform as shown in FIG. 2, which was a trapezoidal rectangular wave AC of a time TP where current value reach the peak from zero in 0.8 msec and the duty ratio thereof was 1:1. The electrochemical graining treatment was performed with a carbon electrode as a counter electrode using this current. For an auxiliary anode, ferrite was used. For an electrolytic bath, the one shown in FIG. 3 was used.

The current density was 25 A/$dm^2$ at the peak value of the current and 5% of the current flowing from the power supply was shunted to the auxiliary anode electrode. The electrolytic solution used for hydrochloric acid electrolysis was an aqueous solution of hydrochloric acid concentration (wt %) shown in Table [3]-5 (containing 0.5 wt % aluminum ion). The quantity of electricity (C/$dm^2$) was the total of the quantity of electricity when the aluminum plate was at the anode side, which was similarly shown in Table [3]-5. Thereafter, rinsing was performed with a spray.

TABLE [3]-5

| | Hydrochloric acid concentration (wt %) | Quantity of electricity (C/$dm^2$) |
|---|---|---|
| Condition M-1 | 1 | 400 |
| Condition M-2 | 1 | 600 |
| Condition M-3 | 0.5 | 50 |

(e) Alkali Etching Treatment

The alkali etching treatment as described in the aforementioned (b) was performed.

(f) Desmutting Treatment

The desmutting treatment as described in the aforementioned (c) was performed.

(g) Electrochemical Graining Treatment

The electrochemical graining treatment as described in the aforementioned (d) was performed. Thereafter, rinsing was performed with a spray. Electrochemical graining treatment was not performed on Comparative Examples other than Comparative Example 5.

(h) Alkali Etching Treatment

The alkali etching treatment as described in the aforementioned (b) was performed. Thereafter, rinsing was performed with a spray. Alkali etching treatment was not performed on Comparative Examples.

(i) Desmutting Treatment

The desmutting treatment as described in the aforementioned (c) was performed. Thereafter, rinsing was performed with a spray. Desmutting treatment was not performed on Comparative Examples other than Comparative Example 5.

(j) Anodizing Treatment

Anodizing treatment was performed in the same condition A-1 as in (j) in the first embodiment in the aforementioned [1].

(k) Silicate Treatment

Silicate treatment was performed in the same condition S-1 as in (k) in the first embodiment in the aforementioned [1].

For Examples 3-1 to 3-13 and Comparative Examples 3-1 to 3-7, the support for the lithographic printing plate was obtained by each performing the surface treatment conditions as described in Table [3]-6.

TABLE [3]-6

| | Aluminum | Brush grain | Alkali etching | Desmutting | Electrolytic graining | Alkali etching |
|---|---|---|---|---|---|---|
| Example 3-1 | Aluminum-1 | Condition B4 | Condition E1 | Condition D- | Condition C-1 | Condition E4 |
| Example 3-2 | Aluminum-1 | Condition B4 | Condition E1 | Condition D- | Condition C-1 | Condition E5 |
| Example 3-3 | Aluminum-1 | Condition B4 | Condition E1 | Condition D- | Condition C-1 | Condition E6 |
| Example 3-4 | Aluminum-1 | Condition B4 | Condition E1 | Condition D- | Condition C-1 | Condition E7 |
| Example 3-5 | Aluminum-1 | Condition B4 | Condition E1 | Condition D- | Condition C-1 | Condition E9 |
| Example 3-6 | Aluminum-1 | Condition B4 | Condition E1 | Condition D- | Condition C-1 | Condition E4 |

TABLE [3]-6-continued

| | | | | | | |
|---|---|---|---|---|---|---|
| Example 3-7 | Aluminum-1 | Condition B4 | Condition E1 | Condition D- | Condition C-1 | Condition E5 |
| Example 3-8 | Aluminum-1 | Condition B2 | Condition E1 | Condition D- | Condition C-1 | Condition E4 |
| Example 3-9 | Aluminum-1 | Condition B1 | Condition E1 | Condition D- | Condition C-1 | Condition E4 |
| Example 3-10 | Aluminum-1 | Condition B3 | Condition E1 | Condition D- | Condition C-1 | Condition E4 |
| Example 3-11 | Aluminum-2 | Condition B2 | Condition E1 | Condition D- | Condition C-2 | Condition E4 |
| Example 3-12 | Aluminum-3 | Condition B2 | Condition E1 | Condition D- | Condition C-2 | Condition E4 |
| Example 3-13 | Aluminum-5 | Condition B4 | Condition E1 | Condition D- | Condition C-2 | Condition E3 |
| Comparative Example 3-1 | Aluminum-1 | Condition B4 | Condition E1 | Condition D- | Condition C-2 | Condition E10 |
| Comparative Example 3-2 | Aluminum-1 | None | Condition E2 | Condition D- | Condition M-1 | Condition E4 |
| Comparative Example 3-3 | Aluminum-1 | None | Condition E2 | Condition D- | Condition C-3 | Condition E7 |
| Comparative Example 3-4 | Aluminum-1 | None | Condition E2 | Condition D- | Condition M-1 | Condition E6 |
| Comparative Example 3-5 | Aluminum-4 | Condition B3 | Condition E2 | Condition D-2 | Condition C-2 | Condition E4 |
| Comparative Example 3-6 | Aluminum-4 | None | Condition E3 | Condition D- | Condition M-2 | Condition E1 |
| Comparative Example 3-7 | Aluminum-5 | None | Condition E2 | Condition D- | Condition M-1 | Condition E1 |

| | Desmutting | Electrolytic graining | Alkali etching | Desmutting | Anodizing | Silicate treating |
|---|---|---|---|---|---|---|
| Example 3-1 | Condition D- | Condition M3 | Condition E9 | Condition D- | Condition A- | Condition S1 |
| Example 3-2 | Condition D- | Condition M3 | Condition E9 | Condition D- | Condition A- | Condition S1 |
| Example 3-3 | Condition D- | Condition M3 | Condition E9 | Condition D- | Condition A- | Condition S1 |
| Example 3-4 | Condition D- | Condition M3 | Condition E9 | Condition D- | Condition A- | Condition S1 |
| Example 3-5 | Condition D- | Condition M3 | Condition E9 | Condition D- | Condition A- | Condition S1 |
| Example 3-6 | Condition D- | Condition M3 | Condition E11 | Condition D- | Condition A- | Condition S1 |
| Example 3-7 | Condition D- | Condition M3 | Condition E8 | Condition D- | Condition A- | Condition S1 |
| Example 3-8 | Condition D- | Condition M3 | Condition E7 | Condition D- | Condition A- | Condition S1 |
| Example 3-9 | Condition D- | Condition M3 | Condition E7 | Condition D- | Condition A- | Condition S1 |
| Example 3-10 | Condition D- | Condition M3 | Condition E7 | Condition D- | Condition A- | Condition S1 |
| Example 3-11 | Condition D- | Condition M3 | Condition E9 | Condition D- | Condition A- | Condition S1 |
| Example 3-12 | Condition D- | Condition M3 | Condition E9 | Condition D- | Condition A- | Condition S1 |
| Example 3-13 | Condition D- | Condition M3 | Condition E8 | Condition D- | Condition A- | Condition S1 |
| Comparative Example 3-1 | Condition D- | None | None | None | Condition A- | Condition S1 |
| Comparative Example 3-2 | Condition D- | None | None | None | Condition A- | Condition S1 |
| Comparative Example 3-3 | Condition D- | None | None | None | Condition A- | Condition S1 |
| Comparative Example 3-4 | Condition D- | None | None | None | Condition A- | Condition S1 |
| Comparative Example 3-5 | Condition D- | Condition M3 | None | Condition D-D-2 | Condition A- | Condition S1 |
| Comparative Example 3-6 | Condition D- | None | None | None | Condition A- | Condition S1 |
| Comparative Example 3-7 | Condition D- | None | None | None | Condition A- | Condition S1 |

3-(2) Calculation of Factor of Surface Shape of Support for Lithographic Printing Plate For the surface of the support for the lithographic printing plate, $\Delta S^{5(0.2\text{-}5)}$, $\Delta S^{5(0.02\text{-}0.2)}$ and $R_a$ were found as described below.

The results are shown in Table [3]-7 and Table [3]-8.

(1) Measurement of Surface Shape with Atomic Force Microscope

In the present invention, in order to find $R_a$ and $\Delta S^5$, the surface shape was measured with an atomic force microscope (AFM, SPA300/SPI3800N, made by Seiko Instrument Inc.) to find the three-dimensional data.

The method of finding the three-dimensional data was the same as in the first embodiment in the aforementioned [1].

In the measurement, 512×512 points in 5 μm square on the surface were measured. It was determined that the resolution in XY directions was 0.01 μm, the resolution in Z direction was 0.15 nm and the scanning rate was 5 μm/sec.

(2) Measurement of $\Delta S^5$

Adjacent three points are extracted using the found three-dimensional data (f(x, y)) in the aforementioned (1), the sum of the areas of a micro triangle formed by the three points is found and determined as an actual area $S_x$. Surface area ratio $\Delta S^5$ is found by the following equation from the obtained actual area $S_x$ and geometrically measured area $S_o$.

$$\Delta S^5 = [(S_x{}^5 - S_o)/S_o] \times 100(\%)$$

(i) The three-dimensional data found in the aforementioned (1) is used as it is to calculate $\Delta S^5$.

(ii) The one that the components with wavelength of 0.2 μm or more and 5 μm or less are extracted from the three-dimensional data found in the aforementioned (1) is used to calculate surface ratio $\Delta S^{5(0.2\text{-}5)}$. In order to extract the components with wavelength of 0.2 μm or more and 5 μm or less, Fast Fourier transformation is performed on the three-dimensional data found in the aforementioned (1) to find the frequency distribution, and next, Fourier inverse transformation is performed after removing the components with wavelength of less than 0.2 μm.

(iii) The one that the components with wavelength of 0.02 μm or more and 0.2 μm or less are extracted from the three-dimensional data found in the aforementioned (1) is used to calculate surface ratio $\Delta S^{5(0.02\text{-}0.2)}$. In order to extract the components with wavelength of 0.02 μm or more and 0.2 μm or less, Fast Fourier transformation is performed on the three-dimensional data found in the aforementioned (1) to find the frequency distribution, and next, Fourier inverse transformation is performed after removing the components with wavelength of less than 0.02 μm and of more than 0.2 μm.

(2) $R_a$

Using the tree-dimensional data (f(x, y)) obtained in the aforementioned (1), surface roughness $R_a$ is determined by the following equation.

$$R_a = \frac{1}{S_0}\int_0^{L_x}\int_0^{L_y} |f(x, y)| dx \cdot dy \quad \text{[Equation 2]}$$

In the equation, $L_x$ and $L_y$ represents the length of sides in x direction and y direction of a measured area (rectangle) respectively, and in the present invention $L_x = L_y = 5$ μm. Moreover, $S_0$ is a geometrically measured area, which is found by $S_0 = L_x \times L_y = 25$ μm$^2$.

TABLE [3]-7

| | | Values of physical properties with atomic force microscope | | |
|---|---|---|---|---|
| | | $\Delta S^5$ 20–90% | $\Delta S^{5(0.02\text{–}0.2)}$ 15–70% | $\Delta S^{5(0.2\text{–}5)}$ 5–40% |
| Example 3-1 | Aluminum-1 | 30 | 33 | 20 |
| Example 3-2 | Aluminum-1 | 45 | 43 | 24 |
| Example 3-3 | Aluminum-1 | 55 | 50 | 32 |
| Example 3-4 | Aluminum-1 | 85 | 42 | 37 |
| Example 3-5 | Aluminum-1 | 82 | 65 | 35 |
| Example 3-6 | Aluminum-1 | 25 | 57 | 7 |
| Example 3-7 | Aluminum-1 | 34 | 17 | 15 |
| Comparative Example 3-1 | Aluminum-1 | 60 | 35 | 42 |
| Comparative Example 3-2 | Aluminum-1 | 30 | 12 | 10 |
| Comparative Example 3-3 | Aluminum-1 | 90 | 75 | 22 |
| Comparative Example 3-4 | Aluminum-1 | 25 | 22 | 4 |

TABLE [3]-8

| | | Values of physical properties with atomic force microscope | | | |
|---|---|---|---|---|---|
| | | Surface roughness Ra (μm) | $\Delta S^5$ | $\Delta S^{5(0.02\text{–}0.2)}$ | $\Delta S^{5(0.2\text{–}5)}$ |
| Example 3-8 | Aluminum-1 | 0.43 | 45 | 43 | 24 |
| Example 3-9 | Aluminum-1 | 0.59 | 45 | 43 | 24 |
| Example 3-10 | Aluminum-1 | 0.69 | 48 | 43 | 27 |
| Example 3-11 | Aluminum-2 | 0.52 | 60 | 60 | 30 |
| Example 3-12 | Aluminum-3 | 0.53 | 77 | 65 | 35 |
| Example 3-13 | Aluminum-5 | 0.50 | 64 | 54 | 18 |
| Comparative Example 3-5 | Aluminum-4 | 0.55 | 85 | 75 | 45 |
| Comparative Example 3-6 | Aluminum-4 | 0.38 | 18 | 39 | 28 |
| Comparative Example 3-7 | Aluminum-5 | 0.55 | 17 | 15 | 13 |

3-(3) Preparation of Presensitized Plate (1) An undercoating treatment was similarly performed by similarly using the thermal positive working image recording layer A and B used in 1-(3) in the first embodiment in the aforementioned (1) on each of the support for the lithographic printing plates obtained in the above. In addition, the presensitized plate was obtained by performing the following undercoating treatment and by providing a conventional positive working image recording layer.

Incidentally, in Examples 3-1 to 3-12 and Comparative Examples 3-1 to 3-6 the thermal positive working image recording layer A was used, and in Example 3-13 and Comparative Example 3-7 the thermal positive working image recording layer B was used. The conventional positive working image recording layer was used in Examples 3-1, 3-11, 3-12 and 3-13, as separate Examples and the evaluation result was the same as in the case where the thermal positive working image recording layer A or B was used.

(2) Conventional Positive Working Image Recording Layer

Undercoating solution of the following composition was coated on the support for the lithographic printing plate obtained above without performing silicate treatment. The support was then dried at 80° C. for 30 seconds, and thus a coated film was formed. The coated quantity of the coated film after dried was 10 mg/$m^2$.

| <Undercoating solution composition> | |
|---|---|
| Dihydroxyethylglycine | 0.05 parts per weight |
| Methanol | 94.95 parts per weight |
| Water | 5.00 parts per weight |

Photosensitive resin solution having the following composition was coated on an undercoat layer, and a photosensitive layer (conventional positive working image recording layer) was formed by drying at 100° C. for 2 minutes to obtain a presensitized plate. The coated quantity after dried was 2.5 g/$m^2$.

| <Composition of photosensitive resin solution> | |
|---|---|
| Ester compound of naphthoquinone-1,2-dyazide-5-sulfonyl chloride and pyrogallol-acetone resin | 0.73 g |
| Cresol-novolac resin | 2.00 g |
| Dye (oil blue #603, made by Orient Chemical Industries, Ltd.) | 0.04 g |
| Ethylenedichloride | 16 g |
| 2-methoxyethylacetate | 12 g |

3-(4) Exposure and Development Treatment

A lithographic printing plate was obtained by performing image exposure and development treatment on each of the presensitized plates obtained above in the following methods according to the image recording layers.

(1) In Case of Thermal Positive Type Image Recording Layers A or B

The same exposure and development treatment as conducted in 1-(4) in the first embodiment in the aforementioned [1] were performed to obtain a presensitized plate for which plate making was completed.

Incidentally, even when an alkali developer to which the same quantity of the following compound b or c was added was used in place of compound a, it was possible to similarly perform development treatment.

<Compounds a to c>

Compound a: $C_{12}H_{25}N(CH_2CH_2COONa)_2$

Compound b: $C_{12}H_{25}O(CH_2CH_2O)_7H$

Compound c: $(C_6H_{13})_2CHO(CH_2CH_2O)_{20}H$ (2) In Case of Conventional Positive Type Image Recording Layer A presensitized plate was passed through a transparent positive film in a vacuum printing frame and exposure was performed for 50 seconds with a 3 kW metal halide lamp from a distance of 1 m.

After that, development treatment was performed using developer 1. The development treatment was performed with an automatic developing machine PS900NP (made by Fuji Photo Film Co., Ltd.), which was filled with the developer 1, with development temperature of 25° C. for 12 seconds. After the development treatment was completed, the plate was passed through rinsing process, and was treated with gum (GU-7 (1:1)) or the like to obtain a lithographic printing plate for which plate making was completed. Incidentally, even when an alkali developer to which the same quantity of the aforementioned compound b or c was added was used in place of compound a, it was possible to similarly perform development treatment.

3-(5) Evaluation of Lithographic Printing Plate

UV-curing ink press life, the number of sheets needed for ink repelling and gap scum of the lithographic printing plate obtained above were evaluated in the following methods. The results are shown in Tables [3]-9 and [3]-10.

(1) UV-curing Ink Press Life

The obtained lithographic printing plate was mounted on a printing machine (GTO, made by Heidelberg Druckmachinen AG) and printing was performed on coated paper. For printing inks, a general oily ink (HYPLUS, made by Toyo Ink Mfg. Co., Ltd.) and a UV-curing ink (FLASHDRY, made by Toyo Ink Mfg. Co., Ltd.) were used. IF102 (made by Fuji Photo Film Co., Ltd.) was used for fountain solution. In printing with UV-curing ink, the plate surface was wiped out with UV printing mineral spirits (FLASHDRY plate cleaner, made by Toyo Ink Mfg. Co., Ltd.) in every 500-sheet printing. The printing was performed until inadequate inking appeared on the image areas on the printed matter or ink was attached to the non-image areas, and then the impression number was counted to determine UV-curing ink press life. Relative evaluation was made, assuming the result of Example 3-7 to be 100%. The larger the number is, the more excellent the UV-curing ink press life is. If the evaluation is 100% or higher, it is at a practical level as a lithographic printing plate where UV-curing ink press life can be guaranteed.

(2) The Number of Sheets Needed for Ink Repelling

Printing was performed with IF2-type two-color sheet-fed printing machine made by Mitsubishi Heavy Industries, Ltd. After printing was started under usual printing condition, and after good printed matter was obtained, water scale was adjusted to suspend temporarily a supply of water to the plate surface. Then ink was adhered to the entire surface of the printing plate. After that, the water scale was again adjusted, whereby the amount of water supplied to the plate surface was recovered to a normal level. Then evaluation was conducted on the number of wasted paper produced from a time when the amount of water supplied to the plate surface was returned to the normal level to a time when good printed matter was obtained. If the ink repelling property is good, the number of wasted paper decreases, and if the ink repelling property is bad, the number of wasted papers increases. Here, ink repelling property is used as one of the indexes of scum resistance.

(3) Gap Scum

The non-image area between the vicinity of the portion (lower gripper portion) of the PS plate, which is fixed to the plate cylinder on the side that the PS plate is wound around the plate cylinder and contacts the blanket cylinder, and the image area is called a gap. The scum in the area which is adjacent to the gap area on the paper was observed with the intermediate proper number of printed sheets until the condition that ink is likely to be attached to this gap which is scummed (gap scum), when printing is started, gradually disappears as water and ink are supplied in the printing process. The length of the generated scum in the rotational direction was determined to be the standard of the evaluation.

The evaluation was conducted in 10 steps with the highest gap scum resistance: 10 is the condition of 2 mm or less, 5 is the condition of 10 to 15 mm, the lowest gap scum resistance: 1 is the condition of 50 mm or more. The larger the number is, the more excellent the scum resistance is. If the evaluation is 5 or higher, as the lithographic printing plate where gap scum resistance is excellent, it is at a practical level.

(4) Ink Spreading Resistance

The evaluation was conducted in the same conditions as in the evaluation (1) of the lithographic printing plate in 1-(5) in the first embodiment in the aforementioned [1].

As is clear from Table [3]-9, the presensitized plate according to the present invention using the support for the lithographic printing plate (Examples 3-1 to 3-7) according to the present invention, where $\Delta S^5$, $\Delta S^{5(0.2\text{-}5)}$ and $\Delta S^{5(0.02\text{-}0.2)}$ found from the three-dimensional data obtained by measuring 512×512 points in 5 μm square on the surface with the atomic force microscope each meets the specific conditions, is excellent in either of UV-curing ink resistance, ink repelling property, and gap scum resistance when the lithographic printing plate is prepared. In addition, the presensitized plate according to the present invention using the support for the lithographic printing plate (Examples 3-8 to 3-12) according to the present invention, where $\Delta S^5$, $\Delta S^{5(0.2\text{-}5)}$ and $\Delta S^{5(0.02\text{-}0.2)}$ and $R_a$ each meets the specific conditions, is excellent in UV-curing ink resistance, ink repelling property, gap scum resistance and ink spreading resistance.

TABLE [3]-9

| | UV-curing ink press life (%) | Number of sheets needed for ink repelling (sheets) | Gap scum (10-step evaluation) |
|---|---|---|---|
| Example 3-1 | 110 | 25 | 8 |
| Example 3-2 | 130 | 30 | 7 |
| Example 3-3 | 140 | 35 | 6 |
| Example 3-4 | 150 | 30 | 7 |
| Example 3-5 | 160 | 40 | 5 |
| Example 3-6 | 100 | 30 | 6 |
| Example 3-7 | 100 | 20 | 7 |
| Example 3-13 | 130 | 25 | 8 |
| Comparative Example 3-1 | 130 | 50 | 1 |
| Comparative Example 3-2 | 50 | 20 | 8 |
| Comparative Example 3-3 | 150 | 100 | 1 |
| Comparative Example 3-4 | 10 | 20 | 9 |
| Comparative Example 3-7 | 50 | 20 | 8 |

TABLE [3]-10

| | UV-curing ink press life (%) | Number of sheets needed for ink repelling (sheets) | Gap scum (10-step evaluation) | Ink spreading resistance (10-step evaluation) |
|---|---|---|---|---|
| Example 3-8 | 125 | 30 | 7 | 6 |
| Example 3-9 | 130 | 30 | 7 | 8 |
| Example 3-10 | 125 | 30 | 7 | 9 |
| Example 3-11 | 145 | 35 | 6 | 8 |
| Example 3-12 | 170 | 40 | 5 | 8 |
| Comparative Example 3-5 | 130 | 100 | 2 | 8 |
| Comparative Example 3-6 | 110 | 30 | 6 | 3 |

As described above, if the support for the lithographic printing plate in the first embodiment according to the present invention is used, scum resistance in the non-image areas is excellent, ink spreading in the halftone dot areas hardly occurs, and left-plate scum resistance under a low-humidity environment is excellent irrespective of kinds of inks or fountain solutions, when the lithographic printing plate is prepared.

In addition, if the support for the lithographic printing plate in the second embodiment according to the present invention is used, the balance between scum resistance and press life which can not have been overcoming the trade-off relations therebetween can be maintained at a high level, and the generation of inadequate inking in the solid areas when coated recycled paper is used can be suppressed.

Moreover, if the support for the lithographic printing plate in the third embodiment according to the present invention is used, UV-curing ink resistance, ink repelling property, and gap scum resistance are all excellent when the lithographic printing plate is prepared.

What is claimed is:

1. A support for a lithographic printing plate, wherein surface area ratios obtained from three-dimensional data which can be found by measuring 512×512 points in 50 μm square on the surface with an atomic force microscope meets the following requirements (1-i) to (1-iii):

(1-i) A surface area ratio $\Delta S^{50(50)}$ is 20 to 90%, (1-ii) A surface area ratio $\Delta S^{50(2\text{-}50)}$ is 1 to 30%, and (1-iii) A surface area ratio $\Delta S^{50(0.2\text{-}2)}$ is 5 to 40%, where, $\Delta S^{50(50)}$ is the surface area ratio which can be obtained by the following equation from an actual area $S_x^{50}$ obtained by a three-point estimate from the three-dimensional data and a geometrically measured area $S_o^{50}$, $$\Delta S^{50(50)}=[(S_x^{50}-S_o^{50})/S_o^{50}]\times 100(\%) \qquad (1\text{-}1)$$

$\Delta S^{50(2\text{-}50)}$ is the surface area ratio obtained after extracting components with wavelength of 2 μm or more and 50 μm or less from the three-dimensional data, and $\Delta S^{50(0.2\text{-}2)}$ represents the surface area ratio obtained after extracting components with wavelength of 0.2 μm or more and 2 μm or less from the three-dimensional data.

2. The support for the lithographic printing plate according to claim 1, wherein the number of recesses of 4 μm or deeper existing on the surface is 10 or less per 400 μm×400 μm, and the number of recesses of 3 μm or deeper existing on the surface is 30 or less per 400 μm×400 μm.

3. A support for a lithographic printing plate, wherein a surface area ratio and steepness which can be found by three-dimensional data from a three-point estimate which can be found by measuring 512×512 points in 50 μm square on the surface with an atomic force microscope meet the following requirements (2-i) to (2-ii):

(2-i) A surface area ratio $\Delta S^{50(50)}$ is 30 to 60%, and (2-ii) A steepness $a45^{50(0.2\text{-}2)}$ is 5 to 40%, where, $\Delta S^{50(50)}$ is the surface area ratio which can be found by the following equation (2-1) from an actual area $S_x^{50}$ and a geometrically measured area $S_o^{50}$, $$\Delta S^{50(50)}=(S_x^{50}-S_o^{50})/S_o^{50}\times 100(\%) \qquad (2\text{-}1)$$

the steepness $a45^{50(0.2\text{-}2)}$ is the area ratio of an area of gradient 45° or more in the data obtained after extracting components with wavelength of 0.2 μm or more and 2 μm or less from the three-dimensional data.

4. The support for the lithographic printing plate according to claim 3, wherein a surface area ratio and a steepness which can be found from three-dimensional data obtained by measuring 512×512 points in 5 μm square on the surface with an atomic force microscope meet the following requirements (3-i) to (3-ii):

(3-i) A surface area ratio $\Delta S^{5(0.02\text{-}0.2)}$ is 30 to 60%, and (3-ii) A steepness $a45^{5(0.02\text{-}0.2)}$ is 10 to 40%, where, $\Delta S^{5(0.02\text{-}0.2)}$ can be found by the following equation (3-1) from an actual area ratio $\Delta S_x^{5(0.02\text{-}0.2)}$ which can be found by a three-point estimate from data obtained after extracting components with wavelength of 0.02 μm or more and 0.2 μm or less and a geometrically measured area $S_o^5$, and the steepness $a45^{5(0.02\text{-}0.2)}$ is the area ratio of an area of gradient 45° or more in the data obtained after extracting components with wavelength of 0.02 μm or more and 0.2 μm or less from the three-dimensional data as shown below.

$$\Delta S^{5(0.02\text{-}0.2)}=(S_x^{5(0.02\text{-}0.2)}-S_o^5)/S_o^5\times100(\%) \quad (3\text{-}1)$$

5. The support for the lithographic printing plate according to claim 3 or 4, wherein the number of recesses of 4 μm or deeper existing on the surface is 6 or less per 400 μm×400 μm.

6. A support for a lithographic printing plate, wherein surface area ratios obtained from three-dimensional data which can be found by measuring 512×512 points in 5 μm square on the surface with an atomic force microscope meets the following requirements (4-i) to (4-iii):

(4-i) A surface area ratio $\Delta S^{5(5)}$ is 20 to 90%, (4-ii) A surface area ratio $\Delta S^{5(0.2\text{-}5)}$ is 5 to 40%, and (4-iii) A surface area ratio $\Delta S^{5(0.02\text{-}0.2)}$ is 15 to 70%, where, $\Delta S^{5(5)}$ is a surface area ratio which can be found and expressed by the following equation (4-1) using an actual area $S_x^5$ obtained from a three-point estimate from the three-dimensional data and a geometrically measured area $S_o$, $$\Delta S^{5(5)}=[(S_x^5-S_o)/S_o]\times100(\%), \quad (4\text{-}1)$$

$\Delta S^{5(0.2\text{-}5)}$ is a surface area ratio found and expressed by the following equation (4-2) using an actual area $S_x^{5(0.2\text{-}5)}$ obtained after extracting components of wavelength of 0.02 μm or more and 0.2 μm or less from the three-dimensional data and a geometrically measured area $S_o$, $$\Delta S^{5(0.2\text{-}5)}=[(S_x^{5(0.2\text{-}5)}-S_o)/S_o]\times100(\%) \quad (4\text{-}2)$$

and $\Delta S^{5(0.02\text{-}0.2)}$ is a surface area ratio found and expressed by the following equation (4-3) using an actual area $S^{x5(0.02\text{-}0.2)}$ obtained after extracting components of wavelength of 0.02 μm or more and 0.2 μm or less from the three-dimensional data and a geometrically measured area $S_o$ as shown below.

$$\Delta S^{5(0.02\text{-}0.2)}=[(S_x^{5(0.02\text{-}0.2)}-S_o)/S_o]\times100(\%) \quad (4\text{-}3)$$

7. The support for the lithographic printing plate according to claim 6, wherein the support can be obtained by performing graining on the surface of an aluminum alloy plate containing Cu content of 0.00 to 0.05 wt %.

8. The support for the lithographic printing plate according to claim 6 or 7, wherein mean roughness $R_a$ measured by contact stylus type surface roughness meter is 0.40 to 0.70.

9. The presensitized plate comprising the support for the lithographic printing plate according to any one of claim 1, and an image recording layer provided on the support for the lithographic printing plate.

10. The presensitized plate comprising the support for the lithographic printing plate according to claim 2, and an image recording layer provided on the support for the lithographic printing plate.

11. The presensitized plate comprising the support for the lithographic printing plate according to claim 3, and an image recording layer provided on the support for the lithographic printing plate.

12. The presensitized plate comprising the support for the lithographic printing plate according to claim 4, and an image recording layer provided on the support for the lithographic printing plate.

13. The presensitized plate comprising the support for the lithographic printing plate according to claim 5, and an image recording layer provided on the support for the lithographic printing plate.

14. The presensitized plate comprising the support for the lithographic printing plate according to claim 6, and an image recording layer provided on the support for the lithographic printing plate.

15. The presensitized plate comprising the support for the lithographic printing plate according to claim 7, and an image recording layer provided on the support for the lithographic printing plate.

16. The presensitized plate comprising the support for the lithographic printing plate according to claim 8, and an image recording layer provided on the support for the lithographic printing plate.

* * * * *

UNITED STATES PATENT AND TRADEMARK OFFICE

CERTIFICATE OF CORRECTION

PATENT NO. : 7,048,988 B2
APPLICATION NO. : 10/655369
DATED : May 23, 2006
INVENTOR(S) : Hirokazu Sawada It is certified that error appears in the above-identified patent and that said Letters Patent is hereby corrected as shown below:

Col. 78 Claim 9, line 2, delete "any one of".

Signed and Sealed this

Ninth Day of September, 2008

JON W. DUDAS
*Director of the United States Patent and Trademark Office*